(12) United States Patent
Panigrahy et al.

(10) Patent No.: US 12,485,107 B2
(45) Date of Patent: Dec. 2, 2025

(54) METHODS FOR THE PREVENTION OR TREATMENT OF CYTOKINE STORM

(71) Applicants: Beth Israel Deaconess Medical Center, Inc., Boston, MA (US); The Regents of the University of California, Oakland, CA (US)

(72) Inventors: Dipak Panigrahy, Boston, MA (US); Allison Gartung, Boston, MA (US); Anna Fishbein, Boston, MA (US); Bruce Hammock, Davis, CA (US); Sung Hee Hwang, Davis, CA (US); Vikas P. Sukhatme, Atlanta, GA (US)

(73) Assignees: Beth Israel Deaconess Medical Center, Inc., Boston, MA (US); The Regents of the University of California, Oakland, CA (US)

( * ) Notice: Subject to any disclaimer, the term of this patent is extended or adjusted under 35 U.S.C. 154(b) by 1119 days.

(21) Appl. No.: 17/421,785

(22) PCT Filed: Jan. 10, 2020

(86) PCT No.: PCT/US2020/013149
§ 371 (c)(1),
(2) Date: Jul. 9, 2021

(87) PCT Pub. No.: WO2020/146770
PCT Pub. Date: Jul. 16, 2020

(65) Prior Publication Data
US 2022/0087977 A1    Mar. 24, 2022

Related U.S. Application Data

(60) Provisional application No. 62/791,287, filed on Jan. 11, 2019.

(51) Int. Cl.
| | | |
|---|---|---|
| *A61K 31/559* | (2006.01) | |
| *A61K 31/145* | (2006.01) | |
| *A61K 31/196* | (2006.01) | |
| *A61K 31/405* | (2006.01) | |
| *A61K 31/415* | (2006.01) | |
| *A61K 31/557* | (2006.01) | |
| *A61K 31/558* | (2006.01) | |
| *A61P 35/00* | (2006.01) | |
| *A61P 37/06* | (2006.01) | |

(52) U.S. Cl.
CPC .......... *A61K 31/405* (2013.01); *A61K 31/196* (2013.01); *A61K 31/415* (2013.01); *A61P 35/00* (2018.01); *A61P 37/06* (2018.01)

(58) Field of Classification Search
CPC .. A61K 31/559; A61K 31/557; A61K 31/558; A61K 31/145; A61P 35/00
See application file for complete search history.

(56) References Cited

FOREIGN PATENT DOCUMENTS

| | | |
|---|---|---|
| WO | WO-2012/082647 A2 | 6/2012 |
| WO | WO-2013/138118 A1 | 9/2013 |
| WO | WO-2019/040319 A1 | 2/2019 |

OTHER PUBLICATIONS

Hwang et al. (Journal of Medicinal Chemistry (2011), 54(8), 3037-3050).*
Channappanavar et al., "Pathogenic human coronavirus infections: causes and consequences of cytokine storm and immunopathology," Semin Immunopathol. 39(5):529-539 (2017).
Gartung et al., "Growth by a Dual COX-2/sEH Inhibitor," The FASEB Journal. 32(1_supplement):1-3 (2018).
Gartung et al., "Suppression of chemotherapy-induced cytokine/lipid mediator surge and ovarian cancer by a dual COX-2/sEH inhibitor," Proc Natl Acad Sci U S A. 116(5):1698-1703 (2019).
Hwang et al., "Rationally designed multitarget agents against inflammation and pain," available in PMC Jul. 28, 2014, published in final edited form as: Curr Med Chem. 20(13):1783-99 (2013).
International Search Report and Written Opinion for International Application No. PCT/US20/13149, mailed May 27, 2020 (14 pages).
Invitation to Pay Additional Fees for International Application No. PCT/US20/13149, mailed Mar. 30, 2020 (3 pages).
Liu et al., "Inhibition of soluble epoxide hydrolase enhances the anti-inflammatory effects of aspirin and 5-lipoxygenase activation protein inhibitor in a murine model," available in PMC Feb. 23, 2012, published in final edited form as: Biochem Pharmacol. 79(6):880-7 (2010).
Schmelzer et al., "Enhancement of antinociception by coadministration of nonsteroidal anti-inflammatory drugs and soluble epoxide hydrolase inhibitors," Proc Natl Acad Sci U S A. 130(37):13646-13651 (2006).
Third Party Observation mailed May 12, 2021 for International Patent Application No. PCT/US2020/013149, Panigrahy et al., "Methods for the prevention or treatment of cytokine storm, and for preventing diseases or conditions caused by cytokine storm," filed Jan. 10, 2020 (7 pages).
Tisoncik et al., "Into the eye of the cytokine storm," Microbiol Mol Biol Rev. 76(1):16-32 (2012).
International Preliminary Report on Patentability for International Patent Application No. PCT/US2020/013149 (filed Jan. 10, 2020), mailed Jul. 22, 2021 (8 pages).

* cited by examiner

*Primary Examiner* — Bruck Kifle
(74) *Attorney, Agent, or Firm* — Clark & Elbing LLP

(57) ABSTRACT

The invention provides methods for treating, suppressing, or preventing detrimental cytokine and/or lipid mediator surges that can result from a variety of different diseases, conditions, and therapeutic treatments, e.g., by inhibition of cyclooxygenase-2 (COX-2) and soluble epoxide hydrolase (sEH).

23 Claims, 38 Drawing Sheets

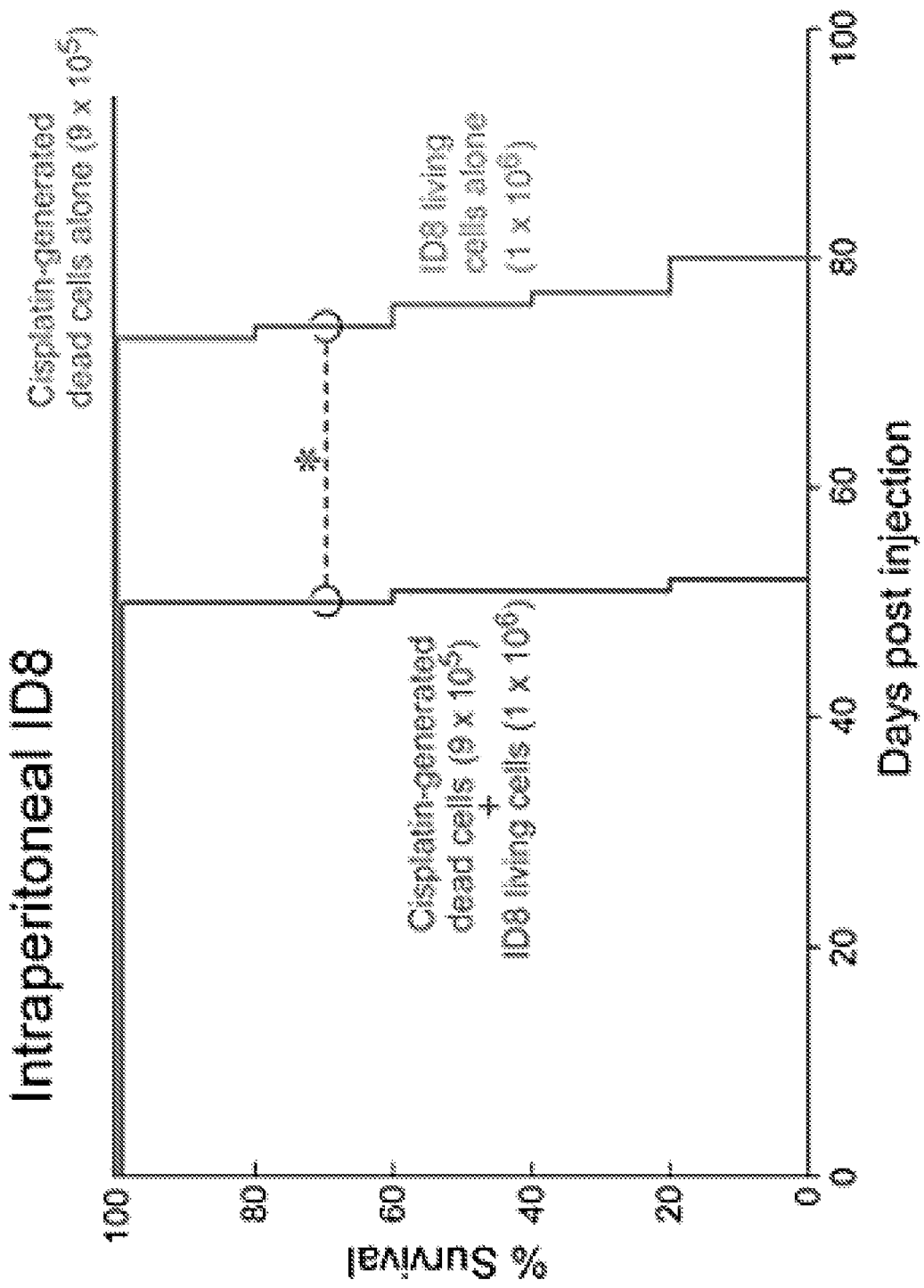

Fig. 2A
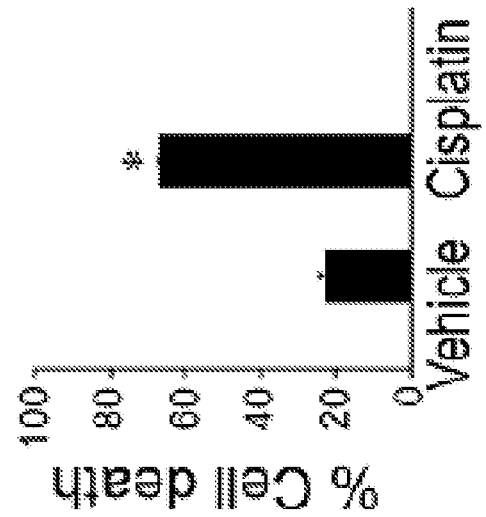
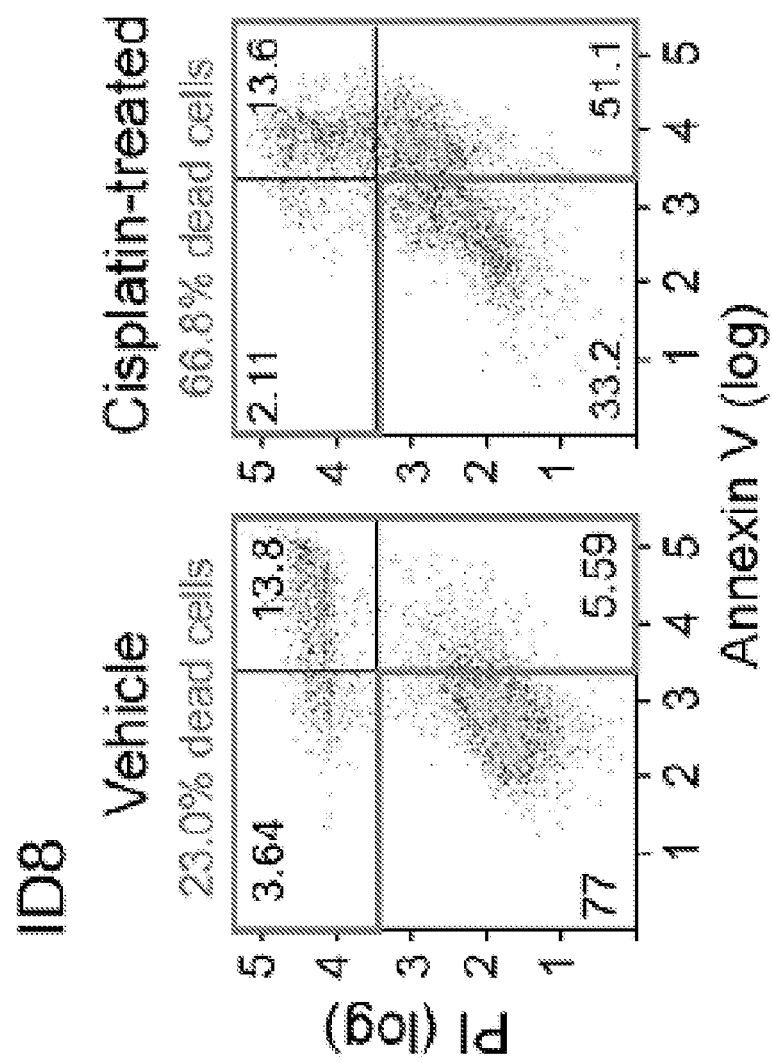

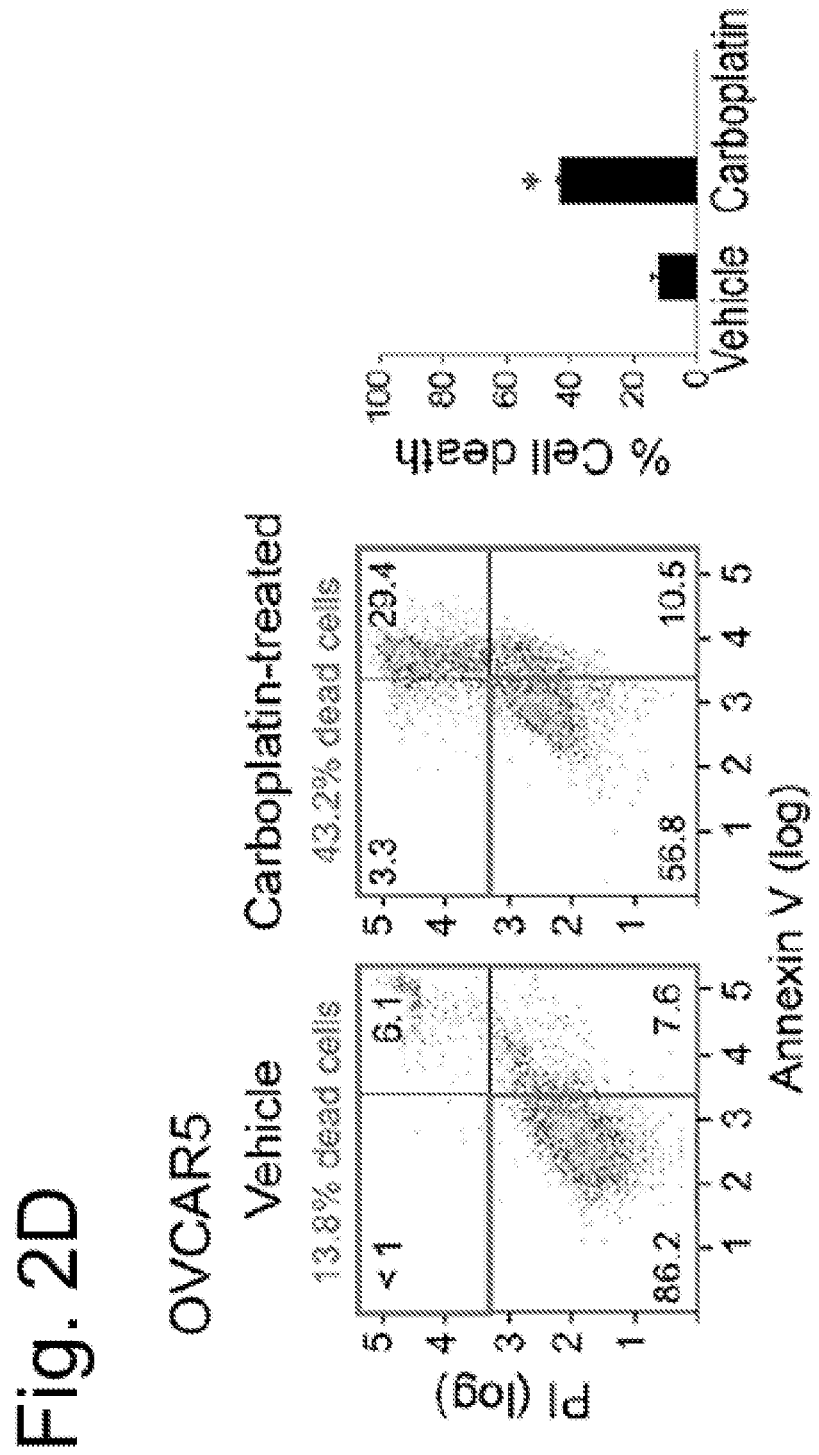

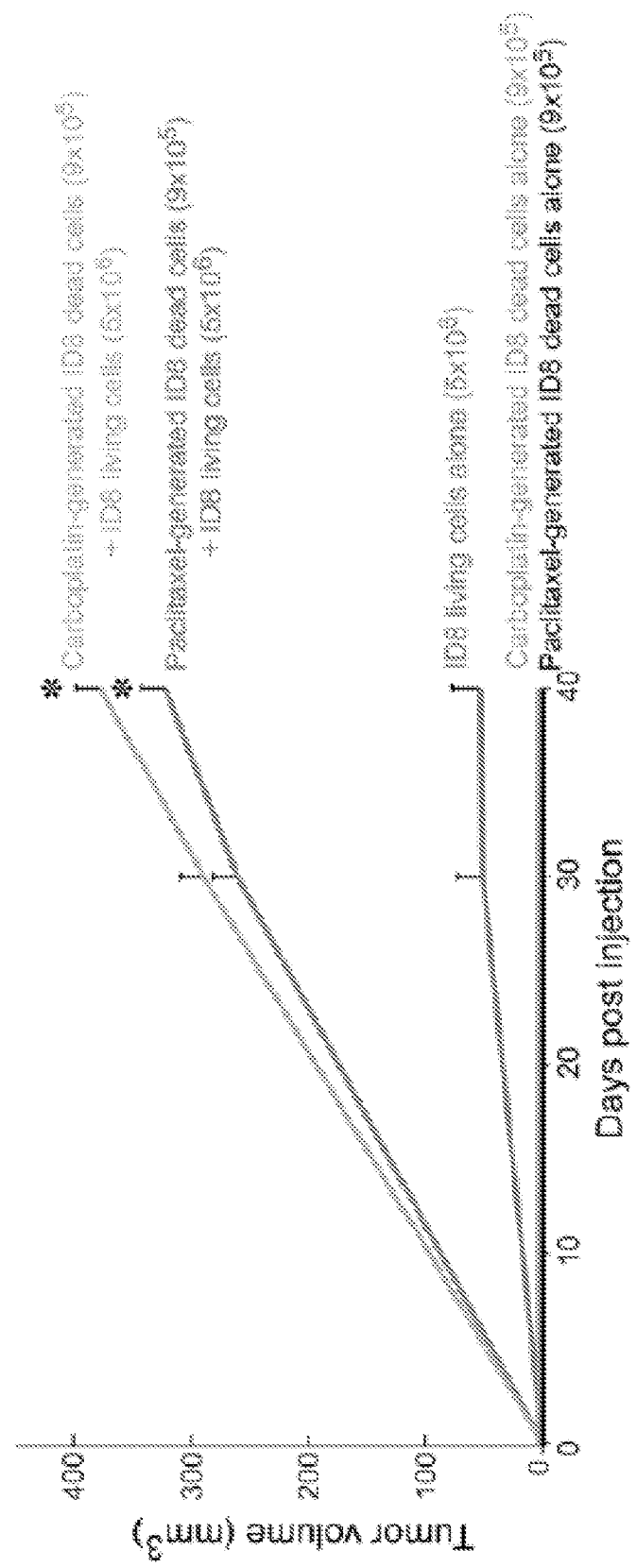

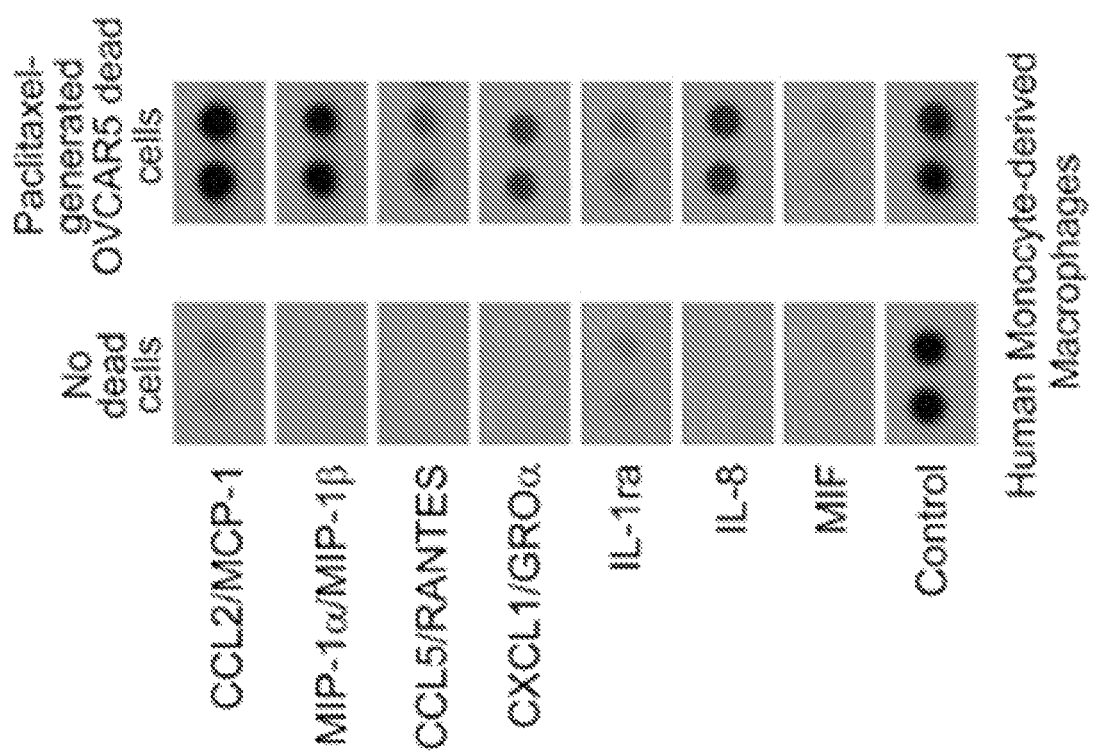

Fig. 6A
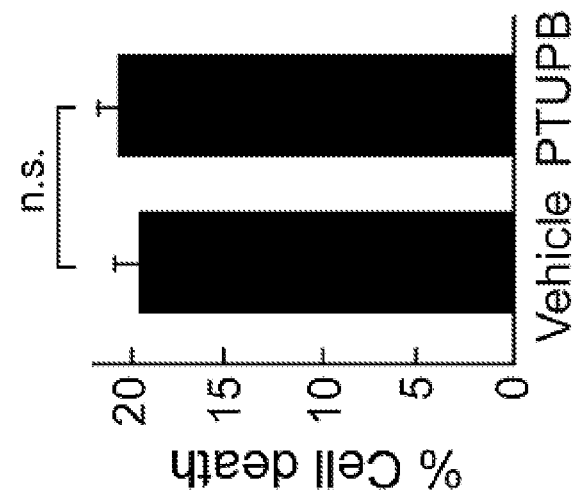
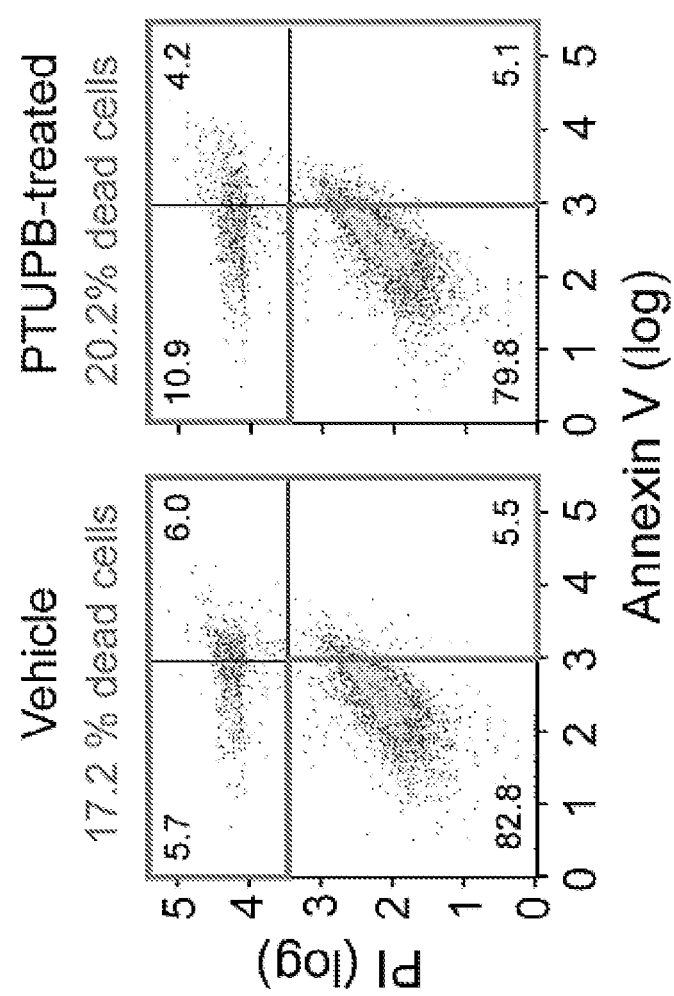

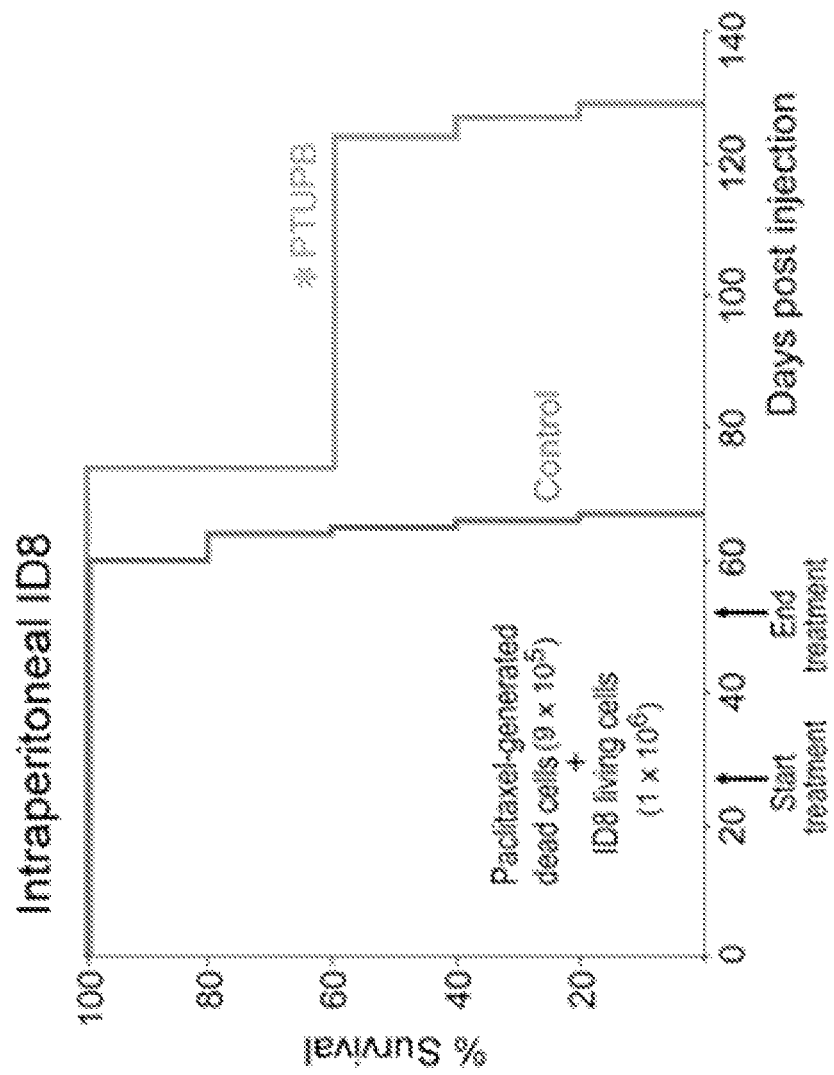

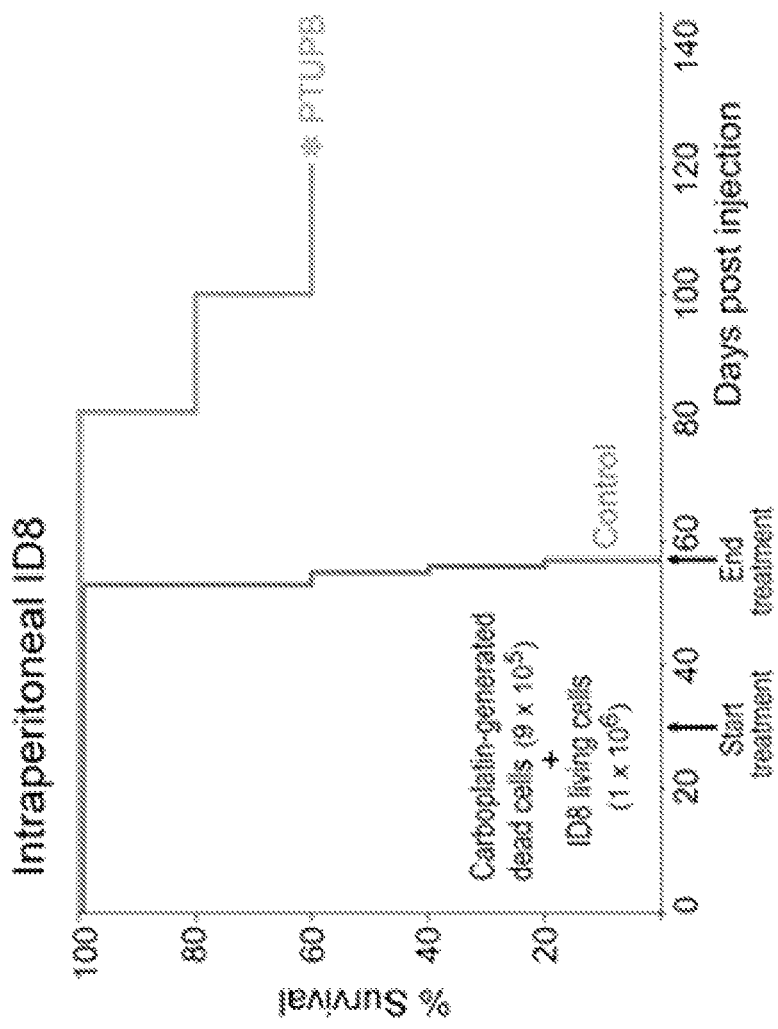

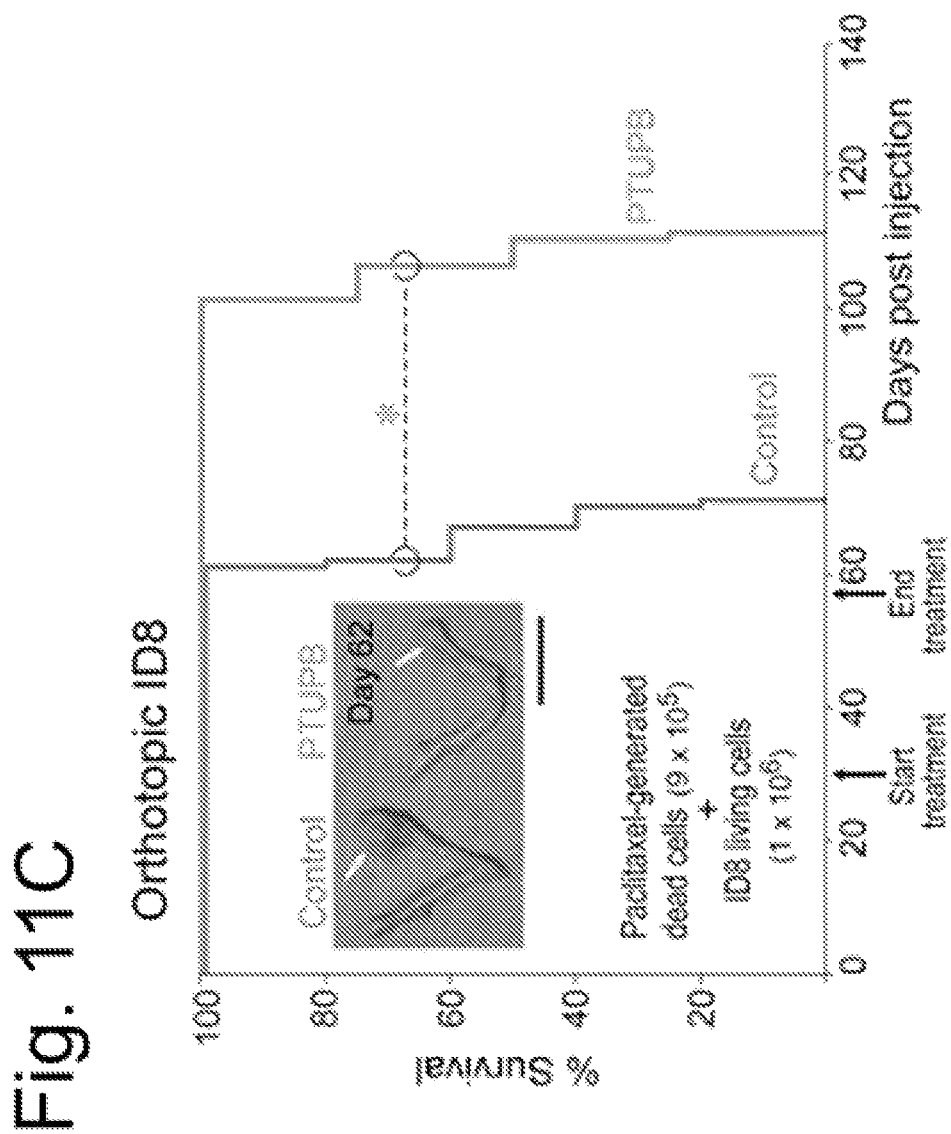

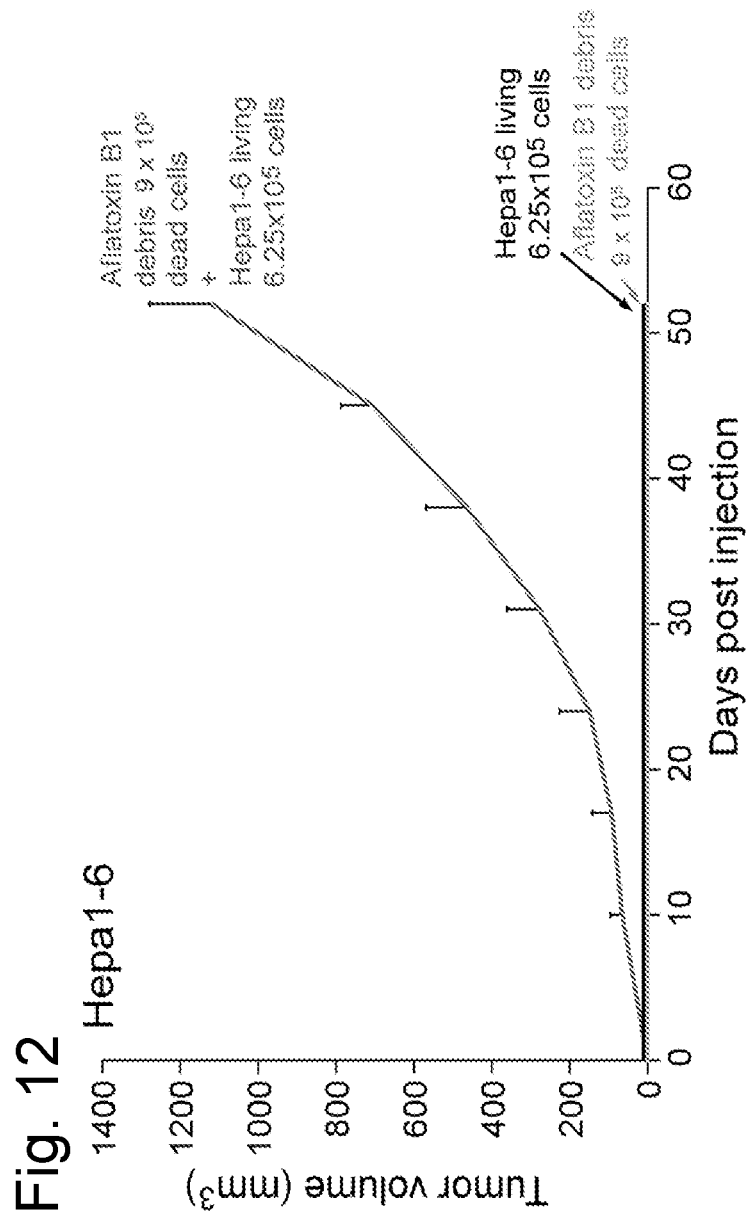

METHODS FOR THE PREVENTION OR TREATMENT OF CYTOKINE STORM

STATEMENT AS TO FEDERALLY FUNDED RESEARCH

This invention was made with government support under Grant Nos. ES002710 and ES004699 awarded by the National Institute of Environmental Health Sciences. The government has certain rights in the invention.

TECHNICAL FIELD

This invention relates to methods and compositions for use in preventing or treating cytokine and/or lipid mediator storm, as well as for preventing diseases or conditions that are caused by cytokine and/or lipid mediator storm.

BACKGROUND

A cytokine storm or surge is an immune reaction to cellular stress, acute or chronic injury, disease, infection, or treatment thereof. It is the systemic, expression of a vigorous immune system resulting in the release of up to 150 (or more) inflammatory mediators (e.g., cytokines, chemokines, oxygen free radicals, and coagulation factors). Both pro-inflammatory cytokines (such as tumor necrosis factor (TNF)-α, interleukin (IL)-1, and IL-6) and anti-inflammatory cytokines (such as IL-10 and IL-1 receptor antagonist) may be elevated in the serum of patients experiencing a cytokine storm. Certain levels of cytokines may be desirable, e.g., to stimulate an immune response in applications such as vaccines or immunotherapy. However, undesirable elevation of cytokine levels, characteristic of a cytokine surge, may lead to severe side effects including, e.g., such as systemic inflammatory response syndrome, fever, weakness, nausea, extreme fatigue, muscle pain, difficulty breathing, low blood pressure, hemorrhage, neurological changes, organ damage, organ swelling, organ failure (e.g., multiple organ failure), and death. In addition to cytokines, other mediators, including lipids, can be released by the body in response to, e.g., injury, infection, disease, and therapeutic treatments (e.g., chemotherapy), and be components of a harmful surge.

Currently, no specific therapies are available to effectively treat cytokine or lipid surge. Tocilizumab (anti-IL-6 antibody) and corticosteroids are used to resolve symptoms of cytokine surge in the short-term for some patients. Numerous experimental approaches exist, several of which aim to interfere with upstream mechanisms to reduce the synthesis of cytokines. Immunoglobulins, macrophage depletion, or TNF blockade also have limited efficacy in suppressing cytokine storm. Other therapies that have been attempted but eventually failed after limited success include OX40:Ig, steroids, diphenhydramine HCl, angiotensin-converting-enzyme inhibitors, angiotensin II receptor blockers, corticosteroids, gemfibrozil, free radical scavengers, and tumor necrosis factor-α blockers. Furthermore, blockade of pro-inflammatory cytokines to improve outcomes in sepsis by dampening the storm has failed in clinical trials. To date, all clinical trials targeting cytokine production or effects have failed.

There is a need for effective methods for use in the prevention and treatment of cytokine and lipid storm or surge.

SUMMARY

The invention provides methods of treating, suppressing, or preventing a cytokine or lipid storm or surge in a subject, or treating, suppressing, or preventing a disease or condition caused by a cytokine or lipid storm or surge, the methods including administering to the subject a dual inhibitor of cyclooxygenase-2 (COX-2) and soluble epoxide hydrolase (sEH), or an inhibitor of COX-2 and an inhibitor of sEH.

In some embodiments, the cytokine or lipid surge results from infection by a bacterium, virus, fungus, or parasite. For example, the cytokine or lipid surge may result from infection by a bacterium, which is optionally a Gram-negative bacterium, such as *Francisella tularenis*; a virus, which optionally is an influenza virus (such as an influenza A virus, such as avian influenza A H7N9, H1N1, or H5N1 virus), a human coronavirus, a hantavirus, a flavivirus (such as a dengue virus), Ebola virus, a SARS virus, Epstein-Barr virus (causing a conditions such as EBV-associated hemophagocytic lymphohistiocytosis), or variola virus; or a parasite, which optionally is a malaria parasite, such as *Plasmodium falciparum*.

In some embodiments, the subject has or is at risk of developing a severe reaction to infection, which is optionally selected from sepsis, septic shock, multiple organ dysfunction syndrome (MODS), and toxic shock syndrome.

In some embodiments, the cytokine or lipid surge results from a condition resulting in damage or insult to the body or a non-infectious disease process. For example, the cytokine or lipid surge may result from trauma, injury, burn, exposure to toxic materials (such as bacterial toxins or toxic chemicals), acute respiratory distress syndrome secondary to drug use or inhalation of toxins, cancer, acute pancreatitis or hepatitis (due to a condition such as chronic alcohol exposure), fulminant hepatic failure, multiple sclerosis, rheumatic diseases, such as systemic juvenile idiopathic arthritis (JIA) and adult-onset Still's disease (AOSD), or Langerhans cell histiocytosis (LCH).

In some embodiments, the toxic material is a bacterial or fungal toxin (e.g., an aflatoxin, such as aflatoxin B1). In some embodiments, the toxic material is a carcinogen (for example, alcohol (e.g., ethanol), n-nitrosodimethylamine (NDMA), an aldehyde, cyclosporine, and vinyl chloride).

In some embodiments, the cytokine or lipid storm or surge results from the treatment of a disease or condition of the subject. For example, the treatment may be surgery (such as cardiac bypass surgery), immunotherapy, chemotherapy, radiation, or cell or tissue-based therapies (such as bone marrow or stem cell transplantation (such as allogeneic hematopoietic stem-cell transplantation), which may lead to graft-versus host disease, and T-cell therapy, including CAR-T cell therapy). In some embodiments, the immunotherapy includes treatment with therapeutic antibodies (such as rituximab, anti-CD28 antibody theralizumab/TGN1412, anti-PD1 antibodies, anti-PD-L1 antibodies, or anti-CTLA antibodies), CAR-T cells (such as CAR-T cells directed against CD19 or other marker of B-cell malignancies), cytokines (such as IL-2), or vaccination. Accordingly, the subject may have cancer or require surgery (e.g., cardiac bypass surgery).

In some embodiments, administration of the dual inhibitor of COX-2 and sEH, or the inhibitor of COX-2 and the inhibitor of sEH, reduces the level of one or more of a pro-inflammatory cytokine, a proangiogenic cytokine, and/or a bioactive lipid. For example, the pro-inflammatory or proangiogenic cytokine may be TNF-α, CXCL2, CCL4, CCL2, ICAM-1, G-CSF, GM-CSF, PAI-1, osteopontin, MMP9, CXCL13, CXCL12, PlGF-2, PTX-3, fractalkine, angiopoietin-1, IGFBP1, or IL-1Ra; and/or the bioactive lipid may be $PGF_{2\alpha}$, $PDG_2$, $PGJ_2$, or 15-oxoETE.

In some embodiments, the subject is co-administered a chemotherapeutic agent and/or an immunotherapeutic agent and/or radiation.

In some embodiments, the subject has or is at risk of developing cancer or a metastasis thereof (see, e.g., below).

The invention also provides methods of preventing, suppressing, or treating cancer (see, e.g., below) in a subject, the methods including administering to the subject a (i) chemotherapeutic or immunotherapeutic agent, and (ii) a dual inhibitor of COX-2 and sEH, or an inhibitor of COX-2 and an inhibitor of sEH.

In some embodiments, the chemotherapeutic or immunotherapeutic agent is an immune checkpoint inhibitor, which is optionally is an antibody against PD-1.

In some embodiments of any of the methods described herein, the dual inhibitor of COX-2 and sEH is 4-(5-phenyl-3-{3-[3-(4-trifluoromethyl-phenyl)-ureido]-propyl}-pyrazol-1-yl)-benzenesulfonamide (PTUPB) or is selected from the molecules set forth in Table 1.

In some embodiments of any of the methods described herein, the inhibitor of COX-2 is selected from the molecules set forth in Table 2.

In some embodiments of any of the methods described herein, the inhibitor of sEH is 4-[[trans-4-[[(tricyclo[3.3.1.1$^{3,7}$]dec-1-ylamino)carbonyl]amino]cyclohexyl]oxy]-benzoic acid (t-AUCB) or is selected from the molecules set forth in Table 3.

In some embodiments, in the methods described above and elsewhere herein the subject has or is at risk of developing a cancer, such as a cancer selected from the group consisting of ovarian cancer, leukemia, lymphoma, hematopoietic cancer, liver cancer, bone cancer, lung cancer, brain cancer, bladder cancer, gastrointestinal cancer, kidney cancer, breast cancer, cardiac cancer, cervical cancer, uterine cancer, head and neck cancer, gallbladder cancer, laryngeal cancer, lip and oral cavity cancer, ocular cancer, skin cancer, melanoma, pancreatic cancer, prostate cancer, genital cancer, colon cancer, colorectal cancer, testicular cancer, and throat cancer.

The invention also provides pharmaceutical compositions and kits including any combination of one or more compound of Table 1, Table 2, and/or Table 3.

The invention further includes the use of any of the compounds described herein in the prevention, suppression, or treatment of any of the diseases or conditions described herein, or in the preparation of medicaments therefor, optionally consistent with the methods described above and elsewhere herein.

Definitions

Unless otherwise defined, scientific and technical terms used in connection with the present disclosure shall have the meanings that are commonly understood by those of ordinary skill in the art. Further, unless otherwise required by context or expressly indicated, singular terms shall include pluralities and plural terms shall include the singular. For any conflict in definitions between various sources or references, the definition provided herein will control.

It is understood that embodiments of the invention described herein include "consisting" and/or "consisting essentially of" embodiments. As used herein, the singular form "a", "an," and "the" includes plural references unless indicated otherwise. Use of the term "or" herein is not meant to imply that alternatives are mutually exclusive.

Throughout this specification and claims, the word "comprise," or variations such as "comprises" or "comprising," will be understood to imply the inclusion of a stated integer or group of integers but not the exclusion of any other integer or group of integers.

In this application, the use of "or" means "and/or" unless expressly stated or understood by one skilled in the art. In the context of a multiple dependent claim, the use of "or" refers back to more than one preceding independent or dependent claim.

The terms "decreased," "decrease," "reduced," "reduction," or "inhibit" are all used herein to mean a decrease by a statistically significant amount. In some embodiments, "decreased," "decrease," "reduced," "reduction," or "inhibit" typically mean a decrease by at least 10% as compared to a reference level (e.g., the absence of a given treatment or agent) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "reduction" or "inhibition" does not encompass a complete inhibition or reduction as compared to a reference level. "Complete inhibition" is a 100% inhibition as compared to a reference level. Where applicable, a decrease can be down to a level accepted as within the range of normal for an individual without a given disease or condition, or sufficient to alleviate one or more symptoms of the disease or condition.

The term "effective amount" as used herein refers to an amount of a therapeutic agent that provides a therapeutic or prophylactic benefit.

The terms "increased," "increase," "enhance," or "activate" are all used herein to mean an increase by a statically significant amount. In some embodiments, the terms "increased," "increase," "enhance," or "activate" can mean an increase of at least 10% as compared to a reference level, for example, an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level. In the context of a marker or symptom, an "increase" is a statistically significant increase in such level.

By "pharmaceutical composition" is meant any composition that contains one or more therapeutically or biologically active agent, such as a dual COX-2/sEH inhibitor, a COX-2 inhibitor, an sEH inhibitor, or a combination thereof, that is suitable for administration to a subject and that treats a disease or condition or reduces or ameliorates one or more symptoms of the disease. For the purposes of this invention, pharmaceutical compositions suitable for delivering a therapeutic or biologically active agent can include, for example, tablets, gelcaps, capsules, pills, powders, granulates, suspensions, emulsions, solutions, gels, hydrogels, oral gels, pastes, eye drops, ointments, creams, plasters, drenches, delivery devices, suppositories, enemas, injectables, implants, sprays, or aerosols. Any of these formulations can be prepared by well-known and accepted methods of art. See, for example, Remington: The Science and Practice of Pharmacy (21$^{st}$ ed.), ed. A. R. Gennaro, Lippincott Williams & Wilkins, 2005, and Encyclopedia of Pharmaceutical Technology, ed. J. Swarbrick, Informa Healthcare, 2006, each of which is hereby incorporated by reference.

By "pharmaceutically acceptable diluent, excipient, carrier, or adjuvant" is meant a diluent, excipient, carrier, or adjuvant that is physiologically acceptable to the subject while retaining the therapeutic properties of the pharmaceutical composition with which it is administered. One exemplary pharmaceutically acceptable carrier is physiological saline. Other physiologically acceptable diluents, excipients, carriers, or adjuvants and their formulations are known to one skilled in the art (see, e.g., U.S. Patent Application Publication No. 2012/0076812).

A "subject" is a vertebrate, such as a mammal (e.g., primates and humans). Mammals also include, but are not limited to, farm animals (such as cows), sport animals (e.g., horses), pets (such as cats and dogs), mice, and rats. A subject to be treated according to the methods described herein (e.g., a subject having or at risk of developing a cytokine and/or lipid surge, e.g., a subject having a disease such as cancer and/or a disease caused by an infective agent, e.g., a bacterium, virus, fungus, or parasite; also see below) may be one who has been diagnosed by a medical practitioner as having such a condition. Diagnosis may be performed by any suitable means. A subject in whom the development of an infection is being prevented may or may not have received such a diagnosis. One skilled in the art will understand that a subject to be treated according to the present invention may have been subjected to standard tests or may have been identified, without examination, as one at high risk due to the presence of one or more risk factors.

As used herein, and as well understood in the art, "treatment" is an approach for obtaining beneficial or desired results, such as clinical results. Beneficial or desired results can include, but are not limited to, alleviation or amelioration of one or more symptoms or conditions; diminishment of extent of disease, disorder, or condition; stabilization (i.e., not worsening) of a state of disease, disorder, or condition; prevention of spread of disease, disorder, or condition; delay or slowing the progress of the disease, disorder, or condition; amelioration or palliation of the disease, disorder, or condition; and remission (whether partial or total), whether detectable or undetectable. "Palliating" a disease, disorder, or condition means that the extent and/or undesirable clinical manifestations of the disease, disorder, or condition are lessened and/or time course of the progression is slowed or lengthened, as compared to the extent or time course in the absence of treatment.

Other features and advantages of the invention will be apparent from the following detailed description, the drawings, and the claims.

BRIEF DESCRIPTION OF THE DRAWINGS

FIGS. 1A and 1B shows the percent survival of mice co-injected intraperitoneally with cisplatin (FIG. 1A) or paclitaxel (FIG. 1B) generated ID8 debris ($9 \times 10^5$ dead cells) and ID8 living cells ($1 \times 10^6$) (n=5 mice per group). Kaplan-Meier analysis indicated significantly shortened survival in mice co-injected with (FIG. 1A) cisplatin- (log-rank test=9.65, *p=0.0019) or (FIG. 1B) paclitaxel- (log-rank test=9.85, *p=0.0017) generated ID8 debris and ID8 living cells compared to ID8 living cells alone. Image shows representative mice on day 56 post-injection. Dashed circle indicates ascites in mice co-injected with paclitaxel-generated debris and ID8 living cells.

FIGS. 2A-2C show annexin V/propidium iodide (PI) analysis of ID8 cells treated with cisplatin (FIG. 2A; 30 µM, 48 hours), carboplatin (FIG. 2B; 100 µM, 72 hours), or paclitaxel (FIG. 2C; 1 µM, 48 hours) compared to vehicle. Images show representative plots of viable (annexin V−/PI−; lower left quadrant), apoptotic (annexin V+/PI−; lower right quadrant), necrotic (annexin V−/PI+; upper left quadrant), and late apoptotic/necrotic (annexin V+/PI+; upper right quadrant) cells. Bar graphs are presented as percent (%) cell death (means)±S.E.M. n=3/group.*p<0.05 vs. vehicle.

FIGS. 2D and 2E show annexin V/propidium iodide (PI) analysis of OVCAR5 cells treated with carboplatin (FIG. 2D; 100 µM, 72 hours) or paclitaxel (FIG. 2E; 1 µM, 48 hours) compared to vehicle. Images show representative plots of viable (annexin V−/PI−; lower left quadrant), apoptotic (annexin V+/PI−; lower right quadrant), necrotic (annexin V−/PI+; upper left quadrant), and late apoptotic/necrotic (annexin V+/PI+; upper right quadrant) cells. Bar graphs are presented as percent (%) cell death (means) ±S.E.M. n=3/group.*p<0.05 vs. vehicle.

FIG. 3A shows subcutaneous debris-stimulated ovarian tumor growth in C57BL/6 mice co-injected with carboplatin- or paclitaxel-generated ID8 debris ($9 \times 10^5$ dead cells) and/or ID8 living cells ($5 \times 10^6$). n=5 mice/group. *p<0.05 vs. ID8 living cells alone.

FIG. 5A shows a cytokine array of conditioned medium from primary human monocyte-derived macrophages alone vs, macrophages stimulated with paclitaxel-generated OVCAR5 debris.

FIGS. 6A and 6B show annexin V/propidium iodide (PI) analysis of RAW264.7 murine macrophages (FIG. 6A) or B/CMBA.Ov murine ovarian epithelial cells (FIG. 6B) treated with PTUPB (5 µM) for 24 hours compared to vehicle. Images show representative plots of viable (annexin V−/PI−; lower left quadrant), apoptotic (annexin V+/PI−; lower right quadrant), necrotic (annexin V−/PI+; upper left quadrant), and late apoptotic/necrotic (annexin V+/PI+; upper right quadrant) cells. Bar graphs are presented as percent (%) cell death (means)±S.E.M. n=3/group. n.s.=not significant.

FIGS. 11A-11C show percent survival of mice co-injected intraperitoneally with paclitaxel- (FIG. 11A) or carboplatin- (FIG. 11B) generated ID8 debris ($9\times10^5$ dead cells) and ID8 living cells ($1\times10^6$). FIG. 11C shows percent survival of mice co-injected orthotopically with paclitaxel-generated ID8 debris ($9\times10^5$ dead cells) and ID8 living cells ($1\times10^6$). Image shows representative orthotopic tumors on day 62 post-injection. Scale bar: 1 cm. Systemic treatment with PTUPB (30 mg/kg/day) or control initiated 4 weeks post-injection. n=4-5 mice/group. Kaplan-Meier analysis and log-rank testing indicated significantly prolonged survival in mice treated with PTUPB compared to control in the FIG. 11A paclitaxel-generated (log-rank test=9.70, *p=0.0018) and FIG. 11B carboplatin-generated (log-rank test=9.85, *p=0.0017) debris-stimulated intraperitoneal ovarian tumor models, as well as the FIG. 11C paclitaxel-generated debris-stimulated orthotopic ovarian tumor model (log-rank test=7.91, *p=0.005).

FIG. 12 shows that aflatoxin B1 (AFB1)-generated liver tumor cell dead cells ("debris") (Hep1-6) stimulates tumor growth. C57BL/6 mice co-injected subcutaneously with AFB1-generated Hepa 1-6 debris ($9\times10^5$) and/or living Hepa 1-6 cells ($6.25\times10^6$). n=5 mice/group.

DETAILED DESCRIPTION

Figure 1B:
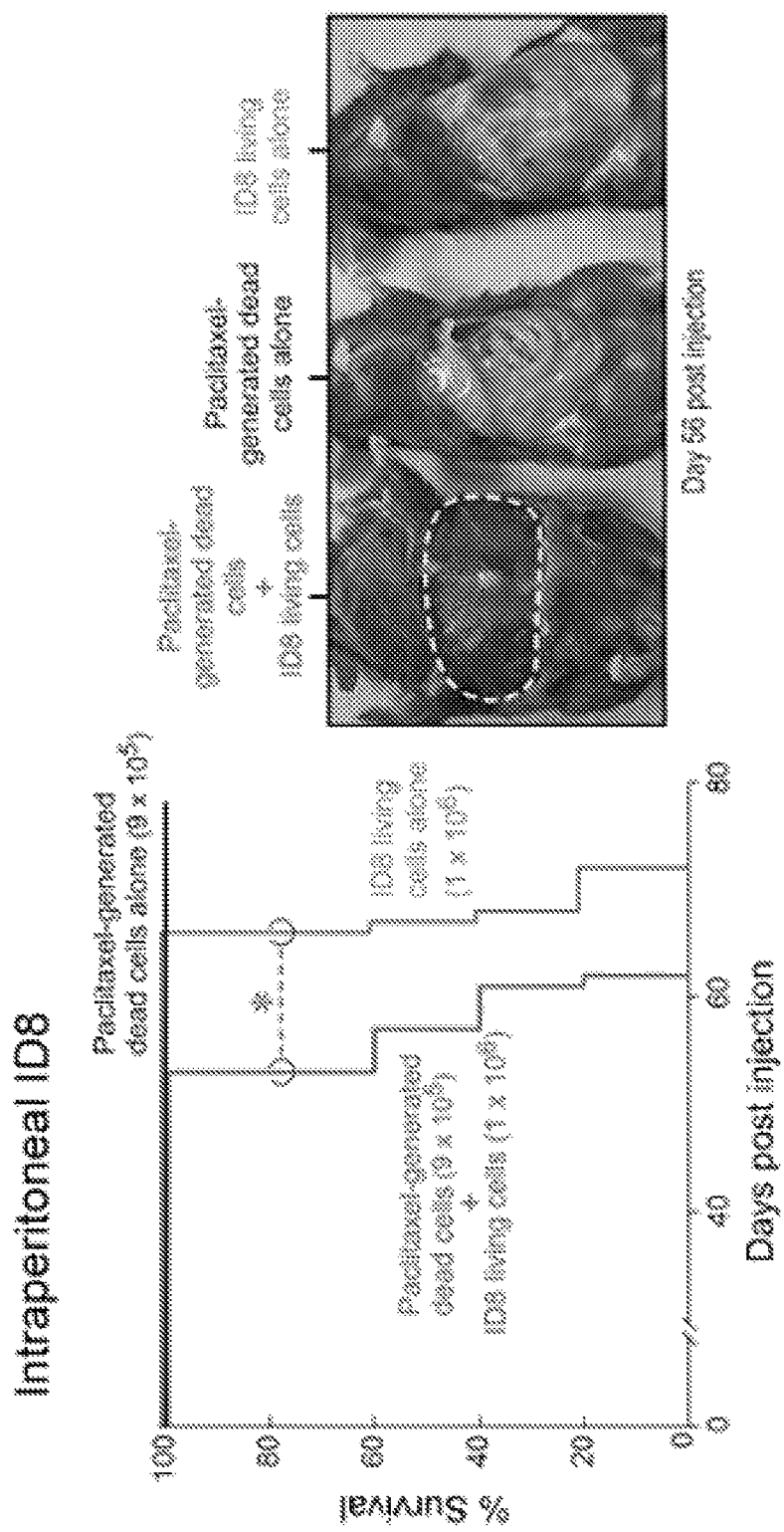

The invention provides methods and compositions for use in treating, suppressing, or preventing detrimental cytokine and/or lipid mediator surges that can result from a variety of different diseases, conditions, and therapeutic treatments. The invention additionally provides methods and compositions for use in treating, suppressing, or preventing diseases or conditions that are caused by detrimental cytokine and/or lipid mediator surge or storm. According to the methods of the invention, a subject having or at risk of developing a cytokine and/or lipid mediator surge, or a disease or condition caused by or otherwise associated with such a surge or storm, is treated with a dual inhibitor of cyclooxygenase-2 (COX-2) and soluble epoxide hydrolase (sEH), or a combination of a COX-2 inhibitor and an sEH inhibitor. These treatments are optionally carried out in combination with additional treatments of the disease or condition of the subject. The methods and compositions of the invention are described in further detail, as follows.

Diseases, Conditions, and Treatments Characterized by Cytokine/Lipid Surge

Cytokine/lipid surge can result from a large variety of different diseases and conditions, as well as from treatment of diseases or conditions. In addition, certain diseases or conditions (e.g., cancer and/or other inflammatory diseases including stroke, infection, epilepsy, brain infarct, acute respiratory distress condition, asthma, liver and pulmonary and cardiac fibrosis, kidney fibrosis, portal hypertension, fatty liver, atherosclerosis, abdominal aortic aneurysm, dyslipidemia, obesity, allergy-induced inflammation, myocardial infarction, graft stenosis, traumatic brain injury, neuroinflammation, intracerebral hemorrhage, depression, social defeat stress, periodontitis, pain, acute kidney injury, pancreatitis, NSAID-induced and diclofenac-induced ulcers, diabetes, hypertension, cancer (e.g. brain, pancreatic, ovarian, colon, bladder, head and neck, lung, and gastric), inflammatory bowel disease, stem cells, cystic fibrosis, scleroderma, fever, acute lung injury, chronic obstructive pulmonary disease, rituximab therapy (e.g., B cell ablation), procedures such as surgery (e.g., cardiac bypass), chemotherapy, irradiation, cancer immunotherapy (e.g., chimeric antigen receptor-modified T-cell therapy), cancer B cell therapy (e.g., anti-CD28 antibody), treatment with agonist antibodies for cancer (e.g., TGN1412), graft vs host disease (GVHD); stem cell transplantation, sepsis, multiple organ dysfunction syndrome (MODS) after surgical infection, sepsis, toxic shock syndrome, viral diseases (e.g., influenza virus such as avian H5N1 influenza virus infection, Ebola, dengue, variola virus), bacterial infections (e.g., Gram-negative bacterium *Francisella tularensis*), fungal infections, multiple sclerosis, severe acute respiratory syndrome (SARS) (e.g. secondary to drug use or inhalation of toxins), malaria, burns/trauma/surgery, vaccines, hepatitis, fulminant hepatic failure, chronic liver diseases, carcinogens (e.g., aflatoxins, asbestos, and nitrosamines), Epstein-Barr virus-associated hemophagocytic lymphohistiocytosis, rheumatic diseases (systemic juvenile idiopathic arthritis (JIA) and its adult analog, adult-onset Still's disease (AOSD), parasites, tapeworm, and Langerhans cell histiocytosis (LCH) that result therefrom (e.g., cancer)) can be caused or exacerbated by such surges. Examples of these diseases, conditions, and treatments are provided below. The methods of the invention include the treatment of subjects (e.g., human patients) having or at risk of developing a cytokine and/or lipid surge, which may be caused by one or more of these diseases, conditions, or treatments, or which may cause one or more of these diseases or conditions. Accordingly, subjects having one or more of these diseases or conditions (or subject to one or more the treatments) can be treated according to the methods of the invention. Additionally, subjects at risk of developing one or more disease or condition that is caused or exacerbated by a cytokine and/or lipid surge (e.g., cancer, such as carcinogen induced cancer), can be treated according to the method of the invention. Furthermore, the method of the invention can be used to prevent escape of tumors from dormancy.

Cytokine and/or lipid surge may result from infection by, e.g., bacteria, viruses, fungi, or parasites. Examples of such infections include infection by a Gram-negative bacterium (e.g., *Francisella tularenis*), influenza virus (e.g., influenza A virus, such as avian influenza A H7N9, H1N1, and H5N1 viruses), human coronavirus, hantavirus, flavivirus (e.g., a dengue virus), Ebola virus, SARS virus, Epstein-Barr virus (causing, e.g., EBV-associated hemophagocytic lymphohistiocytosis), variola virus, and malaria parasite (e.g., *Plasmodium falciparum*). Cytokine/lipid surge may further result from or be characteristic of a severe reaction of the body to infection (e.g., by a pathogen listed above) including, e.g., sepsis, septic shock, multiple organ dysfunction syndrome (MODS), or toxic shock syndrome (TSS).

Cytokine and/or lipid surge may also be caused by conditions resulting in damage or insult to the body including, e.g., a physical, chemical, or biological damage or insult, as well as non-infectious disease processes, including cancer and non-cancer-related disease processes. Accordingly, such surges can be caused by trauma, injury, burn, exposure to toxic materials (e.g., bacterial toxins, mycotoxins (e.g., aflatoxin B1), toxic chemicals, carcinogens (for example, alcohol (e.g., ethanol), n-nitrosodimethylamine (NDMA) and other nitrosamines, aldehydes, cyclosporine, asbestos, arsenic, benzene, cyclophosphamide, tamoxifen, and vinyl chloride)), acute respiratory distress syndrome secondary to drug use or inhalation of toxins, acute pancreatitis or hepatitis (due to, e.g., chronic alcohol exposure), fulminant hepatic failure, multiple sclerosis, rheumatic diseases (e.g., systemic juvenile idiopathic arthritis (JIA) and adult-onset Still's disease (AOSD)), and Langerhans cell histiocytosis (LCH).

In addition to the above, cytokine and/or lipid surge may be caused by treatment of an underlying disease or condition, rather than (or in addition to) the disease or condition itself. Examples of such treatments include surgery (e.g., cardiac bypass surgery), immunotherapy, chemotherapy, radiation, and cell or tissue-based therapies (e.g., bone marrow or stem cell transplantation (e.g., allogeneic hematopoietic stem-cell transplantation), which may lead to graft-versus host disease, and T-cell therapy, including CAR-T cell therapy). Specific, non-limiting examples of immunotherapy include treatment with therapeutic antibodies (e.g., rituximab, anti-CD28 antibody theralizumab/TGN1412, anti-PD1 antibodies, anti-PDL1 antibodies, and anti-CTLA antibodies), CAR-T cells (e.g., CAR-T cells directed against CD19 or other markers of hematopoietic malignancies), cytokines (e.g., IL-2), and vaccination. Examples of chemotherapy include platinum-based agents (e.g., cisplatin, carboplatin, oxaliplatin, and nedaplatin), taxane-based agents (e.g., paclitaxel and docetaxel), nitrogen mustards (e.g., mechlorethamine, cyclophosphamide, melphalan, chlorambucil, ifosfamide, and busulfan), nitrosoureas (e.g., N-nitroso-N-methylurea (MNU), carmustine (BCNU), lomustine (CCNU), semustine (MeCCNU), fotemustine, streptozotocin), tetrazines (e.g., dacarbazine, mitozolomide, temozolomide), and aziridines (e.g., thiotepa, mytomycin and diaziquone (AZQ)), anti-folates (e.g., methotrexate and pemetrexed), fluoropyrimidines (e.g., fluorouracil and capecitabine), deoxynucleotisde analogues (e.g., cytarabine, gemcitabine, decitabine, azacitidine, fludarabine, nelarabine, cladribine, clofarabine, and pentostatin), thiopurines (e.g., thioguanine, and mercaptopurine), *vinca* alkaloids (e.g., vincristine, vinblastine vinorelbine, vindesine, and vinflunine), topoisomerase inhibitors (e.g., etoposide, teniposide, irinotecan, doxorubicin, topotecan, mitoxantrone, novobiocin, merbarone, and aclarubicin), and cytotoxic antibiotics (e.g., doxorubicin, daunorubicin, epirubicin, idarubicin, pirarubicin, aclarubicin, mitoxantrone, mitomycin C, mitoxantrone, and actinomycin).

In view of the above, patients that can be treated using the methods and compositions of the invention include those having one or more of the diseases or conditions listed above, including cancer (e.g., ovarian cancer, leukemia, lymphoma, liver cancer, bone cancer, lung cancer, brain cancer, bladder cancer, gastrointestinal cancer, breast cancer, cardiac cancer, cervical cancer, uterine cancer, head and neck cancer, gallbladder cancer, laryngeal cancer, lip and oral cavity cancer, ocular cancer, melanoma, pancreatic cancer, prostate cancer, colorectal cancer, testicular cancer, and throat cancer). In addition, as noted above, the invention can also be used to prevent, delay, or suppress the development of cancer in a subject exposed to one or more carcinogens (e.g., see the list provided above). Accordingly, a subject who is at risk of exposure to one or more carcinogen, e.g., due to conditions in the environment or their employment, may be treated according to the method of the invention in order to reduce or prevent the risk of their developing cancer (e.g., a cancer listed above). Furthermore, the invention can be used for chemoprevention in patient populations which may have exposure to ethanol, aflatoxin B1, and/or other toxins. Aflatoxin B1 is a large contaminant of the world's food supply, including in grains and other foods at tropical and subtropical temperatures and is associated with 5-28% of hepatocellular carcinoma, the most common form of primary liver cancer.

In the case of cancer treatment (e.g., chemotherapy, radiation, surgery, or immunotherapy), the induced cytokine/lipid surge may not only be harmful in the manners noted above, it may also be pro-tumorigenic (e.g., as described in Example 3). Accordingly, the dual inhibitors of COX-2 and sEH, or a combination of a COX-2 inhibitor and an sEH inhibitor, may also prevent tumor formation, cancer development, tumor growth, or cancer recurrence in a subject having received a cancer treatment as described herein.

Exemplary cytokines that may be included in a cytokine or lipid surge include, but are not limited to, monocyte chemotactic protein-1 (MCP-1), interferon gamma-induced protein-10 (IP-10), interleukin (IL)-10, IL-6, IL-8, IL-1, IL-18, IL-1 receptor antagonist (IL-1Ra), tumor necrosis factor-$\alpha$ (TNF-$\alpha$), chemokine (C-X-C motif) ligand 2 (CXCL2), CXCL1, CXCL13, CXCL12, chemokine (C-C motif) ligand 4 (CCL4), CCL2, intracellular adhesion molecule-1 (ICAM-1), granulocyte-colony stimulating factor (G-CSF), granulocyte-macrophage colony-stimulating factor (GM-CSF), CCL5, plasminogen activator inhibitor-1 (PAI-1), osteopontin, matrix metallopeptidase 9 (MMP9), placental growth factor-2 (PIGF-2), pentraxin 3 (PTX-3), fractalkine, angiopoietin-1, and/or insulin like growth factor binding protein 1 (IGFBP1). Exemplary lipids that may be included in a cytokine or lipid surge include, but are not limited to, prostaglandin $F_{2\alpha}$ (PGF$_{2\alpha}$), prostaglandin $D_2$ (PGD$_2$), prostaglandin $J_2$ (PGJ$_2$), and/or 15-oxo-eicosatetraenoic acid (15-oxoETE).

Inhibitors and Treatment

The methods of the invention can be carried out using dual inhibitors of COX-2 and sEH. One example of such an inhibitor is 4-(5-phenyl-3-{3-[3-(4-trifluoromethyl-phenyl)-ureido]propyl}-pyrazol-1-yl) benzenesulfonamide (PTUPB). Other examples of such inhibitors that can be used in the invention include the compounds in Table 1, as well as the compounds that can be found, e.g., in WO 2012/082647, the contents of which are incorporated herein by reference.

TABLE 1

Dual COX-2 and sEH inhibitors

| Compound Name | Structure |
|---|---|
| 1-Adamantan-1-yl-3-[1-(4-methanesulfonyl-phenyl)-5-phenyl-1H-pyrazol-3-ylmethyl]-urea | |
| 1-Cycloheptyl-3[1-(4-methanesulfonyl-phenyl)-5-phenyl-1H-pyrazol-3-ylmethyl]urea | |
| 1-[1-(4-Methanesulfonyl-phenyl)-5-phenyl-1H-pyrazol-3-ylmethyl]-3-phenyl-urea | |
| 1-[1-(4-Methanesulfonyl-phenyl)-5-phenyl-1H-pyrazol-3-ylmethyl]-3-(4-trifluoromethoxy-phenyl)-urea | |
| 1-[1-(4-Methanesulfonyl-phenyl)-5-phenyl-1H-pyrazol-3-ylmethyl]-3-(4-trifluoromethyl-phenyl)-urea | |
| 1-[1-(4-Methanesulfonyl-phenyl)-5-phenyl-1H-pyrazol-3-ylmethyl]-3-(3-trifluoromethyl-phenyl)-urea | |

TABLE 1-continued

Dual COX-2 and sEH inhibitors

| Compound Name | Structure |
|---|---|
| 4-{5-Phenyl-3-[3-(3-trifluoromethyl-phenyl)-ureidomethyl]pyrazol-1-yl}-benzenesulfonamide | |
| 1-[5-tert-Butyl-1-(4-methanesulfonyl-phenyl)-1H-pyrazol-3-ylmethyl]-3-(3-trifluoromethyl-phenyl)-urea | |
| 4-{5-Phenyl-3-[3-(3-trifluoromethyl-phenyl)-ureido]pyrazol-1-yl}-benzenesulfonamide | |
| 4-(5-Phenyl-3-{2-[3-(3-trifluoromethyl-phenyl)-ureido]ethyl}-pyrazol-1-yl)-benzenesulfonamide | |
| 1-{3-[1-(4-Methanesulfonyl-phenyl)-5-phenyl-1H-pyrazol-3-yl]propyl}-3-(3-trifluoromethyl-phenyl)-urea | |
| 4-(5-Phenyl-3-{3-[3-(3-trifluoromethyl-phenyl)-ureido]propyl}-pyrazol-1-yl)-benzenesulfonamide | |

TABLE 1-continued

Dual COX-2 and sEH inhibitors

| Compound Name | Structure |
| --- | --- |
| 4-(5-p-Tolyl-3-{3-[3-(3-trifluoromethyl-phenyl)-ureido]-propyl}-pyrazol-1-yl)-benzenesulfonamide | |
| 4-(3-{3-[3-(2,6-Diisopropyl-phenyl)-ureido]-propyl}-5-phenyl-pyrazol-1-yl)-benzenesulfonamide | |
| 4-{5-Phenyl-3-[3-(3-phenyl-ureido)-propyl]-pyrazol-1-yl}-benzenesulfonamide | |
| 4-{3-[3-(3-Adamantan-1-yl-ureido)-propyl]-5-phenyl-pyrazol-1-yl}-benzenesulfonamide | |
| 4-{3-[3-(3-Cycloheptyl-ureido)-propyl]-5-phenyl-pyrazol-1-yl}-benzenesulfonamide | |
| 4-(3-{3-[3-(4-Chloro-phenyl)-ureido]-propyl}-5-phenyl-pyrazol-1-yl)-benzenesulfonamide | |

TABLE 1-continued

Dual COX-2 and sEH inhibitors

| Compound Name | Structure |
|---|---|
| 4-(5-Phenyl-3-{3-[3-(4-trifluoromethyl-phenyl)-ureido]propyl}-pyrazol-1-yl)-benzenesulfonamide | |
| 4-(5-Phenyl-3-{3-[3-(4-trifluoromethoxy-phenyl)-ureido]propyl}-pyrazol-1-yl)-benzenesulfonamide | |

The methods of the invention can also be carried out using combinations of separate inhibitors of COX-2 and sEH. COX-2 inhibitors that can be used include, e.g., celecoxib, as well as the nonsteroidal anti-inflammatory drugs (NSAIDs) listed in Table 2. sEH inhibitors that can be used include, e.g., TPPU, t-TUCB, TUPS, t-AUCB, and AEPU, as well as the compounds provided in Table 3. COX-2 inhibitors and sEH inhibitors can used in the invention in any combination. The invention also includes pharmaceutical compositions and kits including the combinations.

TABLE 2

NSAIDs for COX-2 inhibition

| Compound Name | Structure |
|---|---|
| Aspirin | |
| Ibuprofen | |
| Naproxen | |

TABLE 2-continued

NSAIDs for COX-2 inhibition

| Compound Name | Structure |
|---|---|
| Ketorolac | |
| Indomethacin | |
| Diclofenac | |
| Piroxicam | |

TABLE 2-continued
NSAIDs for COX-2 inhibition
| Compound Name | Structure |
|---|---|
| Mefenamic acid | 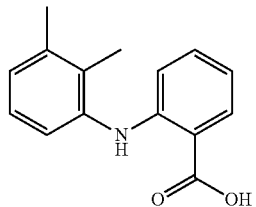 [SMILES: Cc1cccc(Nc2ccccc2C(=O)O)c1C] |
| Nimesulide | 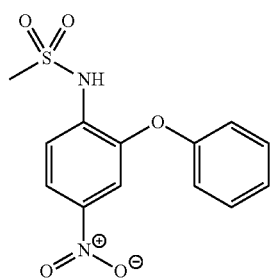 [SMILES: CS(=O)(=O)Nc1ccc([N+](=O)[O-])cc1Oc1ccccc1] |
| Celebrex (celecoxib) | 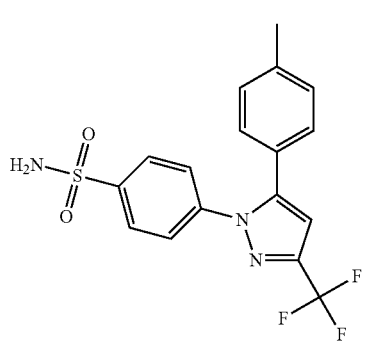 [SMILES: Cc1ccc(-c2cc(C(F)(F)F)nn2-c2ccc(S(N)(=O)=O)cc2)cc1] |
| Vioxx (rofecoxib) | |
| FR122047 | |
| SC-560 | |
TABLE 3
sEH inhibitors
| Compound Name | Structure |
|---|---|
| 12-(3-adamantan-1-yl-ureido) dodecanoic acid (AUDA) | 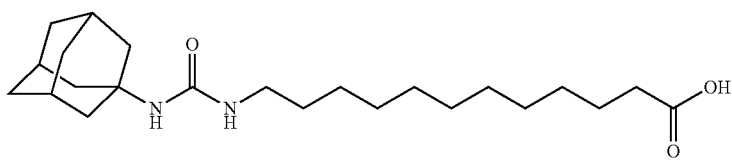 [SMILES: O=C(O)CCCCCCCCCCCNC(=O)NC12CC3CC(CC(C3)C1)C2] |
| 1-adamantanyl-3-{5-[2-(2-ethoxyethoxy)ethoxy]pentyl]}urea (AEPU) | 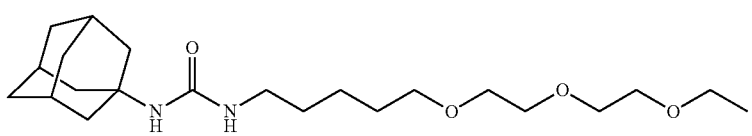 [SMILES: CCOCCOCCOCCCCCNC(=O)NC12CC3CC(CC(C3)C1)C2] |
| 1-(1-acetypiperidin-4-yl)-3-adamantanylurea (APAU) | 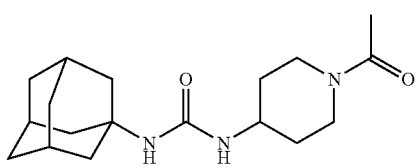 [SMILES: CC(=O)N1CCC(NC(=O)NC23CC4CC(CC(C4)C2)C3)CC1] |

TABLE 3-continued sEH inhibitors

| Compound Name | Structure |
|---|---|
| trans-4-[4-(3-Adamantan-1-yl-ureido)-cyclohexyloxy]benzoic acid (t-AUCB) | |
| cis-4-[4-(3-trifluoromethoxyphenyl-1-ureido)-cyclohexyloxy]fluorobenzene (TUCF) | |
| 1-trifluoromethoxyphenyl-3-(1-acetylpiperidin-4-yl) urea (TPAU) | |
| cis-4-[4-(3-Adamantan-1-yl-ureido)-cyclohexyloxy]benzoic acid (c-AUCB) | |
| cis-4-{4-[3-(4-trifluoromethoxyphenyl-1-ureido)-cyclohexyloxy]benzoic acid (c-TUCB) | |
| 1-(1-methylsulfonyl-piperidin-4-yl)-3-(4-trifluoromethoxy-phenyl)-urea (TUPS) | |
| trans-4-{4-[3-(4-Trifluoromethoxy-phenyl)-ureido]-cyclohexyloxy}-benzoic acid (t-TUCB) | |
| 1-trifluoromethoxyphenyl-3-(1-propionylpiperidin-4-yl) urea (TPPU) | |
| trans-4-{4-[3-(4-Chloro-phenyl)-ureido]-cyclohexyloxy}-benzoic acid (t-CUCB) | |
| trans-N-Methyl-4-{4-[3-(4-Trifluoromethoxy-phenyl)-ureido]-cyclohexyloxy}-benzamide (t-MTUCB) | |

TABLE 3-continued sEH inhibitors

| Compound Name | Structure |
| --- | --- |
| trans-4-[4-[3-Cyclohexyl-ureido)-cyclohexyloxy]-N-methyl-benzamide (t-CUCMB) | |
| trans-4-{4-[3-(4-chloro-3-trifluoromethyl-phenyl)-ureido]-cyclohexyloxy}-pyridine-2-carboxylic acid methylamide (t-CUPM) | |
| trans-4-{4-[3-(4-Trifluoromethyl-phenyl)-ureido]-cycyclohexyloxy}-benzoic acid (t-TPUCB) | |
| 1-(1-Isobutyryl-peperidin)-4-yl)-3-(4-trifluoromethyl-phenyl)-urea (ITPU) | |
| 1-[1-(Butane-1-sulfonyl)-piperidin-4-yl]-3-(4-trifluoromethoxy-phenyl)-urea (BPTU) | |
| 3,4,4'-trichlorocarbanilide (TCC) | |
| cis-N-{[+4-cyano-2-(trifluoromethyl)phenyl]methyl}-3-{[4-methyl-6-(methylamino)-1,3,5-triazin-2-yl]amino}cyclohexanecarboxamide (GSK2256294) | |

TABLE 3-continued sEH inhibitors

| Compound Name | Structure |
|---|---|
| 1-(3-(1-(4-methoxyphenyl)-5-phenyl-1H-pyrazol-3-yl)propyl)-3-(4-(trifluoromethyl)phenyl)urea (Ome-21i) | 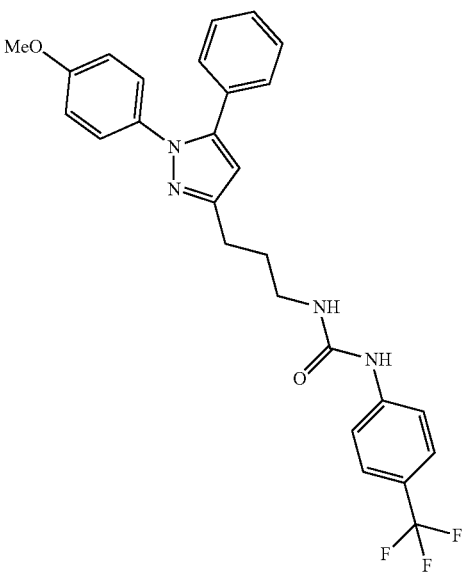 [SMILES: COc1ccc(-n2nc(CCCNC(=O)Nc3ccc(C(F)(F)F)cc3)cc2-c2ccccc2)cc1] |

Dual COX-2/sEH inhibitors, as well as any combination of a COX-2 inhibitor and an sEH inhibitor (e.g., celecoxib and Ome-21i), COX-1 inhibitor and sEH inhibitor (e.g., sc-560 and sEH inhibitor), NSAID and sHE inhibitor (e.g. aspirin and sEH inhibitor), as NSAIDs also inhibit COX-2, can optionally be combined with other agents used to suppress storm or surge including, e.g., anti-cytokine therapies such as the IL-6 receptor antagonist tocilizumab, and immunosuppressive agents such as steroids. Other agents used to suppress such a surge include OX40 IG, steroids, diphenhydramine HCl, angiotensin-converting-enzyme inhibitors, angiotensin II receptor blockers, corticosteroids, gemfibrozil, free radical scavengers, and TNF-α blockers, each of which may be used in combination with the COX-2 inhibitors and sEH inhibitors described herein.

Additionally, the COX-2 and sEH inhibitors can optionally be used in combination with treatment of underlying disease or condition. For example, the inhibitors can be used in combination with a chemotherapeutic or immunotherapeutic agent as described herein.

The agents described herein are administered in amounts determined to be appropriate by those of skill in the art for the intended purpose. Thus, for example, the agents may be administered in an amount ranging from 0.1 mg to 10,000 mg, e.g., 1.0 mg to 1,000 mg or 10 mg to 500 mg. As noted above, the agents may be administered in conjunction with another treatment, such as a treatment that causes cytokine or lipid surge. In such instances, the agent can be administered before (e.g., at least 0.5, 1, 2, 3, 4, or 6 hours, or at least 1, 2, 3, or 4 days before), at the same time as, or after (e.g., at least 0.5, 1, 2, 3, 4, or 6 hours, or at least 1, 2, 3, or 4 days after) the treatment giving rise to the surge.

The invention is illustrated in the following, non-limiting examples.

EXAMPLES

Example 1. Materials and Methods

Methods used for preparation of chemotherapy-generated tumor cell debris (Sulciner et al. *J. Exp. Med.* 215(1):115-140 (2018); Chang et al. *FASEB J.* fj201800019RR (2018)), macrophage conditioned medium (Sulciner et al. *J. Exp. Med.* 215(1):115-140 (2018); Chang et al. *FASEB J.* fj201800019RR (2018)), flow cytometry (Sulciner et al. *J. Exp. Med.* 215(1):115-140 (2018); Chang et al. *FASEB J.* fj201800019RR (2018)), oxylipin profiling (LC-MS/MS) (Yang et al., *Anal. Chem.* 81(19):8085-8093 (2009)), and isolation of human monocyte-derived macrophages (Sulciner et al. *J. Exp. Med.* 215(1):115-140 (2018)) were all previously described. MTT proliferation assays (Roche, Basel, Switzerland), cytokine arrays (R&D Systems, Minneapolis, MN), and ELISAs (R&D Systems, Minneapolis, MN) were performed according to provided recommended protocols. For isolation of primary murine peritoneal macrophages, female C57BL/6 mice were intraperitoneally injected with zymosan A (1 mg) (Sigma Aldrich, Natick, MA) and peritoneal macrophages were collected 72 hours later by peritoneal lavage using sterile PBS. Full protocols are described below.

Cell Culture

ID8 murine ovarian tumor cells (Dr. Jack Lawler, Beth Israel Deaconess Medical Center, Boston, MA) were cultured in Dulbecco's Modified Eagle Medium (DMEM) supplemented with 10% fetal bovine serum (FBS) and 1% L-glutamine-penicillin-streptomycin (GPS). OVCAR5 human epithelial ovarian carcinoma cells (generously provided by Catherine Butterfield, Boston Children's Hospital, Boston, MA) were cultured in RPMI 1640 medium supplemented with 10% FBS and 1% GPS. RAW264.7 murine macrophages and B/CMBA. Ov murine ovarian epithelial cells were obtained from American Type Culture Collection (ATCC) (Manassas, VA) and cultured in ATCC DMEM supplemented with 10% FBS and 1% GPS.

Preparation of Chemotherapy-Generated Ovarian Tumor Cell Debris

Chemotherapy-generated murine (ID8) and human (OVCAR5) ovarian tumor cell debris were prepared by re-feeding 70% confluent T150 flasks with complete medium plus 1 µM paclitaxel (Cayman Chemical, Ann Arbor, MI) or 100 µM carboplatin (Sigma Aldrich, Natick, MA) and incubating for 48 or 72 hours, respectively, at 37° C. Cisplatin-generated ID8 debris was prepared by re-feeding 70% confluent T150 flasks with complete medium plus 30 µM cisplatin (Sigma Aldrich, Natick, MA) and incubating for 48 hours at 37° C. The resulting floating population (e.g., dead cells or "debris") was collected, counted via hemocytometer, and pelleted. The dead cells were resuspended with phosphate-buffered saline (PBS), pelleted, and resuspended again at the desired concentration in PBS.

Flow Cytometry

Murine (ID8) or human (OVCAR5) ovarian tumor cells were treated with vehicle or a chemotherapeutic agent (e.g., cisplatin, carboplatin, or paclitaxel) as described. B/CM-BA.Ov murine ovarian epithelial cells were treated with vehicle or PTUPB (1 or 5 µM) for 24 hours. The floating population (e.g., dead cells or "debris") was collected, and the remaining adhered cells were trypsinized and combined with the dead cells. RAW264.7 murine macrophages were treated with vehicle or PTUPB (5 µM) for 24 hours. The floating population was collected and the remaining adhered cells were detached using a cell scraper (Corning Inc., Corning, NY) and combined with the dead cells. Cells were counted via hemocytometer, pelleted, and resuspended in PBS at $1 \times 10^6$ cells/mL. Next, $2 \times 10^5$ cells were stained with annexin V and propidium iodide (PI) according to FITC Annexin V/Dead Cell Apoptosis Kit protocol (Life Technologies, Carlsbad, CA). Staining was assessed using the BD LSR Fortessa (BD Biosciences, San Jose, CA) at the Dana-Farber Cancer Institute Jimmy Fund Flow Cytometry Core, and analyzed using FlowJo software (Tree Star Inc., Ashland, OR). Experiments were performed three times with similar results.

Macrophage Conditioned Medium

Macrophages were treated with vehicle or PTUPB (1-10 µM) in Dulbecco's phosphate-buffered saline containing calcium and magnesium (PBS$^{+/+}$) (Lonza, Basel, Switzerland) and incubated for 2 hours at 37° C. Carboplatin- or paclitaxel-generated ID8 or OVCAR5 debris was added to murine or human macrophages, respectively, at a 1:4 (macrophage:dead cell body) ratio and incubated for 1 hour at 37° C. Next, plates were aspirated, macrophages were re-fed with serum-free medium, and incubated overnight at 37° C. The conditioned medium was collected the next day, centrifuged at 1100 rpm for 5 minutes to remove particulates, and stored at −20° C. until further analysis via cytokine array, ELISA, or LC-MS/MS. Collection of RAW264.7 murine macrophage conditioned medium was repeated using debris from three distinct collections for a total of three separate experiments. Collection of human monocyte-derived macrophage conditioned medium was repeated using peripheral blood monocytes from three different human donors and debris from three distinct collections for a total of three separate experiments. Collection of primary murine peritoneal macrophages was repeated using macrophages pooled from 5-10 C57BL/6 female mice and debris from two distinct collections for a total of two separate experiments.

Cytokine Arrays

In vivo cytokines (serum or ascites) or cytokines in conditioned medium of macrophages treated with PTUPB and exposed to paclitaxel- or carboplatin-generated debris, were assessed according to the protocols provided by Proteome Profiler Mouse Cytokine Array Kit Panel A, Proteome Profiler Mouse Angiogenesis Array Kit, or Proteome Profiler Human Cytokine Array Kit Panel A (R&D Systems, Inc., Minneapolis, MN). Array control allows for comparison between membranes. For in vivo analysis, n=2 mice/group (serum); n=1 mouse/group (ascites).

ELISA

For quantitation of pro-inflammatory cytokines, serum or conditioned medium from macrophages treated with PTUPB and stimulated with paclitaxel-generated ID8 debris or from paclitaxel-generated ID8 debris alone without macrophages was used according to the protocols provided in each ELISA kit (R&D Systems, Minneapolis, MN).

Proliferation Assay

Cell Proliferation Kit 1 (MTT) (Roche, Basel, Switzerland) was used according to recommended protocol to quantify proliferation. ID8 cells were plated at $5 \times 10^3$ cells/well in 96-well plates with DMEM supplemented with 1% FBS and 1% GPS and incubated overnight. Cells were re-fed with DMEM supplemented with 1% FBS and 1% GPS and vehicle or PTUPB (1, 5, or 10 µM). After a 24 hour incubation at 37° C., 10 µL of MTT reagent was added to each well and incubated for 4 hours at 37° C. Next, 100 µL of solubilizing solution was added to each well and incubated overnight at 37° C. VersaMax microplate reader (Molecular Devices, San Jose, CA) was used to quantify the results of the assay. Absorbance readings were normalized to vehicle. Experiments were performed three times with similar results.

Human Monocyte-Derived Macrophages

Human monocytes provided by healthy human volunteers from the Children's Hospital Boston blood bank were isolated by density-gradient Histopaque®-1077 (Sigma-Aldrich, Natick, MA). Macrophages were differentiated from monocyte cultures using RPMI medium with 10% FBS, 1% GPS, and 10 ng/mL GM-CSF (R&D Systems, Minneapolis, MN) for 7 days (37° C., 5% $CO_2$).

Primary Murine Peritoneal Macrophages

Female C57BL/6 mice were intraperitoneally injected with zymosan A (1 mg/mouse) (Sigma Aldrich, Natick, MA) to elicit peritoneal macrophages. Three days later, peritoneal macrophages were collected by peritoneal lavage using sterile PBS and plated in RPMI medium supplemented with 10% FBS and 1% GPS.

Oxylipin Profiling by LC-MS/MS

Oxylipins in conditioned medium from 3 biological repeats were analyzed by LC-MS/MS as described previously (Yang et al., *Anal. Chem.* 81(19):8085-8093 (2009)). In brief, 1 mL of medium was loaded onto the conditioned Oasis HLB solid phase extraction cartridge (Waters, Milford, MA), washed with 5% methanol solution, and eluted with 0.5 mL of methanol and 1.5 mL of ethyl acetate consequently. The elution was concentrated and reconstituted in 50 µL of methanol solution before injection into the UPLC/MS/MS system (Agilent 1200 SL and Sciex 4000 Qtrap system). The optimized parameters for LC-MS/MS were described in detail previously (Yang et al., supra).

In Vivo Studies

All animal studies were reviewed and approved by the Animal Care and Use Committee of Beth Israel Deaconess Medical Center, Boston, MA Mice were housed at a maximum of 5 animals per cage in a pathogen-free facility with unlimited access to sterile water and chow. Daily welfare evaluations and animal sacrifices were carried out according to the Committee guidelines. For murine injections, chemotherapy-generated murine (ID8) or human (OVCAR5) ovarian tumor cell debris was combined with ID8 or OVCAR5 living cells at equal volumes in PBS. Six-week-old female C57BL/6 (The Jackson Laboratory, Bar Harbor, ME) or SCID mice (Charles River, Cambridge, MA) were injected subcutaneously or intraperitoneally with 100 µL/mouse of ID8 or OVCAR5 cells, respectively. For orthotopic injections, 6-week-old C57BL/6 female mice were injected with 20 µL/mouse of matrigel (Becton Dickinson and Company, Franklin Lakes, NJ) mixed with paclitaxel-generated ID8 debris and/or ID8 living cells at a 1:1 (matrigel:cells) ratio directly into the right ovarian bursa. Systemic treatment with PTUPB (30 mg/kg/day) or control was administered via mini-osmotic pumps (Alzet Inc., Cupertino, CA) implanted into the peritoneum of the mice 4 weeks post-injection. Treatment ended 28 days after implantation of the pumps. Systemic chemotherapy with carboplatin (10 mg/kg q 3 days) or control that were initiated on the day of tumor cell injection.

Statistics

Statistical analyses for in vitro studies were performed using Student's two-tailed unpaired t-test. Data are represented as mean±S.E.M. with p-values less than 0.05 considered statistically significant. For in vivo studies, the Kaplan-Meier product-limit method and log-rank testing were used to evaluate survival differences over time after the day of tumor cell injection between mice co-injected with tumor cell debris and living cells vs. living cells alone. Data are represented as percent survival with p-values less than 0.01 considered statistically significant.

Abbreviations

Cyclooxygenase (COX); soluble epoxide hydrolase (sEH); cytochrome P450 (CYP450); epoxyeicosatrienoic acids (EETs); dihydroxyeicosatrienoic acids (DiHETEs); soluble epoxide hydrolase inhibitors (sEHIs); nonsteroidal anti-inflammatory drugs (NSAIDs); trans-4-[4-(3-Adamantan-1-yl-ureido)-cyclohexyloxy]-benzoic acid] (t-AUCB); 4-(5-phenyl-3-{3-[3-(4-trifluoromethyl-phenyl)-ureido]-propyl}-pyrazol-1-yl) benzenesulfonamide (PTUPB); 12,13-epoxy-9-keto-10(trans)-octadecenoic acid (EKODE); 15-deoxy-delta 12,14 prostaglandin $J_2$ (15d-$PGJ_2$).

Example 2. Dual Cyclooxygenase-2 (COX-2)/Soluble Epoxide Hydrolase (sEH) Inhibition for Suppressing Cytokine and Bioactive Lipid Secretion Epithelial ovarian cancer is the fifth leading cause of cancer-related deaths in women (Thibault et al., *Cancer Metastasis Rev.* 33(1):17-39 (2014)). Tumor recurrence in ovarian cancer following front-line platinum- and taxane-based chemotherapy occurs in 70% of patients, resulting in poor 5-year survival rates (Thibault et al., *Cancer Metastasis Rev.* 33(1):17-39 (2014)). Although chemotherapy, targeted therapy, or irradiation are mainstays in cancer treatment, tumor cells killed by the treatment ("tumor cell debris") may play a role in the tumor microenvironment to promote the growth of residual surviving cancer cells (Sulciner et al. *J. Exp. Med.* 215(1):115-140(2018); Chang et al. *FASEB J.* fj201800019RR (2018); Revesz, *Nature.* 178(4547):1391-1392 (1956); Huang Q et al., *Nat. Med.* 17(7):860-866 (2011); Gunjal et al., *J. Ovarian Res.* 8:20 (2015)). Chemo therapy promotes tumorigenesis, angiogenesis, and metastasis via apoptotic tumor cell-induced macrophage chemotaxis and pro-inflammatory cytokines (Roca et al., *J. Clin. Invest.* 128(1):248-266 (2018); Stanford et al., *J. Clin. Invest.* 124(11):4737-4752 (2014); Park et al., *Cancer Res.* 72(10):2522-2532 (2012); Ford et al., *Curr. Biol.* 25(5):577-588 (2015)). Thus, cytotoxic cancer therapy is a double-edged sword; the very treatment meant to control cancer is also helping it survive and grow by inducing a pro-tumorigenic microenvironment. Notably, a single dose of paclitaxel or carboplatin, the chemotherapeutic agents most commonly used in ovarian cancer, stimulates metastasis in mice (Liu et al., *J. Pathol.* 237:190-202 (2015)). However, the mechanisms of chemotherapy-induced tumor growth remain poorly understood, providing a challenge for the development of effective treatments (Abubaker et al., *Mol. Cancer.* 12:24 (2013); Poth et al., *Mol. Cancer. Ther.* 9(8):2430-2439 (2010); Karagiannis et al *Sci. Transl. Med.* 9(397) (2017); Volk-Draper et al., *Cancer Res.* 74(19):5421-5434 (2014); Chang et al., *Proc. Natl. Acad. Sci. USA.* 114(34):E7159-E7168 (2017)).

A detrimental consequence of chemotherapy is the induction of secreted pro-tumorigenic factors, including inflammatory cytokines, chemokines, pro-angiogenic growth factors, and danger signals (e.g., alarmins), which collectively create a pro-metastatic environment (Poth et al., *Mol. Cancer. Ther.* 9(8):2430-2439 (2010); Karagiannis et al *Sci. Transl. Med.* 9(397) (2017); Vyas et al., *Onco. Targets Ther.* 7:1015-1023 (2014)). Moreover, endogenously produced bioactive lipid molecules, collectively known as eicosanoids, may also contribute to the therapy-induced pro-metastatic tumor microenvironment (Kim et al., *Leukemia.* 26(1):106-116 (2012); Schneider et al., *Mol. Cancer Res.* 11(7):793-807 (2013); Schneider et al., *Mol. Cancer Res.* 12(11):1560-1573 (2014)). Eicosanoids are derived from arachidonic acid and are pivotal regulators of inflammatory responses (Krishnamoorthy et al., *Subcell. Biochem.* 49:145-168 (2008)). Chemotherapy or irradiation stimulates the release of tumor-promoting lipid mediators, including prostaglandins, platelet-activating factor (PAF), sphingosine-1-phosphate (S1P), ceramide-1-phosphate (C1P), and lysophosphatidic acid (LPA) into the tumor microenvironment (Huang Q et al., *Nat. Med.* 17(7):860-866 (2011); Schneider et al., *Mol. Cancer Res.* 11(7):793-807 (2013); Kurtova et al., *Nature.* 517(7533):209-213 (2015); da Silva et al., *Oncogenesis.* 6(1):e296 (2017)). Chemotherapy has been recently reported to stimulate the proliferation of ovarian cancer cells through a caspase-3-mediated arachidonic acid pathway (Cui et al., *Onco. Targets Ther.* 10:5817-5826 (2017)). Thus, chemotherapy-induced mediators including cytokines and bioactive lipids create a pro-tumorigenic environment via multiple pathways.

While prostaglandins have been extensively studied in cancer, investigation of oxylipins derived from cytochrome P450 (CYP) enzymes has primarily focused on inflammation and cardiovascular functions (Zeldin, *J. Biol. Chem.* 276(39):36059-36062 (2001)). CYP-derived epoxyeicosatrienoic acids (EETs) stimulate the resolution of inflammation by promoting the clearance of cellular debris by local macrophages and activating anti-inflammatory cytokine programs (Gilroy et al., *Proc. Natl. Acad. Sci. USA.* 113(23): E3240-3249 (2016); Bystrom et al., *PLoS One.* 8(9):e75107 (2013)). Clearance of tumor cell debris by macrophages has recently been shown to exhibit anti-tumor activity (Sulciner et al. *J. Exp. Med.* 215(1):115-140 (2018)). EETs are rapidly metabolized in the body by soluble epoxide hydrolase (sEH) to their corresponding dihydroxyeicosatrienoic acids (Di- HETEs) (Imig et al., *Nat. Rev. Drug Discov.* 8(10):794-805 (2009)). Pharmacological inhibitors of sEH (sEHIs) stabilize EETs, promote the formation of pro-resolving mediators such as lipoxins (e.g. lipoxin A4), and may counter-regulate pro-inflammatory cytokines (Schmelzer et al., *Proc. Natl. Acad. Sci. USA.* 102(28):9772-9777 (2005)). In fact, abrogation of sEH suppresses chronic inflammatory bowel disease (IBD) and IBD-associated tumor formation in IL-10 knockout mice (Zhang et al., *Mol. Carcinog.* (2012)). Further, inhibition of sEH reduces inflammation in multiple diseases including atherosclerosis, abdominal aortic aneurysm, dyslipidemia, hypertension, and diabetes in various mouse models (Imig et al., *Nat. Rev. Drug Discov.* 8(10): 794-805 (2009)). Strategies aimed at dampening the inflammatory response to tumor cell debris by blocking more than one pathway associated with production of pro-inflammatory mediators to prevent debris-stimulated tumor growth are poorly characterized.

In Example 3, it is demonstrated that a "surge" or series of pro-inflammatory cytokines and bioactive lipids induced by chemotherapy-generated tumor cell debris is suppressed by use of a dual COX-2/sEH inhibitor, PTUPB. Inhibition of debris-stimulated tumor growth was observed in an ovarian cancer model and resulted in sustained survival for over 120 days post-injection. To prevent tumor recurrence after therapy, it is important to neutralize the inherent tumor-promoting activity of therapy-generated debris. Thus, dual inhibition of COX-2/sEH represents a novel approach in cancer therapy to suppress chemotherapy-induced pro-inflammatory mediators and debris-stimulated tumor growth.

Figure 1C:
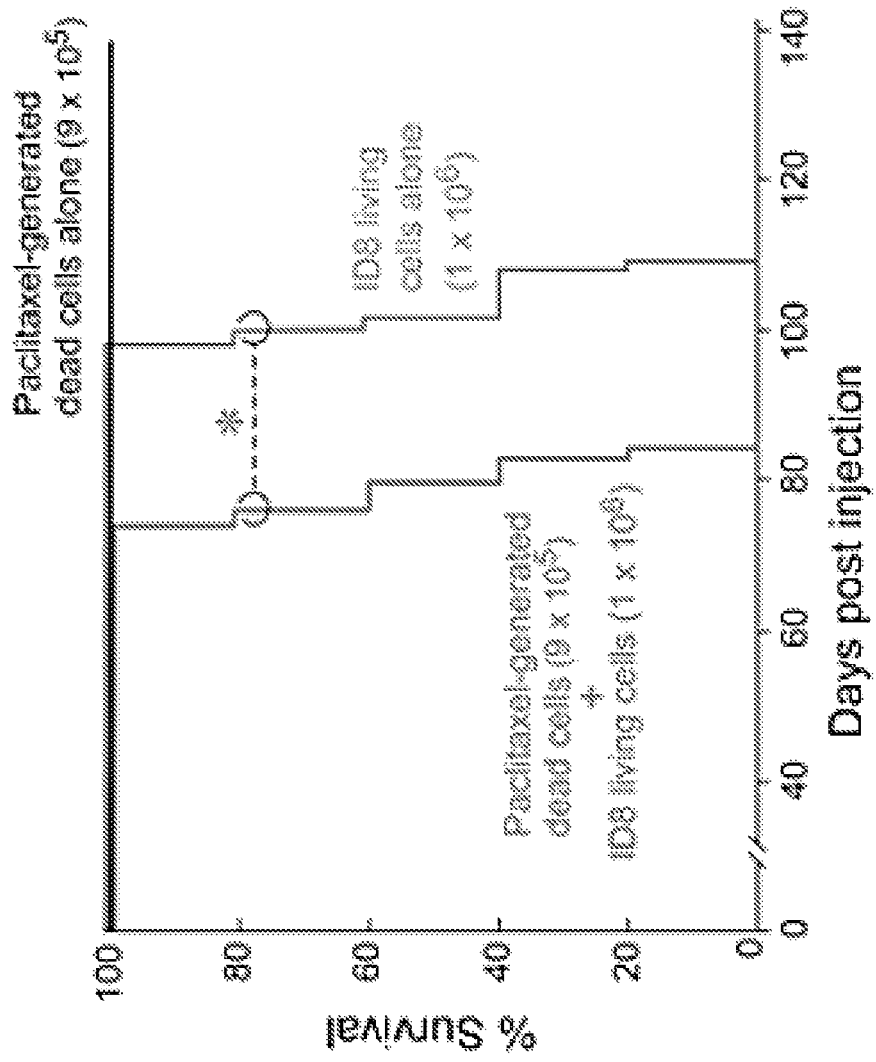
FIG. 1C shows percent survival of mice co-injected orthotopically with paclitaxel-generated ID8 debris ($9 \times 10^5$ dead cells) and ID8 living cells ($1 \times 10^6$) (n=5 mice/group). Kaplan-Meier analysis indicated significantly shortened survival in mice co-injected with paclitaxel-generated ID8 debris and ID8 living cells compared to ID8 living cells alone (log-rank test=6.00, *p=0.014).
Figure 2B:
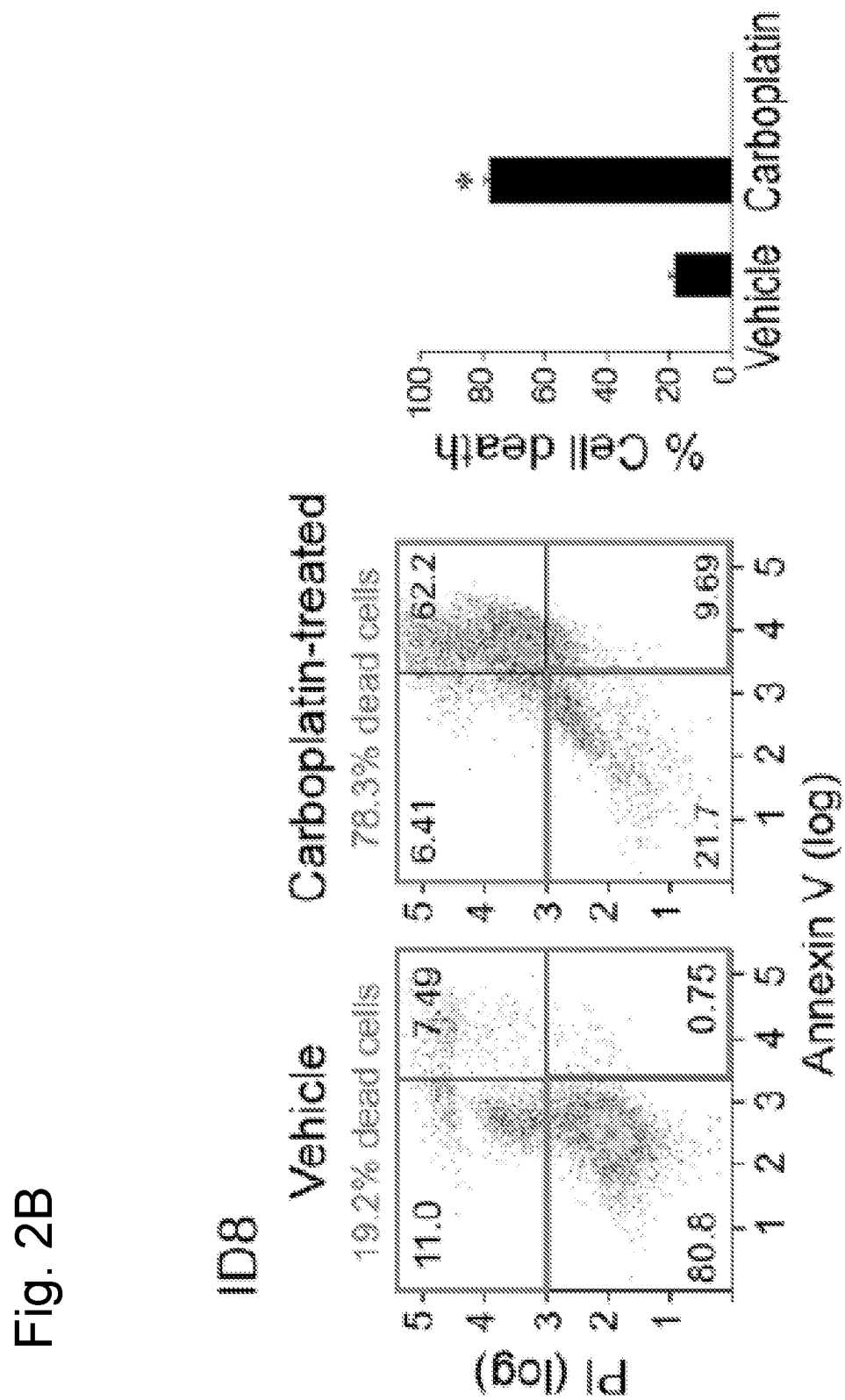
Figure 2C:
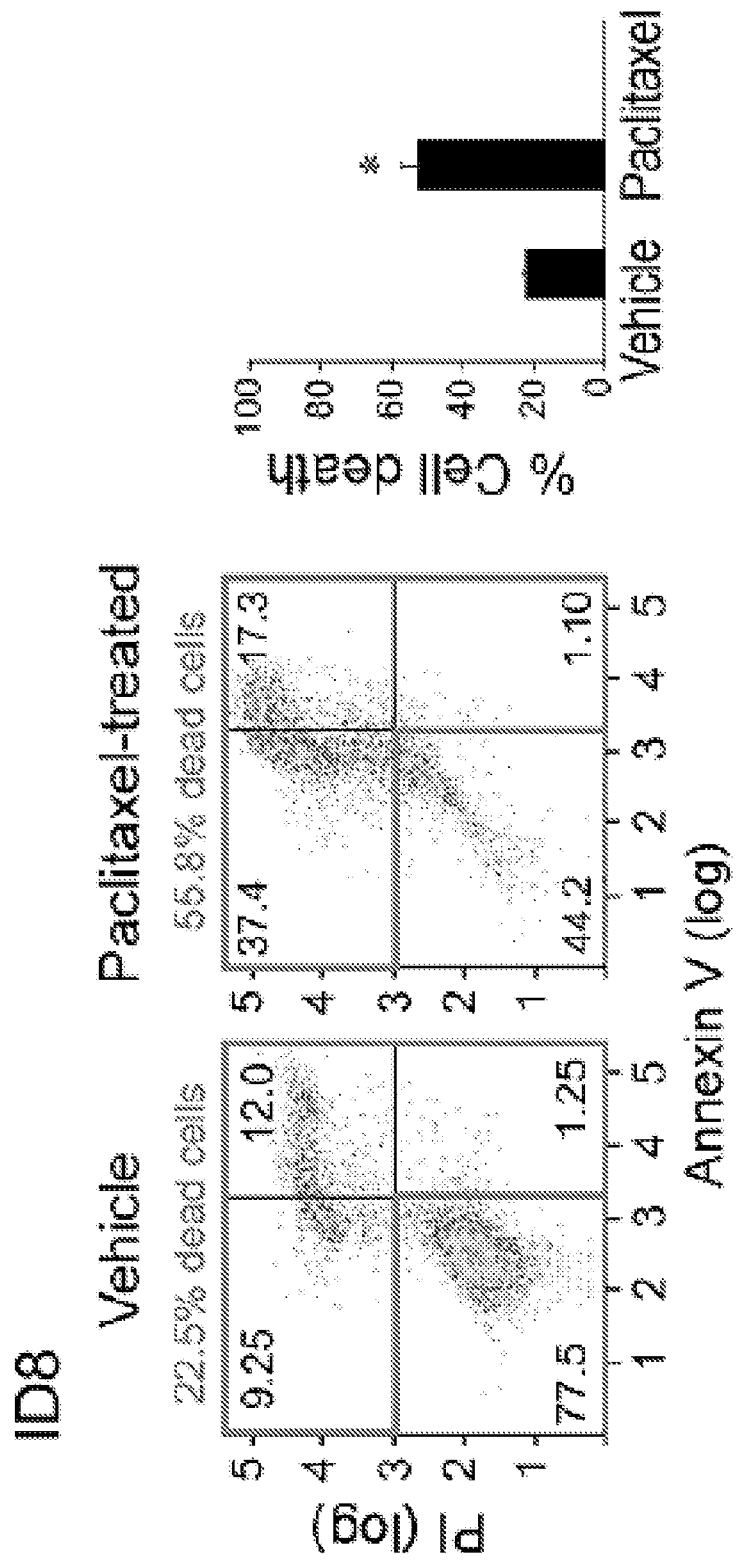
Figure 2E:
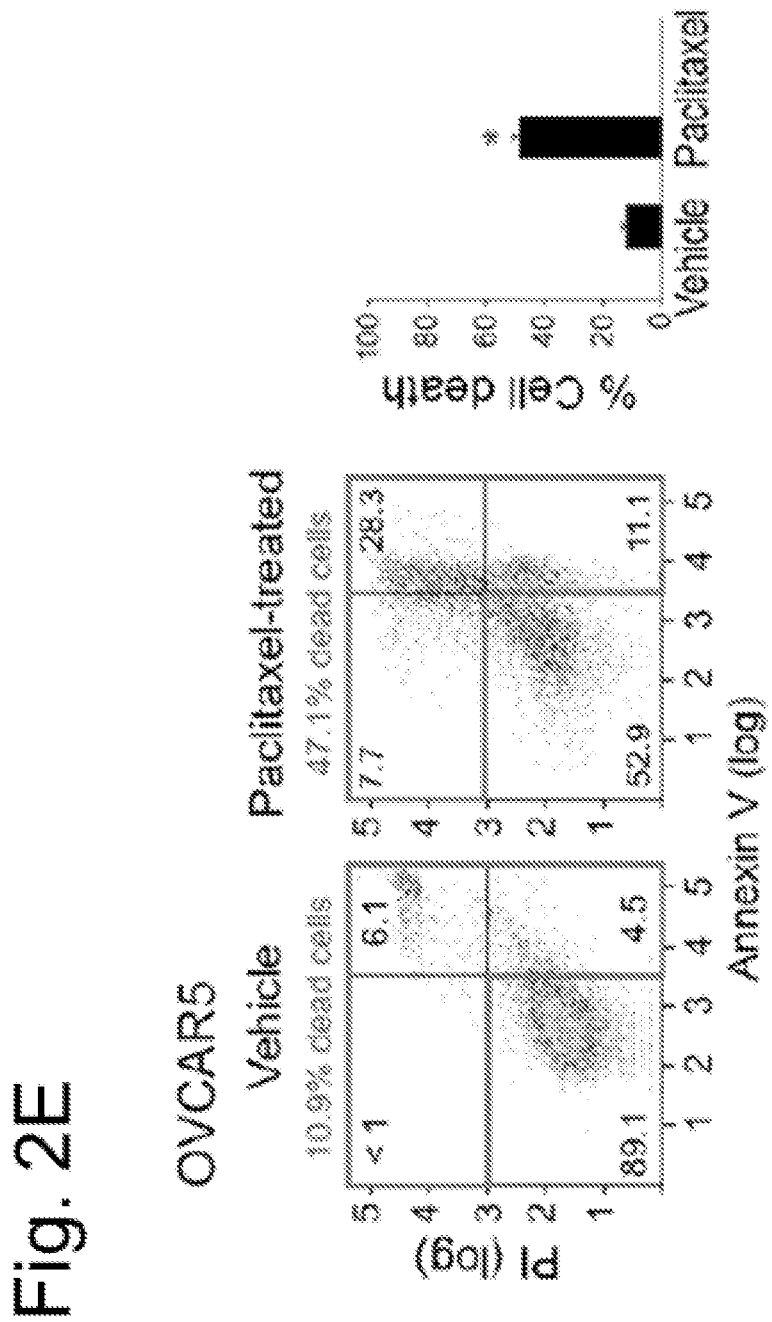

Example 3. Chemotherapy-Generated Debris Stimulates the Rapid Onset of Ovarian Tumor Growth and Reduces Survival To evaluate whether chemotherapy-generated debris is biologically relevant in ovarian cancer, we developed a debris-stimulated ovarian cancer model (FIGS. 1A-1C). To confirm that cytotoxic platinum- or taxane-based chemotherapeutic agents used for treating ovarian cancer can generate "debris" or dead cells (apoptotic cells, necrotic cells, and cell fragments), we first treated murine (ID8) or human (OVCAR5) ovarian tumor cells with cisplatin, carboplatin, or paclitaxel. Cisplatin, carboplatin, or paclitaxel generated 67%, 78%, and 56% cell death in ID8 ovarian cells, respectively (FIGS. 2A-2C). Further, carboplatin or paclitaxel also generated human OVCAR5 ovarian tumor cell debris, by increasing the death rate 3-4 fold in the chemotherapy-treated cells compared to vehicle-treated controls (FIGS. 2D and 2E). Thus, first-line cytotoxic platinum- and taxane-based chemotherapy generates debris in both murine and human ovarian tumor cell lines.

Figure 3B:
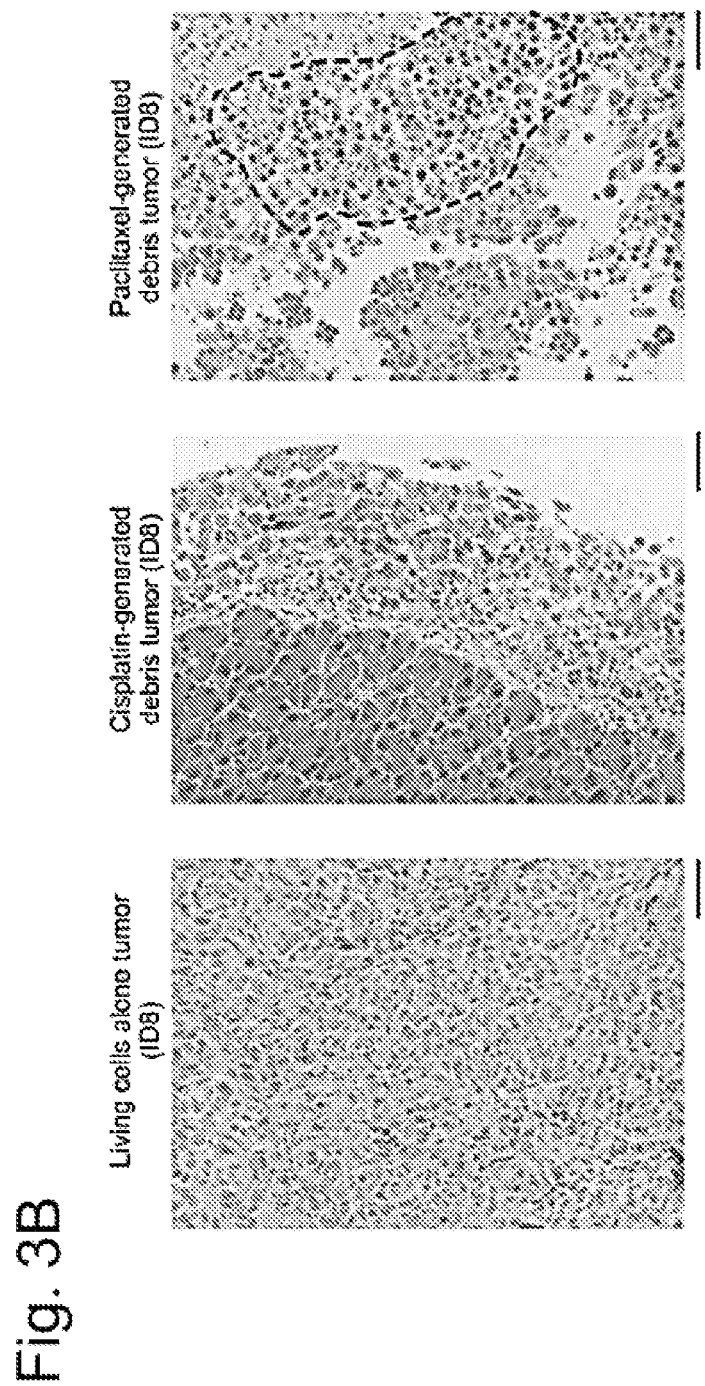
FIG. 3B shows hematoxylin and eosin staining of representative intraperitoneal cisplatin- or paclitaxel-generated ID8 debris-stimulated tumors (day 52 post-injection) or ID8 living cells alone tumor (day 72 post-injection). The dashed circle indicates area of cell death. Scale bar: 50 µm.

To assess the potential growth-stimulatory activity of such chemotherapy-generated tumor cell debris in vivo, tumor cells killed by chemotherapy in culture were collected and co-injected with living ovarian tumor cells into mice. In the widely used ID8 murine ovarian cancer model (Greenaway et al., *Gynecol. Oncol.* 108(2):385-394 (2008)), cisplatin-generated ID8 debris co-injected with ID8 living cells markedly promoted intraperitoneal ovarian tumor growth and ascites, resulting in reduced survival of immunocompetent C57BL/6 mice (FIG. 1A). Paclitaxel-generated ID8 debris also stimulated growth of intraperitoneal and orthotopic ID8 tumors (FIGS. 1B and 1C). Thus, mice co-injected with chemotherapy-generated debris and living ovarian tumor cells exhibited markedly reduced survival and accelerated development of ascites compared to mice injected with living tumor cells alone. Remarkably, paclitaxel- or carboplatin-generated ID8 debris co-injected with ID8 living cells stimulated subcutaneous tumor growth in C57BL/6 mice (FIG. 3A). The histologic findings of debris-stimulated tumors demonstrate tumor cells with numerous apoptotic cells and malignant cell debris compared to tumors generated by ID8 living cells alone (FIG. 3B).

Figure 3C:
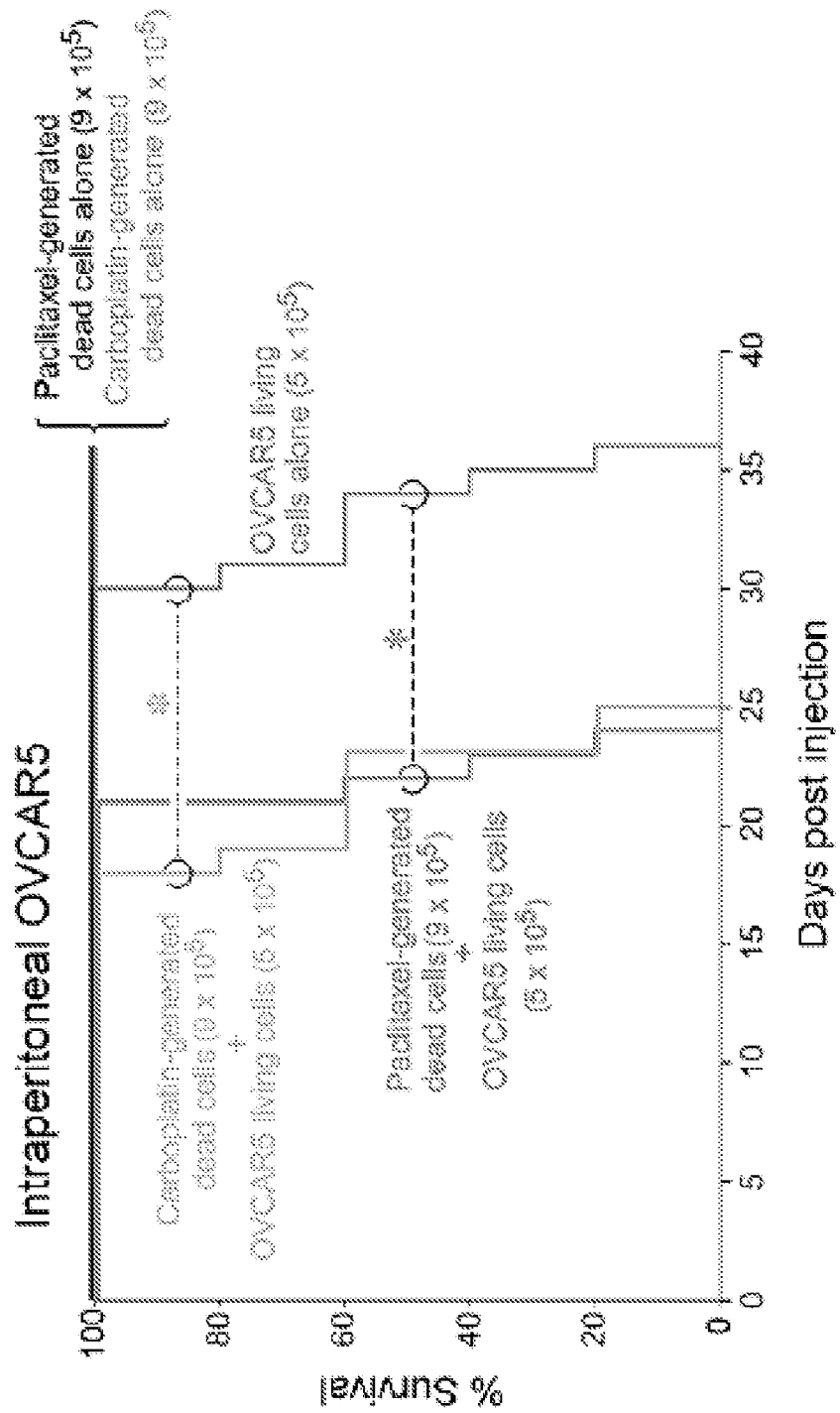
FIG. 3C shows percent survival of SCID mice co-injected intraperitoneally with carboplatin- or paclitaxel-generated OVCAR5 debris ($9 \times 10^5$ dead cells) and OVCAR5 living cells ($5 \times 10^5$). n=5 mice/group. Kaplan-Meier analysis indicated significantly shortened survival in mice co-injected with carboplatin- (log-rank test=9.50, *p=0.0021) or paclitaxel- (log-rank test=9.85, *p=0.0017) generated OVCAR5 debris and OVCAR5 living cells compared to OVCAR5 living cells alone.

To demonstrate that stimulation of tumor growth by chemotherapy-generated debris was not specific to murine tumors, we developed a debris-stimulated human ovarian (OVCAR5) tumor model. Carboplatin- or paclitaxel-generated OVCAR5 debris co-injected intraperitoneally with OVCAR5 living cells led to a rapid onset of ascites and tumor growth reducing survival in immunocompromised (SCID) mice compared to living tumor cells alone (FIG. 3C). Mice injected with chemotherapy-generated debris alone, without living cells, did not exhibit tumor growth or mortality, even at 94 days post-injection (FIGS. 1A-1C and FIGS. 3A-3C). Thus, cytotoxic chemotherapy can generate ovarian tumor cell debris that accelerates tumor growth in both murine and human ovarian tumor models, resulting in reduced survival.

Figure 4A:
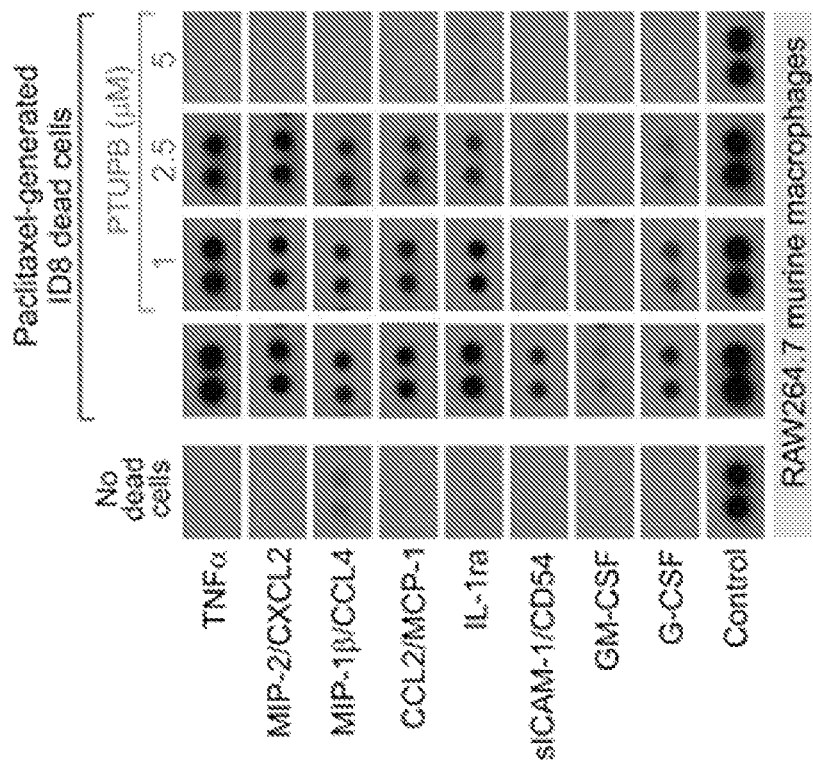
FIG. 4A shows a cytokine array of conditioned medium from RAW264.7 murine macrophages treated with vehicle or PTUPB and stimulated with paclitaxel-generated ID8 debris.
Figure 4B:
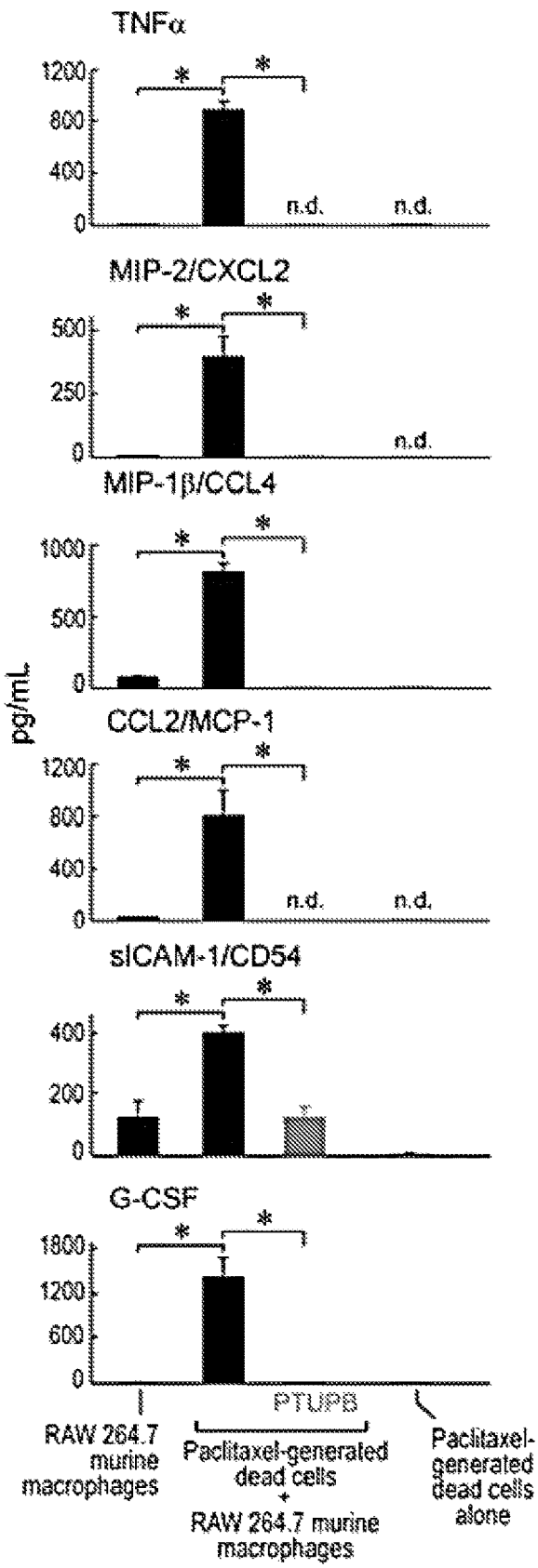
FIG. 4B shows ELISA quantification of pro-inflammatory cytokines released by RAW264.7 macrophages treated with vehicle or PTUPB (5 µM) (the third bar in each group) for 2 hours and stimulated with paclitaxel-generated ID8 debris, or by paclitaxel-generated ID8 debris alone without macrophages. Data are presented as means (pg/mL)±S.E.M. n=7-8/group. *p<0.05 vs. RAW264.7 paclitaxel-generated ID8 dead cells, n.d.=not detectable.
Figure 4C:
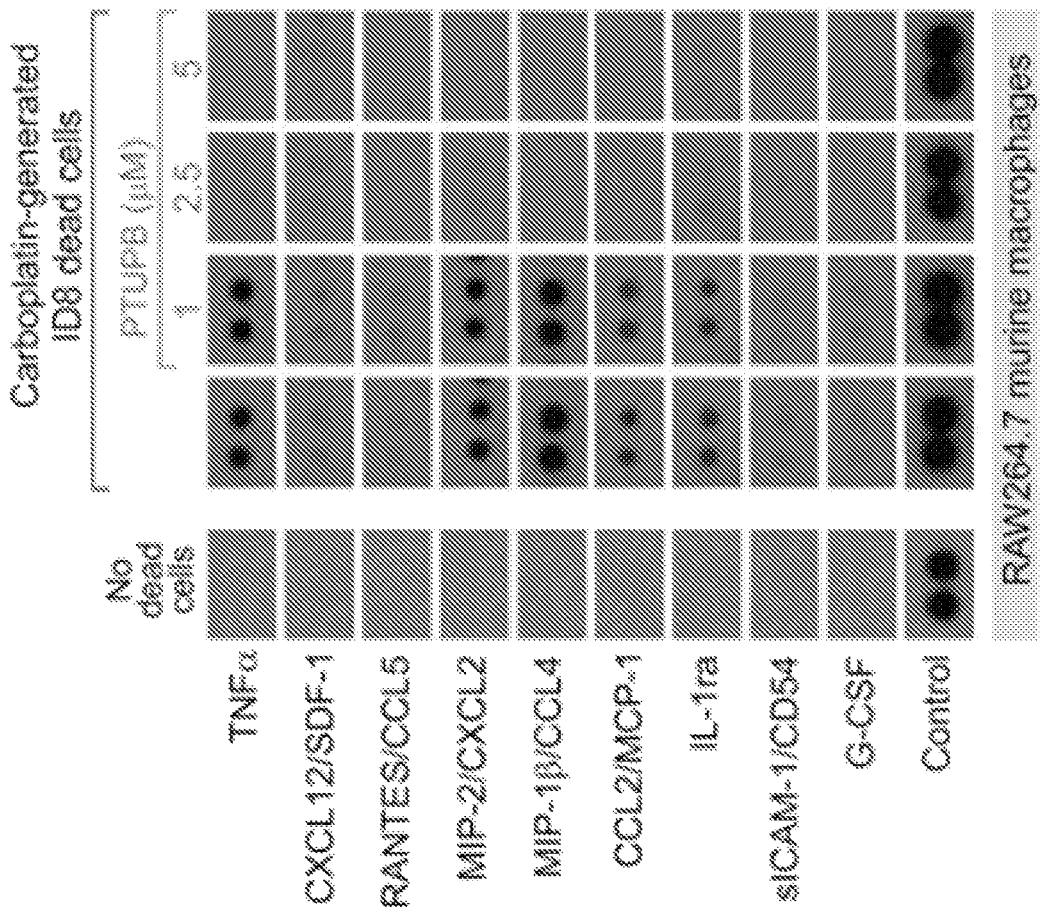
FIG. 4C shows a cytokine array of conditioned medium from RAW264.7 murine macrophages treated with vehicle or PTUPB for 2 hours and stimulated with carboplatin-generated ID8 debris.

Example 4. Cytokine Surge Triggered by Debris-Stimulated Macrophages is Prevented by Dual COX-2/sEH Inhibition Pro-inflammatory cytokines released by macrophages in the tumor microenvironment exhibit pro-tumorigenic activity (Sulciner et al., *J. Exp. Med.* (2017); Mantovani et al., *Nature.* 454(7203):436-444 (2008)). We therefore assessed the release of cytokines by macrophages stimulated with paclitaxel- or carboplatin-generated ID8 debris. Chemotherapy-generated debris triggered the release of a series, or "surge," of pro-inflammatory cytokines, including TNFα, MIP-2/CXCL2, MIP-1β/CCL4, CCL2/MCP-1, sICAM-1/CD54, and G-CSF, by RAW264.7 murine macrophages compared to macrophages not exposed to the debris (FIGS. 4A-4C). Conditioned medium of the debris alone without macrophages contained scarce to undetectable levels of cytokines, thus the cytokines were macrophage-derived (FIG. 4B). To exclude that the debris-stimulated cytokine surge was specific to the RAW264.7 macrophage cell line, we performed cytokine array screening of conditioned medium from primary human monocyte-derived macrophages stimulated with paclitaxel-generated OVCAR5 debris. Indeed, chemotherapy-generated debris triggered the release of a surge of pro-inflammatory cytokines, including CCL2/MCP-1, MIP-1α/MIP-1ββ, CCL5/RANTES, CXCL1/GROα, and IL-8, by human monocyte-derived macrophages, compared to macrophages not exposed to the debris (FIG. 5A).

Release of pro-inflammatory cytokines, such as CCL2/MCP-1, has been pharmacologically suppressed by dual inhibition of COX-2 and sEH with PTUPB in a kidney injury model (Hye Khan et al., *Prostaglandins Other Lipid Mediat.* 125:40-47 (2016)). To evaluate whether combined COX-2/sEH inhibition can suppress the debris-stimulated cytokine surge by macrophages, we treated RAW264.7 macrophages with various concentrations of PTUPB prior to stimulation with chemotherapy-generated ID8 debris. Remarkably, PTUPB (5 μM) prevented the cytokine surge by macrophages stimulated with ID8 debris generated by either paclitaxel or carboplatin (FIGS. 4A-4C). Moreover, PTUPB also suppressed an angiogenic cytokine surge by RAW264.7 macrophages stimulated with debris, including serpin E1/PAI-1, osteopontin, MMP9, and CCL2/MCP-1

Figure 5C:
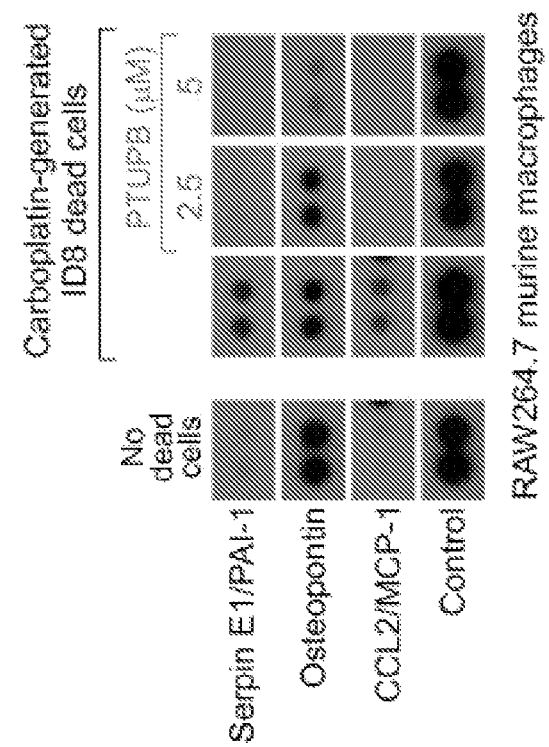
FIGS. 5B and 5C show angiogenic cytokine arrays of conditioned medium from RAW264.7 murine macrophages treated with vehicle or PTUPB (2.5 or 5 µM) for 2 hours and stimulated with paclitaxel- (FIG. 5B) or carboplatin- (FIG. 5C) generated ID8 debris.
Figure 5B:
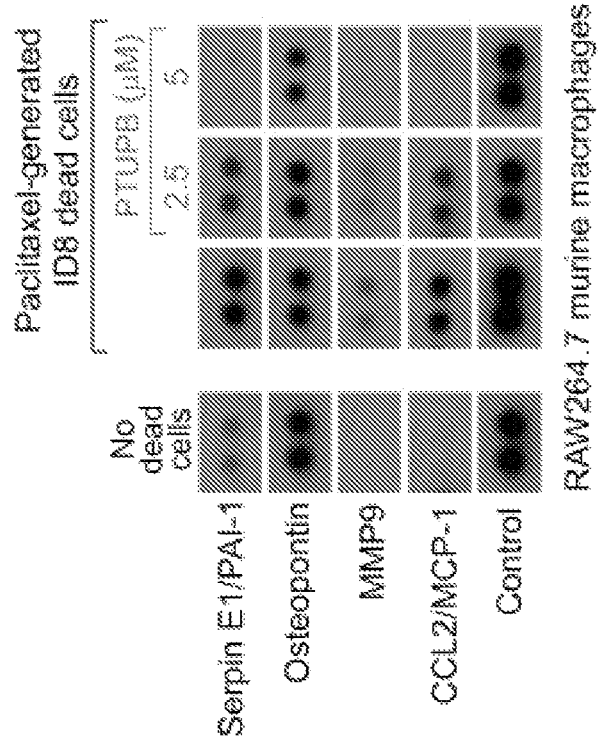
Figure 5E:
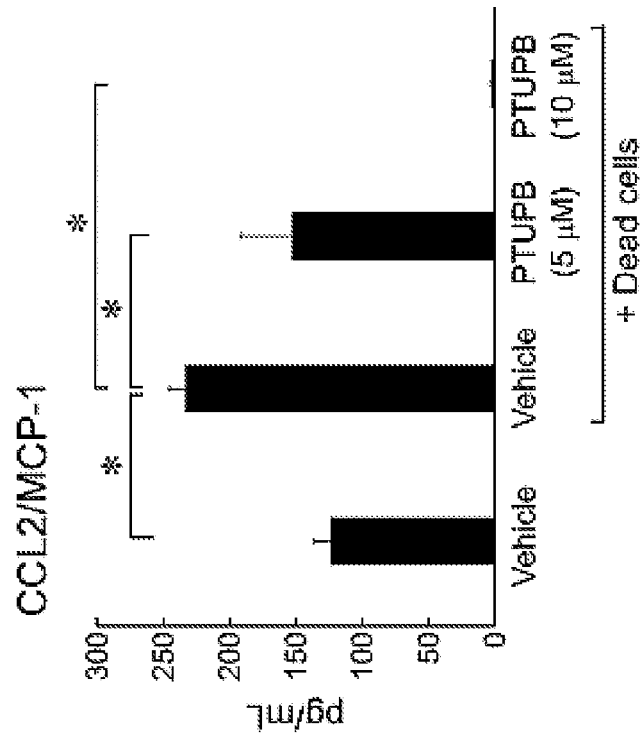
FIG. 5E shows ELISA quantification of CCL2/MCP-1 released by primary murine peritoneal macrophages treated with vehicle or PTUPB (5 or 10 µM) for 2 hours and stimulated with paclitaxel-generated ID8 debris. Data are presented as means (pg/mL)±S.E.M. n=4-6/group. *p<0.05 vs. macrophages+paclitaxel-generated ID8 dead cells.
Figure 5D:
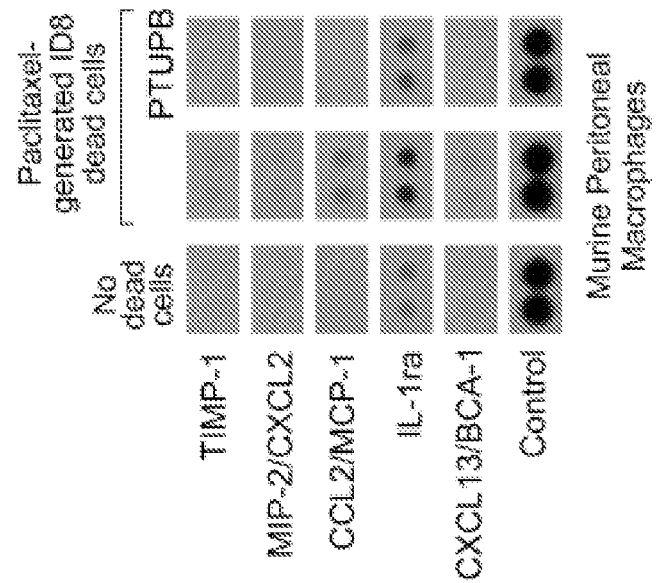
FIG. 5D shows a cytokine array of conditioned medium from primary murine peritoneal macrophages treated with vehicle or PTUPB (10 µM) for 2 hours and stimulated with paclitaxel-generated ID8 debris.
Figure 6B:
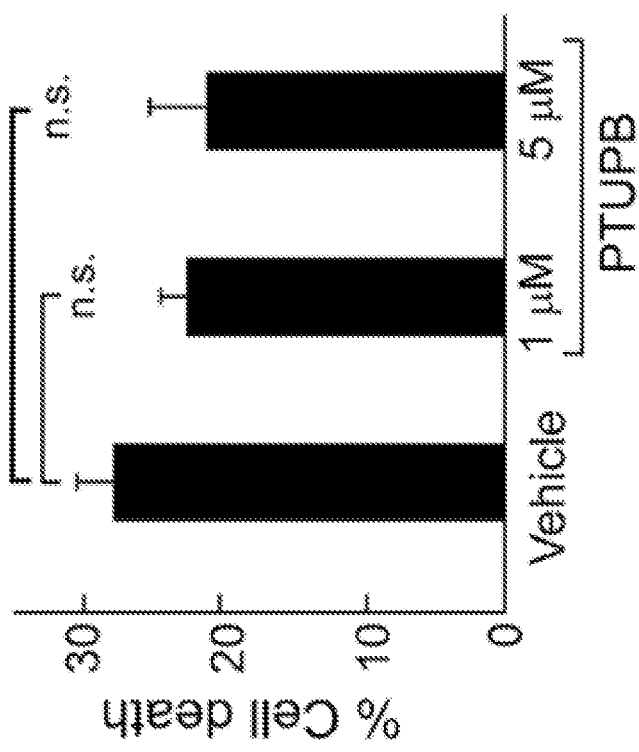
Figure 6C:
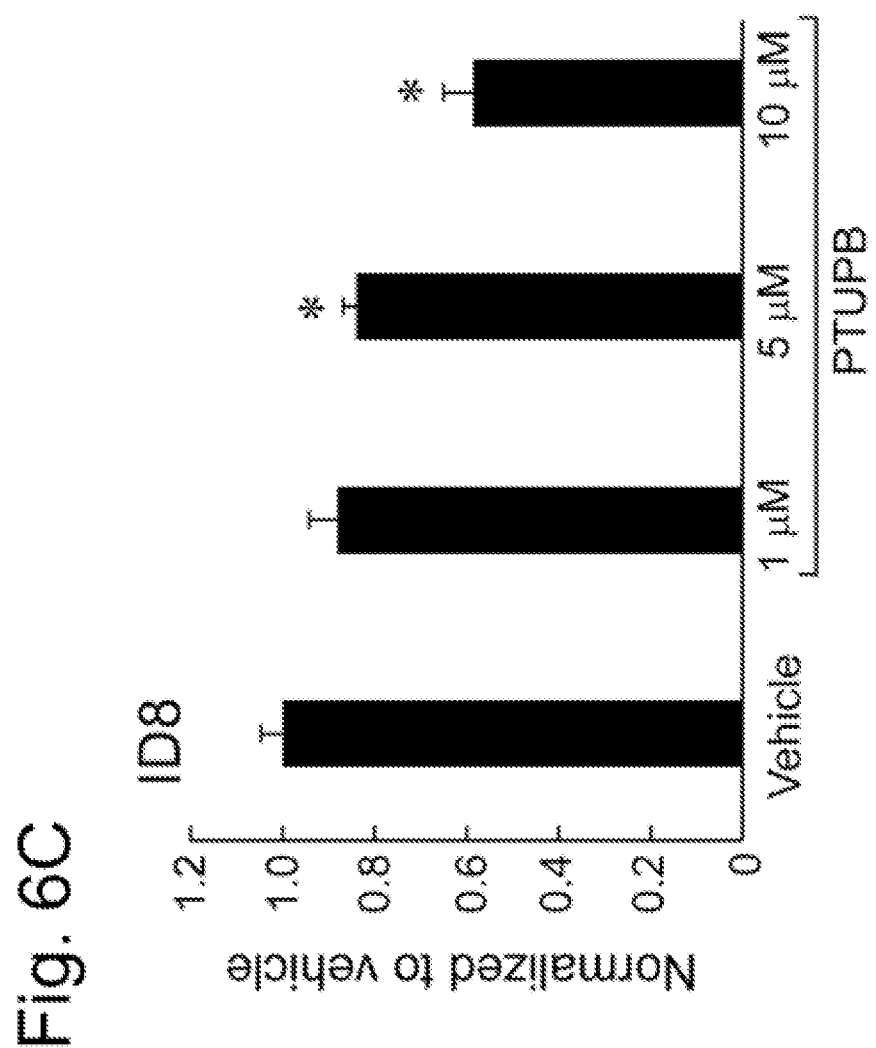
FIG. 6C shows proliferation of ID8 tumor cells treated with PTUPB (1-10 µM) for 24 hours. Values are normalized to vehicle and presented as means±S.E.M. n=12/group.

(FIGS. 5B and 5C). Additionally, PTUPB inhibited a debris-stimulated cytokine surge by primary murine peritoneal macrophages (FIGS. 5D and 5E). PTUPB also suppressed debris-stimulated macrophage release of IL-1ra (FIGS. 4A, 4C, and 5D), consistent with the association of decreased IL-1ra levels and improved survival in ovarian cancer patients (Mustea et al., Cytokine. 42(1):77-84 (2008)). Moreover, PUTPB did not induce cell death of RAW264.7 macrophages or ovarian epithelial cells (B/CMBA.Ov) (FIGS. 6A and 6B). PTUPB also inhibited proliferation of ID8 tumor cells in vitro (FIG. 6C). Thus, the pro-tumorigenic and pro-angiogenic cytokine surge released by debris-stimulated macrophages was prevented by the dual COX-2/sEH inhibitor PTUPB.

Figure 7:
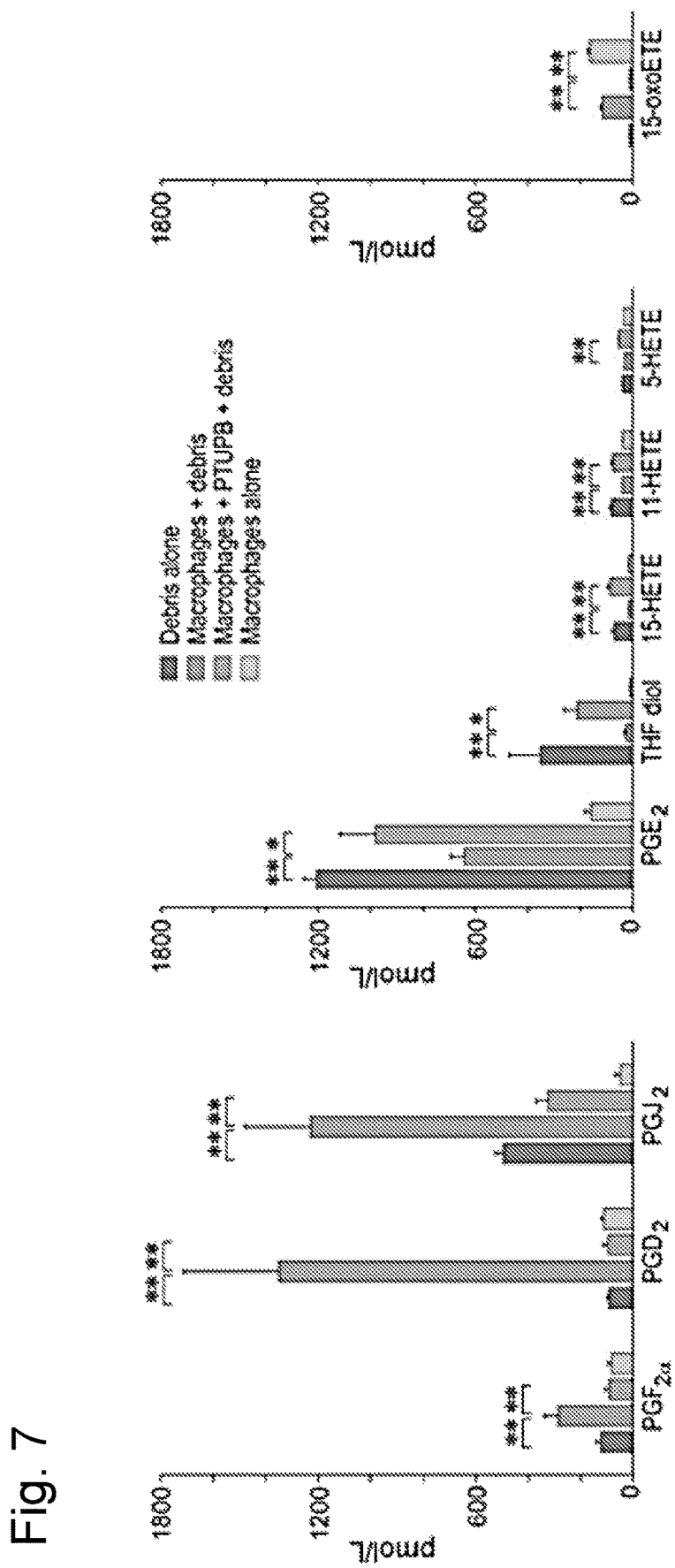
FIG. 7 shows LC-MS/MS-based oxylipin analysis of conditioned medium from paclitaxel-generated ID8 debris alone without macrophages ("Debris alone," the first bar in each group) or from RAW264.7 macrophages stimulated with paclitaxel-generated ID8 debris (the second bar in each group), PTUPB-treated macrophages (5 µM, 2 hours) stimulated with paclitaxel-generated ID8 debris (the third bar in each group), or macrophages not stimulated with debris ("Macrophages alone;" the fourth bar in each group). PTUPB inhibits the surge of $PGF_{2\alpha}$, $PGD_2$, and $PGJ_2$ (left panel), while neutralizing the reduction of PGE2, THF diol, 15-HETE, 11-HETE, and 5-HETE (middle panel) by debris-stimulated macrophages. PTUPB suppressed the release of 15-oxoETE by macrophages (right panel). Data are presented as means (pmol/L)±S.E.M. n=10/group.*p<0.05 or **p<0.01 vs. macrophages+debris or macrophages alone.

Example 5. Dual COX-2/sEH Inhibition Differentially Regulates the Release of Lipid Autacoid Mediators by Debris-Stimulated Macrophages To determine whether debris triggers the release of bioactive lipid autacoids by macrophages, we performed LC-MS/MS-based oxylipin profiling on the conditioned medium of RAW264.7 macrophages stimulated with paclitaxel-generated ID8 debris. Indeed, the debris stimulated macrophages to release a surge of COX-derived lipid mediators, including $PGF_{2\alpha}$, $PGD_2$, and $PGJ_2$ (FIG. 7, the second bar in each group) compared to macrophages not exposed to the debris (the fourth bar in each group) or debris alone without macrophages (the first bar in each group). The dual COX-2/sEH inhibitor PTUPB suppressed this debris-stimulated surge of bioactive lipids released by the macrophages (FIG. 7, the third bar in each group bars).

Figure 8:
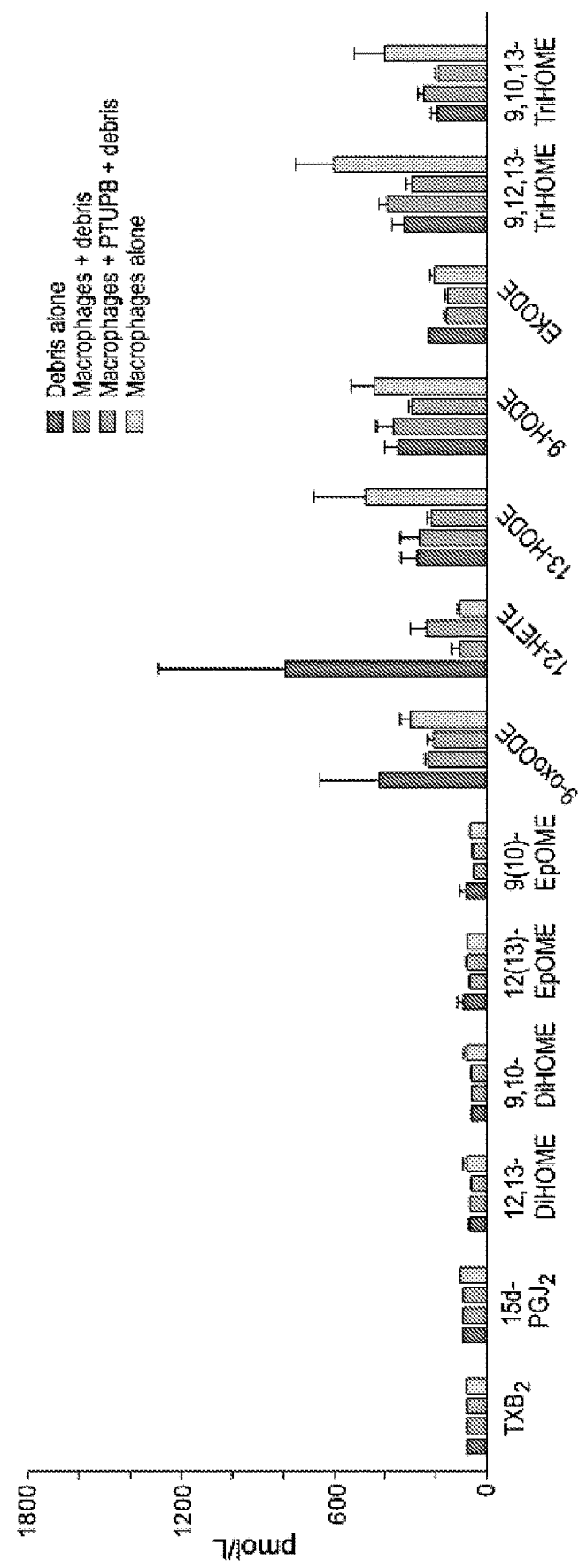
FIG. 8 shows LC-MS/MS-based oxylipin analysis of conditioned medium from paclitaxel-generated ID8 debris alone without macrophages control ("Debris alone;" the first bar in each group) or from RAW264.7 murine macrophages stimulated with debris (the second bar in each group), PTUPB-treated macrophages (5 µM, 2 hours) stimulated with debris (the third bar in each group), or macrophages alone (the fourth bar in each group). Debris does not affect the release of TXB2, 15d-$PGJ_2$, 12,13-DiHOME, 9,10-DiHOME, 12,13-EpOME, 9,10-EpOME, 9-oxoODE, 12-HETE, 13-NODE, 9-NODE, EKODE, 9,12,13-TriHOME, or 9,10,13-TriHOME by macrophages in the presence or absence of PTUPB. Data are presented as means (pmol/L)±S.E.M. n=10/group.

We next evaluated whether macrophages can reduce a series of lipids in response to chemotherapy-generated debris. LC-MS/MS-based oxylipin profiling of conditioned medium of the debris alone without macrophages (the first bar in each group) revealed levels of PGE2, THF diol, 15-HETE, 11-HETE, and 5-HETE that were decreased when debris was added to macrophages (FIG. 7, the second bar in each group bars). Interestingly, PTUPB neutralized the reduction of these lipids by debris-stimulated macrophages (FIG. 7, the third bar in each group). Further, PTUPB also suppressed the release of 15-oxoETE by macrophages in the presence of debris (FIG. 7, the third bar in each group) compared to debris-stimulated macrophages without PTUPB (the second bar in each group) or macrophages not exposed to the debris (the fourth bar in each group). By contrast, debris did not affect the release of TXB2, 15d-$PGJ_2$, 12,13-DiHOME, 9,10-DiHOME, 12,13-EpOME, 9,10-EpOME, 9-oxoODE, 12-HETE, 13-HODE, 9-NODE, EKODE, 9,12,13-TriHOME, or 9,10,13-TriHOME by macrophages in the presence or absence of PTUPB (FIG. 8). Taken together, these results suggest an active process in which dual COX-2/sEH inhibition differentially regulates the release of lipid autacoid mediators by macrophages stimulated with chemotherapy-generated tumor cell debris.

Figure 9B:
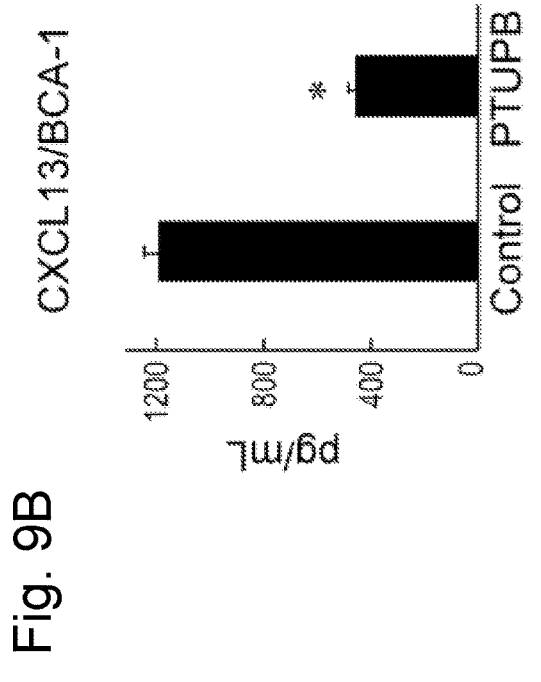
FIGS. 9A and 9B show pro-inflammatory cytokine array of serum from control or PTUPB-treated mice intraperitoneally injected with ID8 ($1\times10^6$ living cells) systemically administered chemotherapy (e.g., carboplatin). CXCL13/BCA-1 levels were quantified via ELISA. Data are presented as means (pg/mL)±S.E.M. n=3-4 mice/group. *p<0.01 vs. control.
Figure 9A:
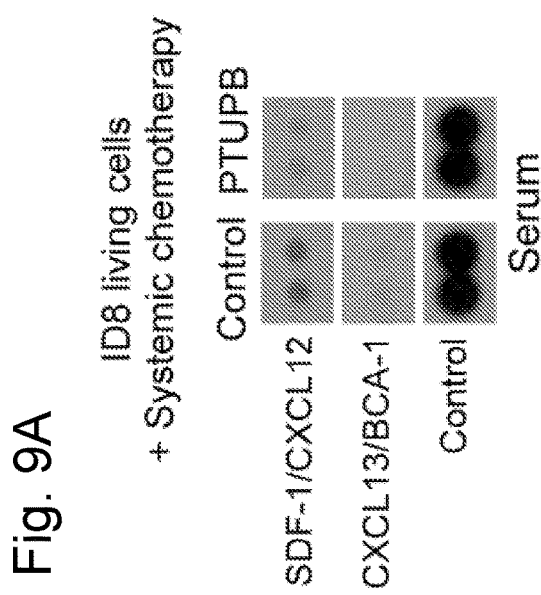
Figure 10A:
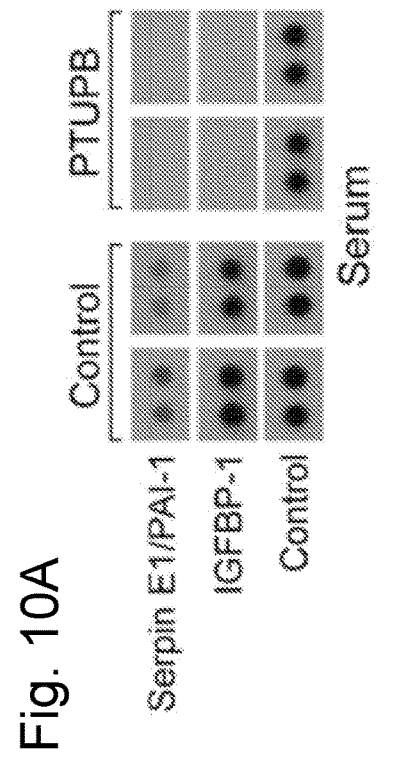
FIGS. 10A and 10B show pro-angiogenic cytokine arrays of serum (FIG. 10A) or ascites (FIG. 10B) from control or PTUPB-treated mice intraperitoneally injected with ID8 ($1\times10^6$ living cells). Serum and ascites was collected on day 60 post-injection.
Figure 9C:
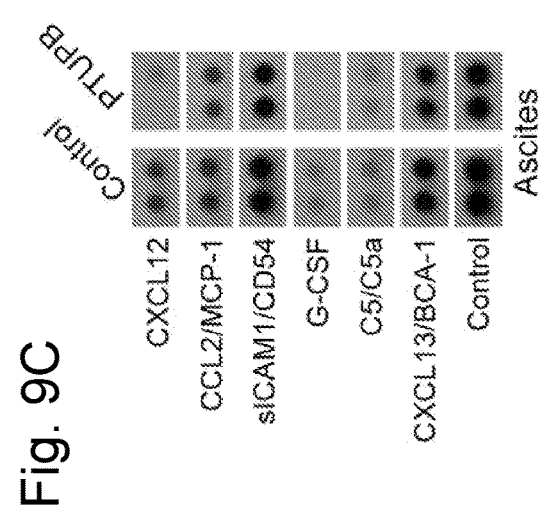
FIG. 9C shows pro-angiogenic cytokine array of ascites from control or PTUPB-treated mice intraperitoneally injected with ID8 ($1\times10^6$ living cells). Serum and ascites were collected from mice on day 60 post-injection.
Figure 10B:
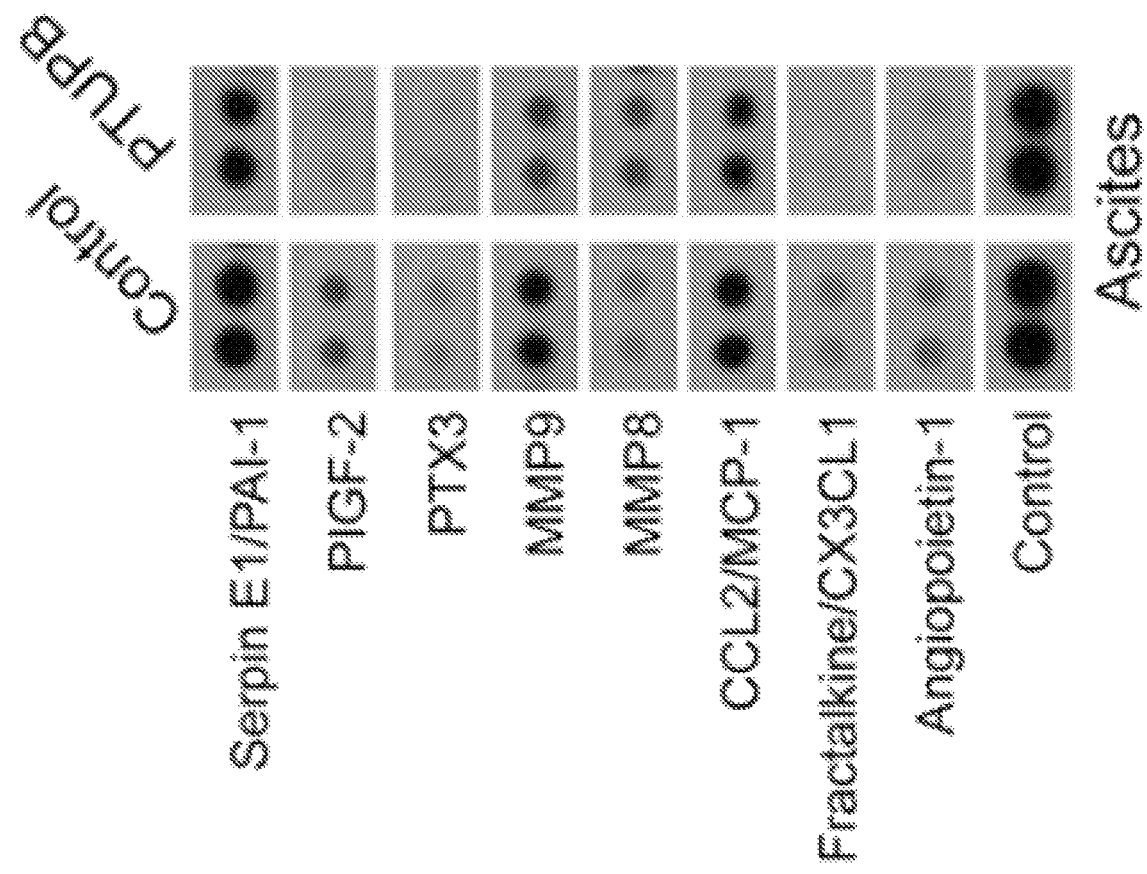

Example 6. Suppression of In Vivo Pro-Inflammatory/Pro-Angiogenic Cytokines and Debris-Stimulated Ovarian Tumor Growth Via Dual COX-2/sEH Inhibition We next assessed whether dual COX-2/sEH inhibition could suppress pro-inflammatory and pro-angiogenic cytokines in mice bearing intraperitoneal ovarian tumors (ID8). PTUPB reduced serum levels of CXCL13/BCA-1 and SDF-1/CXCL12 in mice administered systemic chemotherapy (FIGS. 9A and 9B). In addition, PTUPB also inhibited pro-angiogenic factors serpin E1/PAI-1 and IGFBP1 in serum from mice intraperitoneally injected with ID8 ($1\times10^6$ living cells) compared to control (FIG. 10A). Furthermore, ascites from PTUPB-treated mice bearing intraperitoneal ID8 tumors exhibited decreased levels of pro-inflammatory and pro-angiogenic cytokines including PIGF-2, PTX-3, MMP9, CCL2/MCP-1, fractalkine/CX3CL1, and angiopoietin-1 compared to control on day 60 post-injection (FIG. 10B; FIG. 9C).

To determine whether PTUPB could suppress debris-stimulated ovarian tumor growth, mice were co-injected intraperitoneally with paclitaxel- or carboplatin-generated ID8 debris and ID8 living cells. Remarkably, PTUPB induced sustained survival over 120 days post-injection in mice bearing debris-stimulated intraperitoneal ovarian tumors compared to control (FIGS. 11A and 11B). Moreover, PTUPB suppressed debris-stimulated orthotopic ovarian tumor growth and prolonged survival (FIG. 11C).

Example 7. Prevention of Carcinogen-Stimulated Cytokine Storm

In this example we now show that we can prevent carcinogen-stimulated cytokine storm. In particular, we demonstrate that cellular debris generated by carcinogens such as aflatoxin B1 accelerates primary tumor growth by triggering a "storm" of pro-inflammatory cytokines. Moreover, dual COX2/sEH inhibition (e.g., PTUPB) prevents the carcinogen-induced cytokine storm and carcinogen-induced cancer. Thus, dual COX2-sEH inhibitors can be used as a therapeutic approach to carcinogen-induced cancer by preventing the carcinogen-induced cytokine storm. Cancer can be caused by inflammation generated by carcinogens (e.g., the mycotoxin Afatoxin B1 and liver cancer). We show that this cell debris generated inflammation promotes cancer from the food borne mycotoxin, aflatoxin B1. In many parts of the world mycotoxins are ubiquitous as contaminants of nut and grain crops thus entering the food chain directly through human primary consumption but also through milk, meat, and other products. There is high contamination of human food either undetected before consumption or coinciding with a food shortage. Our data show that we can prevent cancer by giving a dual COX2/seH inhibitor (e.g., PTUPB) to prevent the cytokine storm associated with liver cancer. PTUPB prevents the aflatoxin B1-induced cytokine storm.

Liver cancer often develops in the context of inflammation and can be stimulated by environmental carcinogens such as aflatoxins or alcoholic beverages. While genotoxic mechanisms of carcinogen related liver cancer include DNA damage and mutations, non-genotoxic mechanisms are not fully elucidated. It has been shown that tumor cell debris or dead tumor cells killed by chemotherapy and other current cancer paradigms can paradoxically stimulate new tumor growth and progression. We show that gemcitabine, a current front-line chemotherapeutic, generated pancreatic tumor cell debris which stimulates macrophages to release a series of pro-inflammatory "cytokine storm" which may promote tumor growth. Here we show that, additionally, cellular debris generated by ethanol or aflatoxin B1 can also stimulate tumor growth and dormancy escape. The cycle of carcinogen-induced cell death and the stimulation of inflammation and tissue regeneration/wound healing create an environment primed for tumor growth and stimulation of dormancy escape. These carcinogens may generate apoptotic debris of dormant tumor cells or of regular non-tumor cells creating inflammation in both scenarios. We show that this debris stimulates a macrophage derived cytokine storm of pro-inflammatory and pro-angiogenic cytokines, which create a pro-tumorigenic microenvironment in which dormant tumor cells may be stimulated.

Here we show PTUPB is able to inhibit the "cytokine storm" derived from aflatoxin-generated and ethanol-generated tumor cell debris via dual COX-2/sEH inhibition. By down-regulating macrophage release of cytokines such as CCL4, TNFα, and CCL2, we show that PTUPB (and other dual COX-2/sHE inhibitors, as well as combinations of these agents) can be used as a chemoprevention for aflatoxin and ethanol stimulated liver cancer. Additionally, Ome-21i is an sEH inhibitor which alone shows potency in down-regulating the debris stimulated "cytokine storm" and can be combined with a COX-2 inhibitor (e.g., celecoxib), by mimicking the dual inhibition of PTUPB. We also show that PTUPB is able to stimulate macrophage phagocytosis, or clearance, of this aflatoxin B1 generated tumor cell debris.

Male immunocompetent C57BL/6 mice were co-injected with aflatoxin B1 generated hepa 1-6 tumor cell debris ($9 \times 10^5$) and living hepa 1-6 tumor cells ($6.25 \times 10^5$). n=5 mice/group. FIG. 12 shows that aflatoxin B1 generated liver tumor cell debris stimulates tumor growth.

Figure 13:
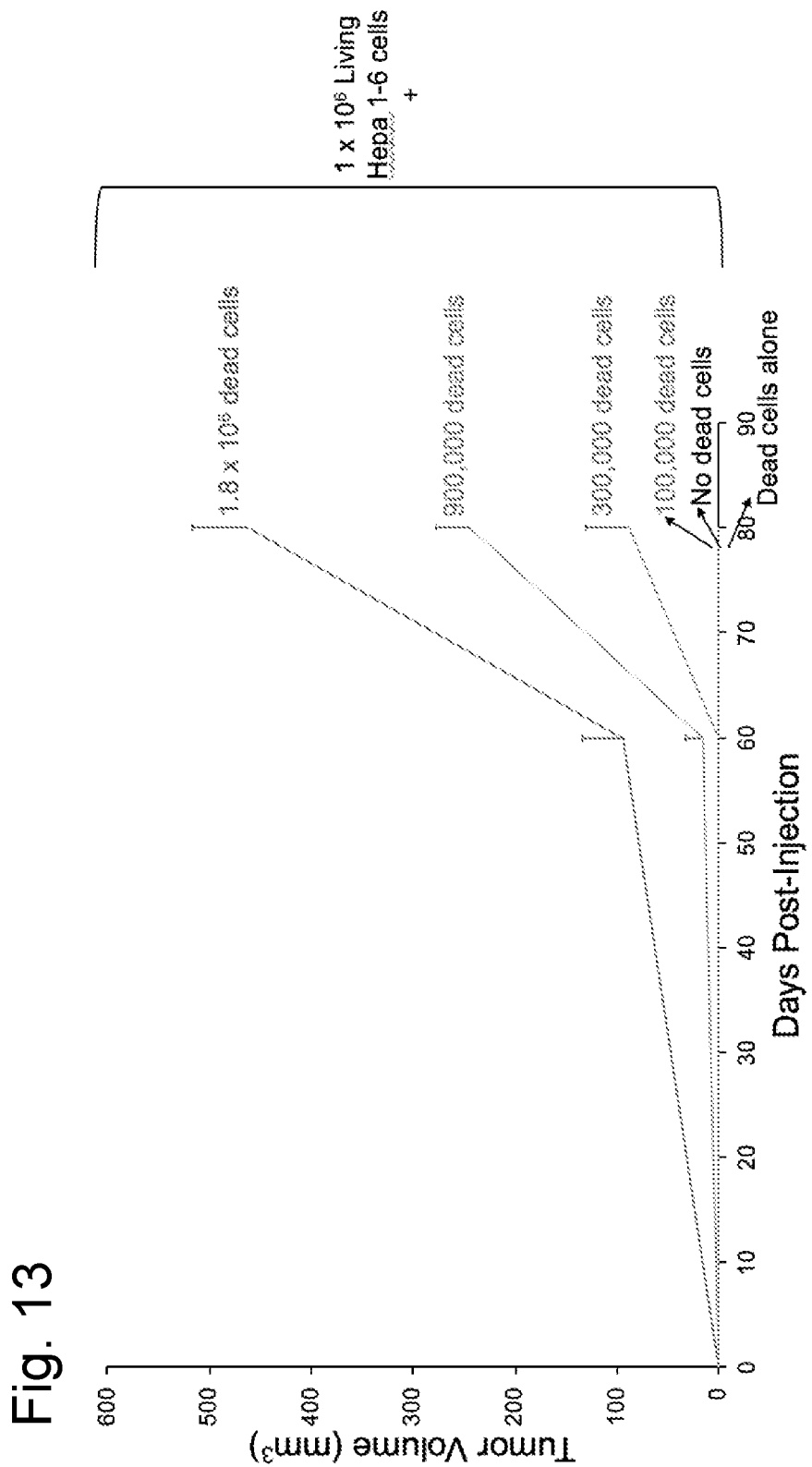
FIG. 13 shows that aflatoxin B1-generated liver tumor cell debris (Hep1-6) stimulates tumor growth in a dose dependent manner. C57BL/6 mice co-injected subcutaneously with increasing doses of AFB1-generated Hepa 1-6 dead cells ($1.8\times10^6$, $9\times10^5$, $3\times10^5$, $1\times10^5$) and/or living Hepa 1-6 cells ($1\times10^6$). n=5-15 mice/group.

Male immunocompetent C57BL/6 mice were co-injected with aflatoxin B1 generated hepa 1-6 tumor cell debris (18, 9, 3, $1 \times 10^5$) and living hepa 1-6 tumor cells ($1 \times 10^6$). n=5 mice/group. FIG. 13 shows that aflatoxin B1 generated liver tumor cell debris stimulates tumor growth in a dose dependent manner.

Figure 14:
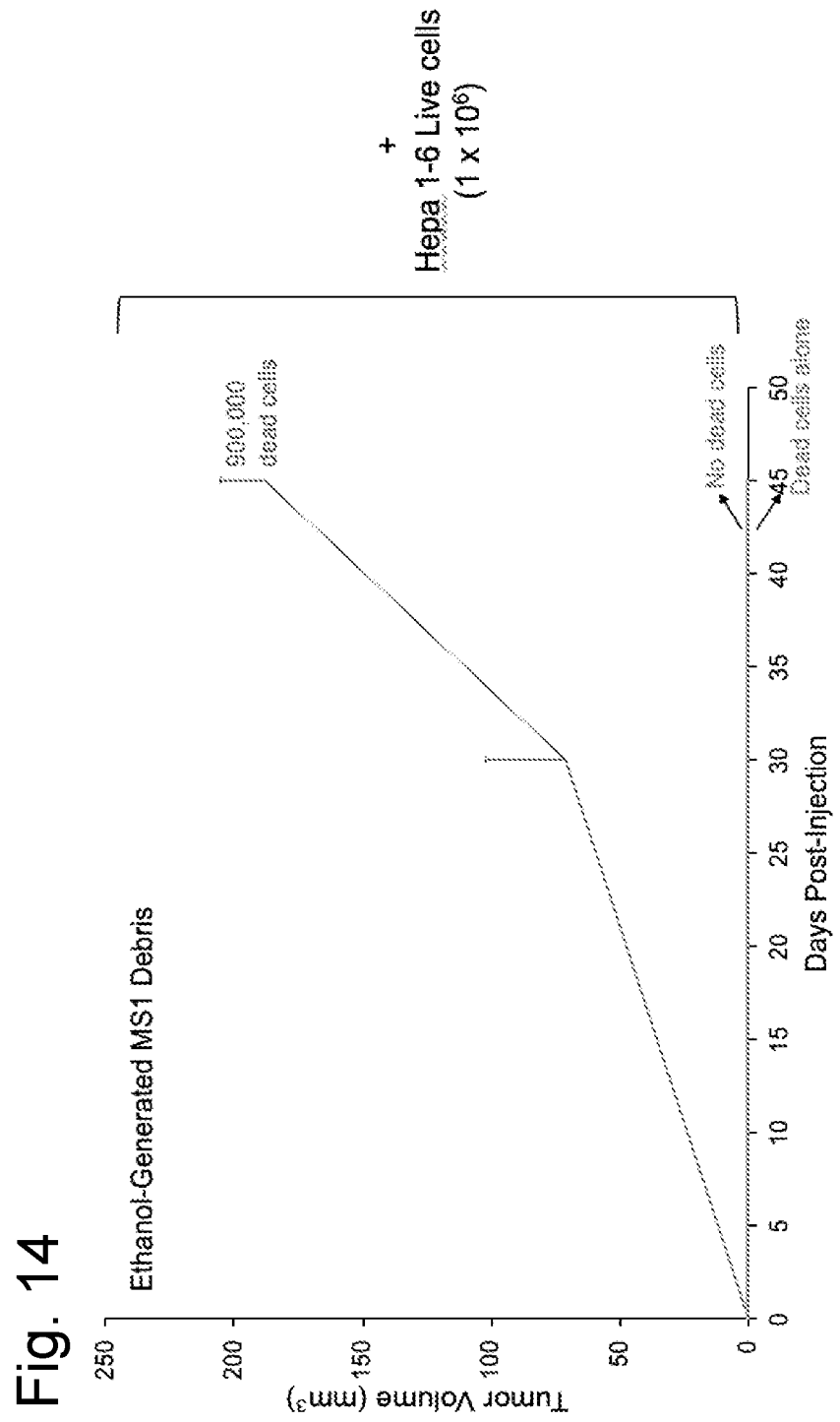
FIG. 14 shows that ethanol-generated endothelial cell debris (MS1) stimulates tumor growth. C57BL/6 mice co-injected subcutaneously with ethanol-generated MS-1 debris ($9\times10^5$) and/or living Hepa 1-6 cells ($1\times10^6$). n=5 mice/group.

Male immunocompetent C57BL/6 mice co-injected with ethanol generated MS1 endothelial cell debris ($9 \times 10^5$) and living hepa 1-6 tumor cells ($1 \times 10^6$). n=5 mice/group. FIG. 14 shows that ethanol generated endothelial cell debris stimulates tumor growth.

Figure 15B:
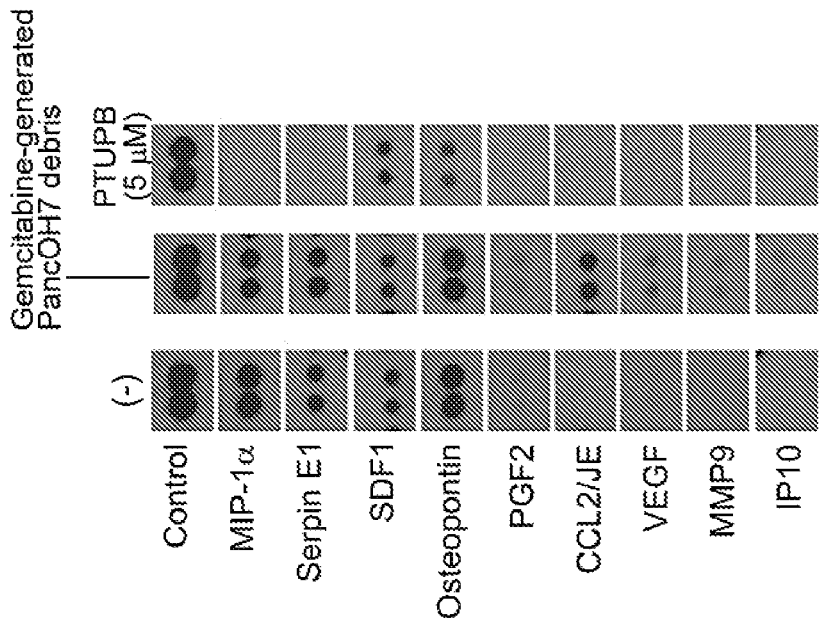
FIGS. 15A and 15B show that "cytokine storm" released by debris-stimulated macrophages is prevented by the dual COX-2/sEH inhibitor PTUPB. (A) Inflammatory and (B) angiogenic cytokine array of RAW264.7 murine macrophage conditioned media co-cultured with chemotherapy (gemcitabine)-generated murine pancreatic (PancOH7) tumor cell debris and pre-treated with vehicle or PTUPB (5 µM, 2 hours).
Figure 15A:
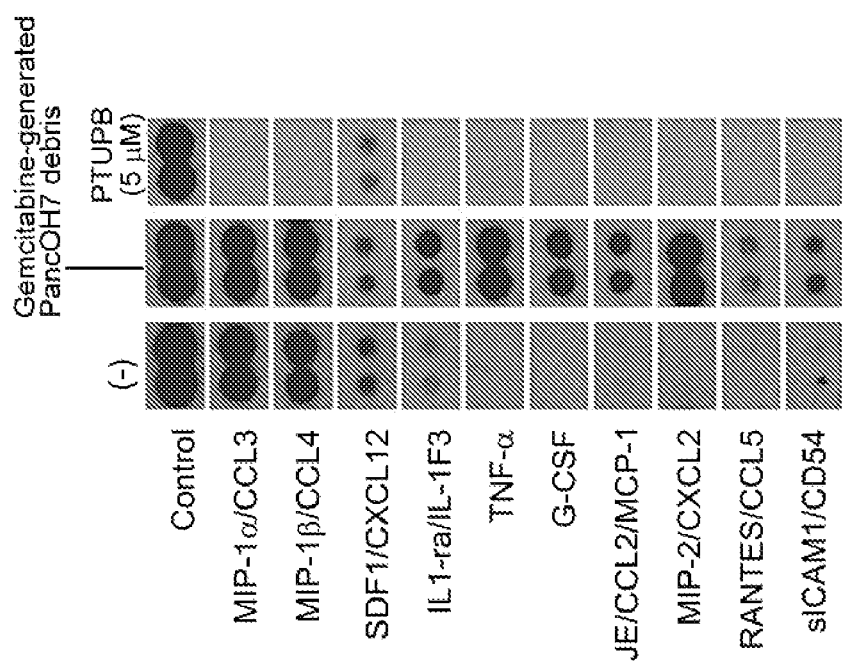

Inflammatory (FIG. 15A) and angiogenic (FIG. 15B) cytokine arrays of conditioned media from RAW264.7 macrophages treated with vehicle or PTUPB (5 uM) for 2 hours stimulated with gemcitabine-generated PancOH7 debris are shown in FIGS. 15A and 15B. "Cytokine storm" released by debris-stimulated macrophages is prevented by the dual COX-2/sEH inhibitor PTUPB.

Figure 16B:
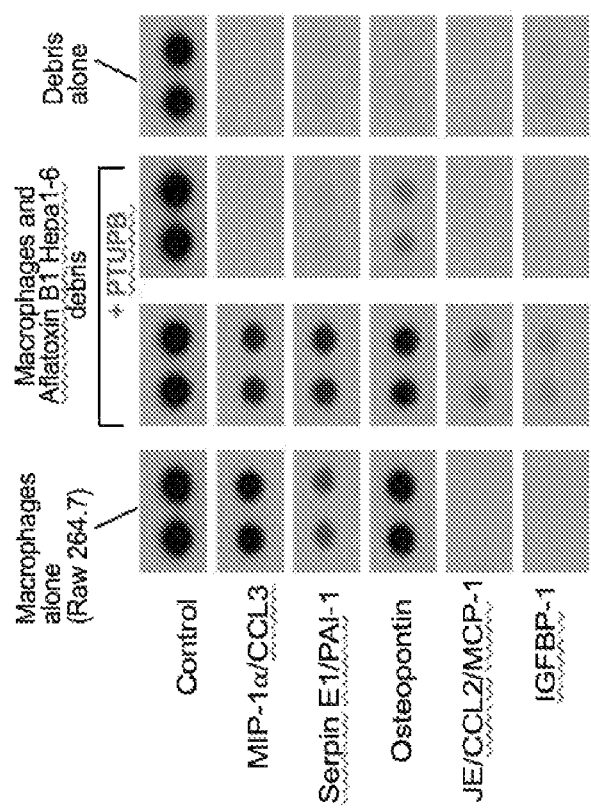
FIGS. 16A and 16B show that "cytokine storm" released by debris-stimulated macrophages is prevented by the dual COX-2/sEH inhibitor PTUPB. (A) Inflammatory and (B) angiogenic cytokine array of RAW264.7 murine macrophage conditioned media co-cultured with AFB1-generated murine liver (Hepa 1-6) tumor cell debris and pre-treated with vehicle or PTUPB (5 µM, 2 hours).
Figure 16A:
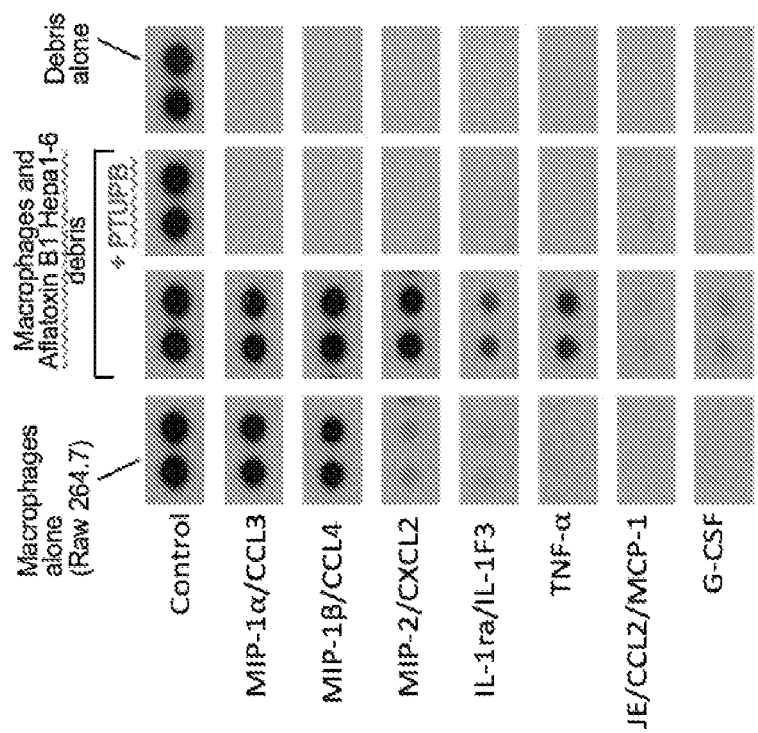

Inflammatory (FIG. 16A) and angiogenic (FIG. 16B) cytokine arrays of conditioned media from RAW264.7 macrophages treated with vehicle or PTUPB (5 μM) for 2 hours stimulated with Aflatoxin B1-generated Hepa 1-6 debris are shown in FIGS. 16A and 16B. "Cytokine storm" released by debris-stimulated macrophages is prevented by the dual COX-2/sEH inhibitor PTUPB.

Figure 17:
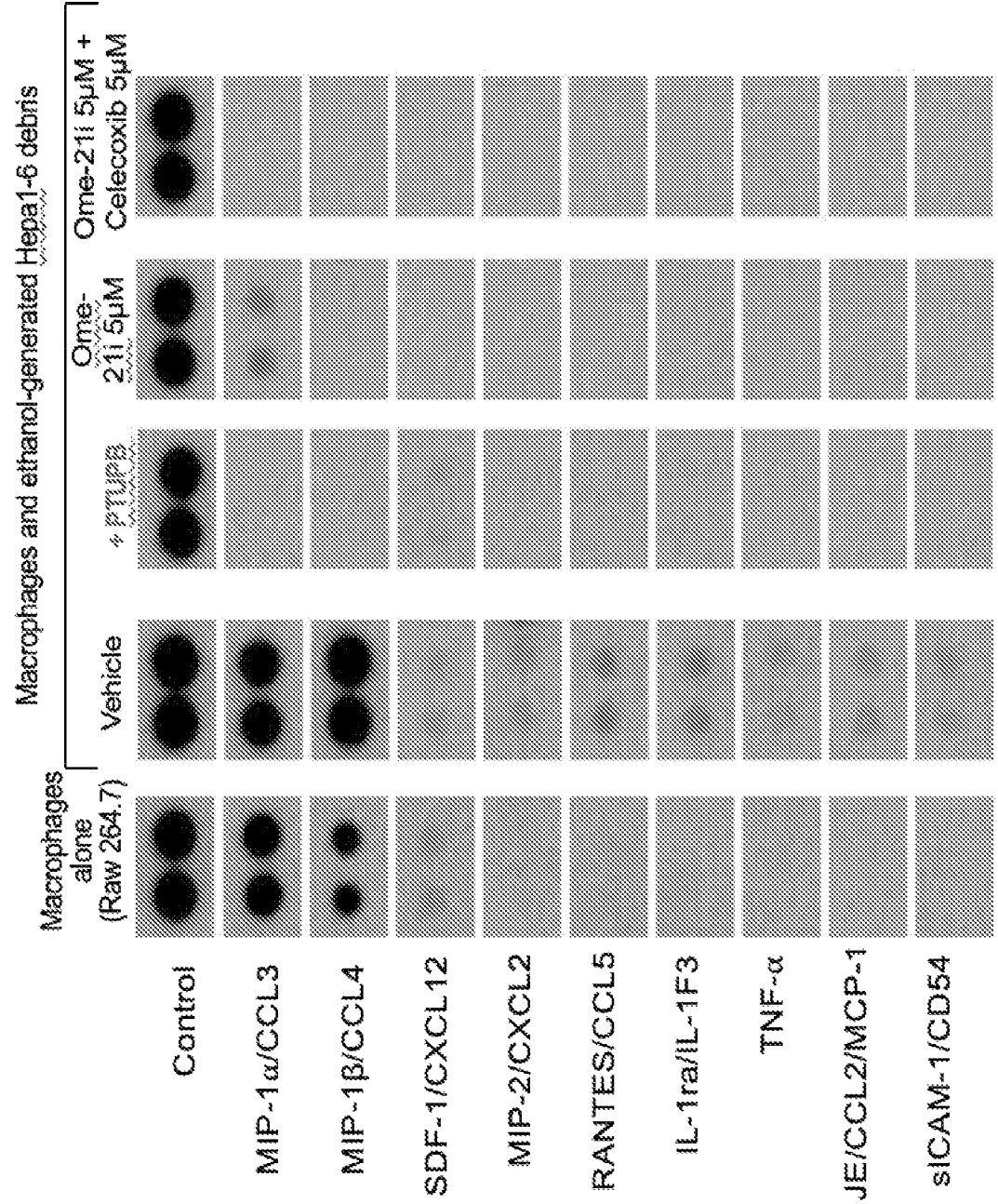
FIG. 17 shows that "cytokine storm" released by debris-stimulated macrophages is prevented by the dual COX-2/sEH inhibitor PTUPB or sEH inhibitor Ome-21i and COX-2 inhibitor celecoxib. Inflammatory cytokine array of RAW264.7 murine macrophage conditioned media co-cultured with ethanol-generated murine liver (Hepa 1-6) tumor cell debris and pre-treated for 2 hours with vehicle, PTUPB (5 µM), Ome-21i (5 µM), or Ome-21i+Celecoxib (5 µM each).

An inflammatory cytokine array of conditioned media from RAW264.7 macrophages treated with vehicle, PTUPB (5 μM), Ome-21i (5 μM), or Ome-21i (5 μM) and Celecoxib (5 μM) for 2 hours stimulated with ethanol-generated Hepa 1-6 debris is shown in FIG. 17. "Cytokine storm" released by debris-stimulated macrophages is prevented by the dual COX-2/sEH inhibitor PTUPB or sEH inhibitor Ome-21i and COX-2 inhibitor celecoxib.

Figure 18:
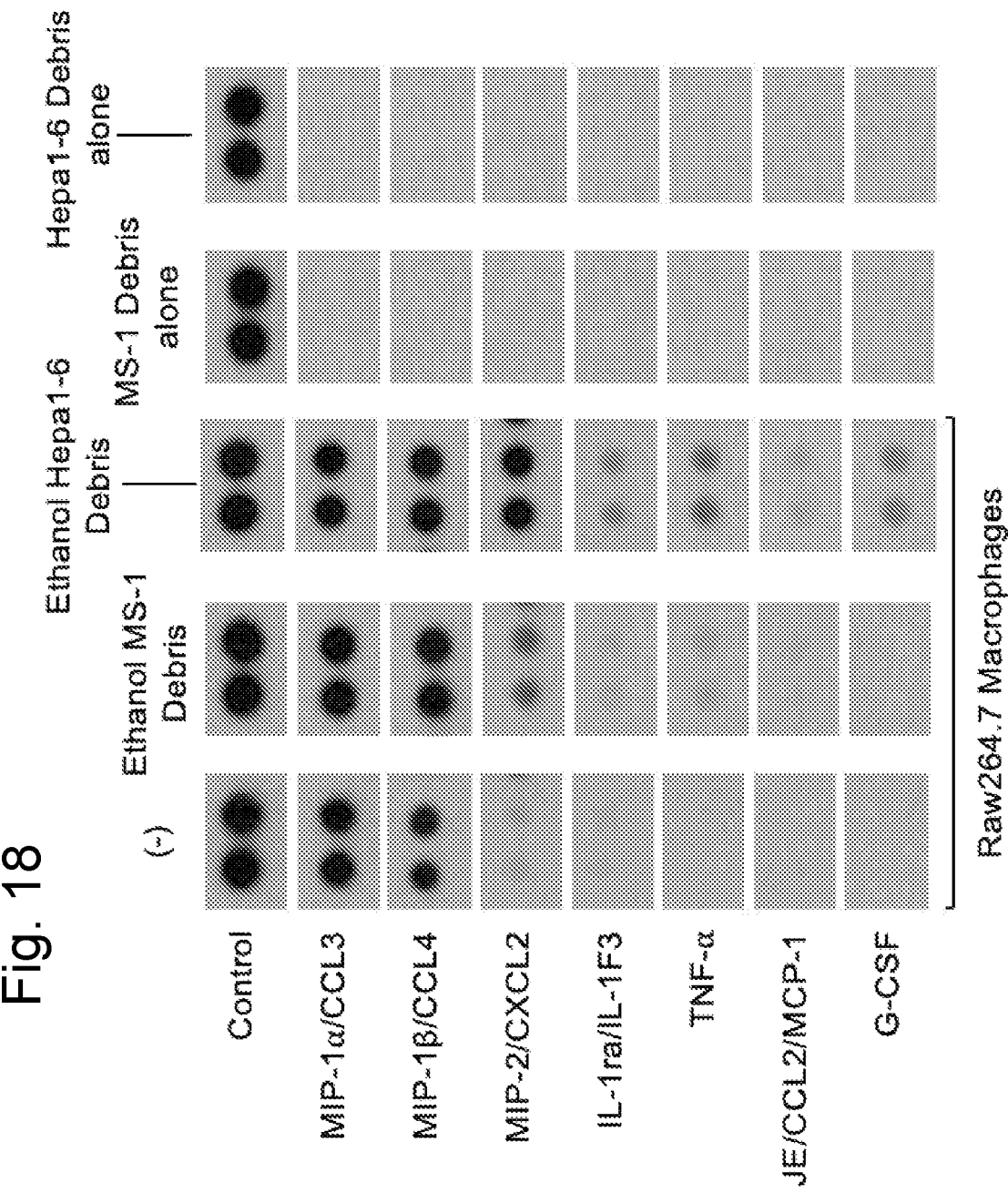
FIG. 18 shows that "cytokine storm" was released by debris-stimulated macrophages. Inflammatory cytokine array of conditioned media of RAW264.7 murine macrophage co-cultured with ethanol-generated murine liver (Hepa 1-6) tumor or murine endothelial (MS-1) non-tumor debris or of debris alone.

An inflammatory cytokine array of conditioned media from RAW264.7 macrophages stimulated with ethanol-generated Hepa 1-6 murine liver tumor cell debris or ethanol generated MS1 murine endothelial cell debris is shown in FIG. 18. "Cytokine storm" was released by debris-stimulated macrophages.

Figure 19:
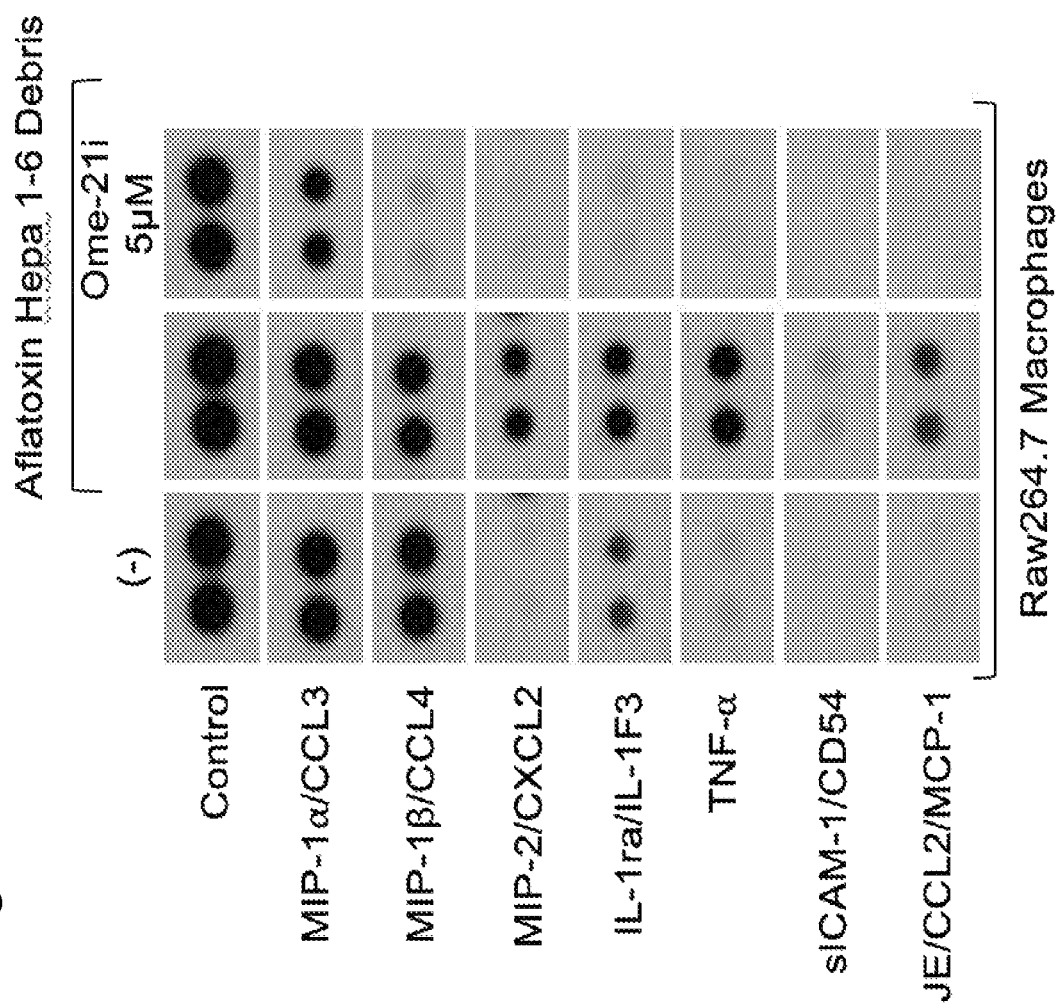
FIG. 19 shows that "cytokine storm" released by debris-stimulated macrophages is inhibited by sEH inhibitor Ome-21i. Inflammatory cytokine array of RAW264.7 murine macrophage conditioned media co-cultured with AFB1-generated murine liver tumor (Hepa 1-6) cell debris and pre-treated with Ome-21i (5 µM, 2 hours).

An inflammatory cytokine array of conditioned media from RAW264.7 macrophages treated with vehicle, Ome-21i (5 μM), or Ome-21i (2.5 μM) and celecoxib (2.5 μM) for 2 hours stimulated with aflatoxin B1-generated Hepa 1-6 debris is shown in FIG. 19. "Cytokine storm" released by debris-stimulated macrophages is inhibited by sEH inhibitor Ome-21i.

Figure 20B:
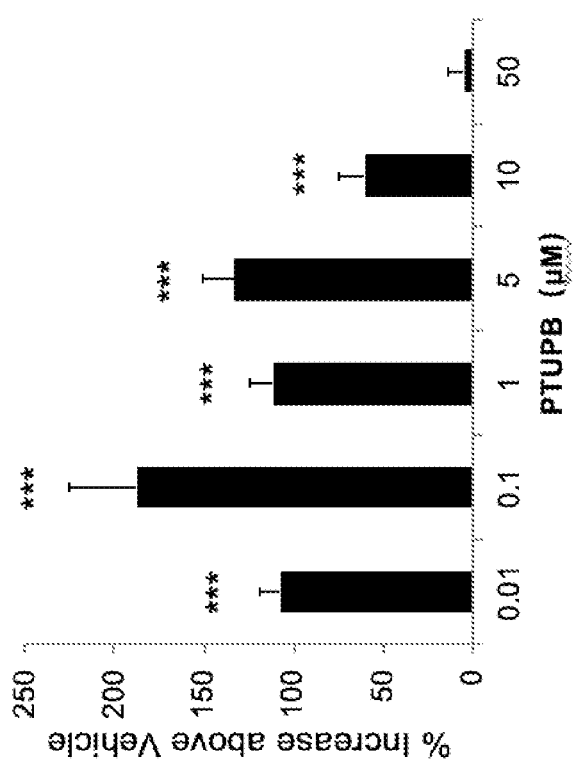
FIGS. 20A and 20B show that dual COX-2/sEH inhibitor PTUPB stimulates macrophage phagocytosis of aflatoxin B1-generated tumor cell debris. (A) RAW264.7 murine macrophages and (B) primary peritoneal murine macrophages incubated with indicated concentrations of PTUPB and macrophage phagocytosis of AFB1-generated liver tumor (Hepa 1-6) cell debris was assessed. Values represent Relative Fluorescent Units (RFUs) and are normalized to percent increase above vehicle-treated macrophages. *p<0.05, <0.01, *p<0.001 vs vehicle. n=12/group.
Figure 20A:
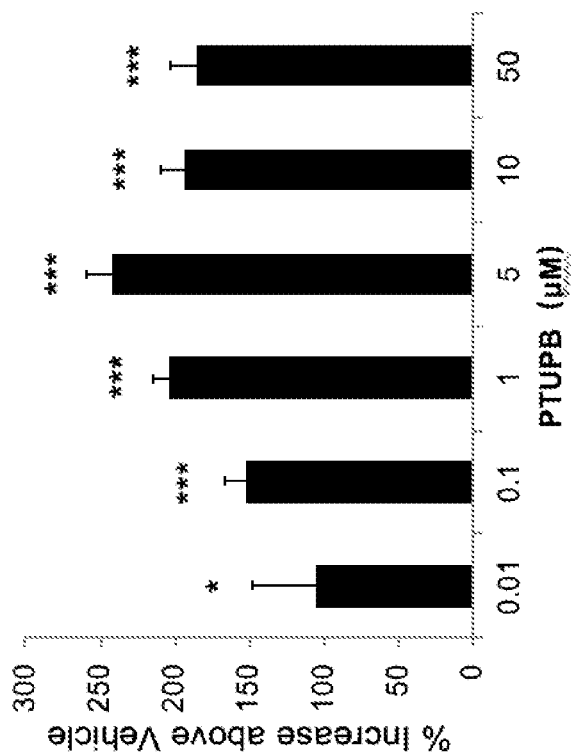

RAW264.7 (FIG. 20A) or murine peritoneal macrophages (FIG. 20B) were incubated with concentrations of PTUPB and macrophage phagocytosis of aflatoxin B1-generated hepa1-6 murine liver tumor cell debris was assessed. Values represent relative fluorescent units (RF) and are normalized to percent increase above vehicle-treated macrophages; *$p<0.05$, $p<0.01$, *$p<0.001$ vs. vehicle. Dual COX-2/sEH inhibitor PTUPB stimulates macrophage phagocytosis of aflatoxin B1-generated tumor cell debris.

Example 8. Prevention of Alcohol-Stimulated Cytokine Storm

Figure 21:
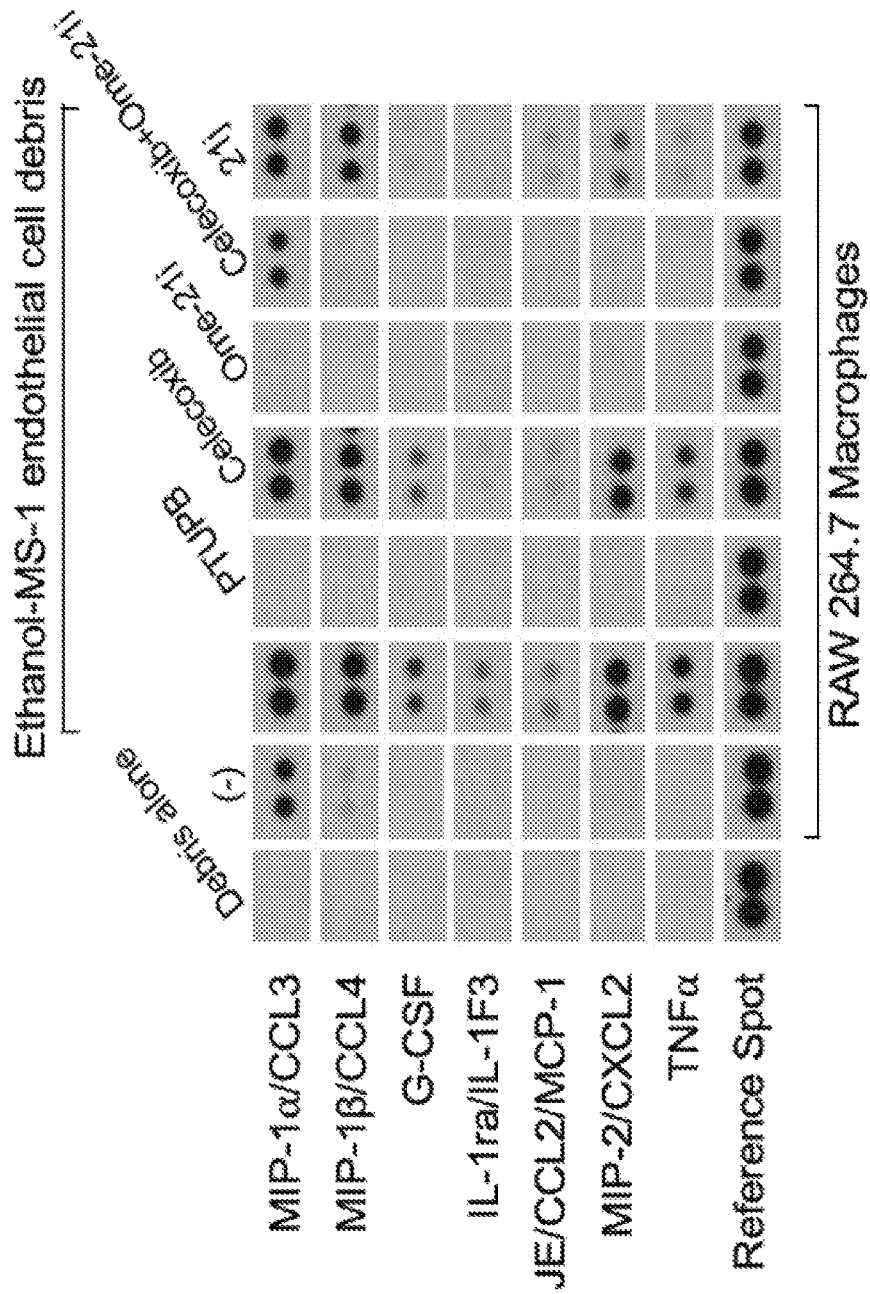
FIG. 21 shows that cytokine storm by ethanol-generated endothelial cell (MS-1) debris is inhibited by COX-2/sEH inhibitors. Inflammatory cytokine array of RAW26.7 murine macrophage conditioned media co-cultured with ethanol-generated murine endothelial (MS-1) non-tumor cell debris and pre-treated for 2 hours with dual COX-2/sEH inhibitors PTUPB (5 µM) and 21j (5 µM), sEH inhibitor Ome-21i (5 µM), COX-2 inhibitor Celecoxib (5 µM) or Ome-21i+ Celecoxib in combination (2.5 µM each).
Figure 22:
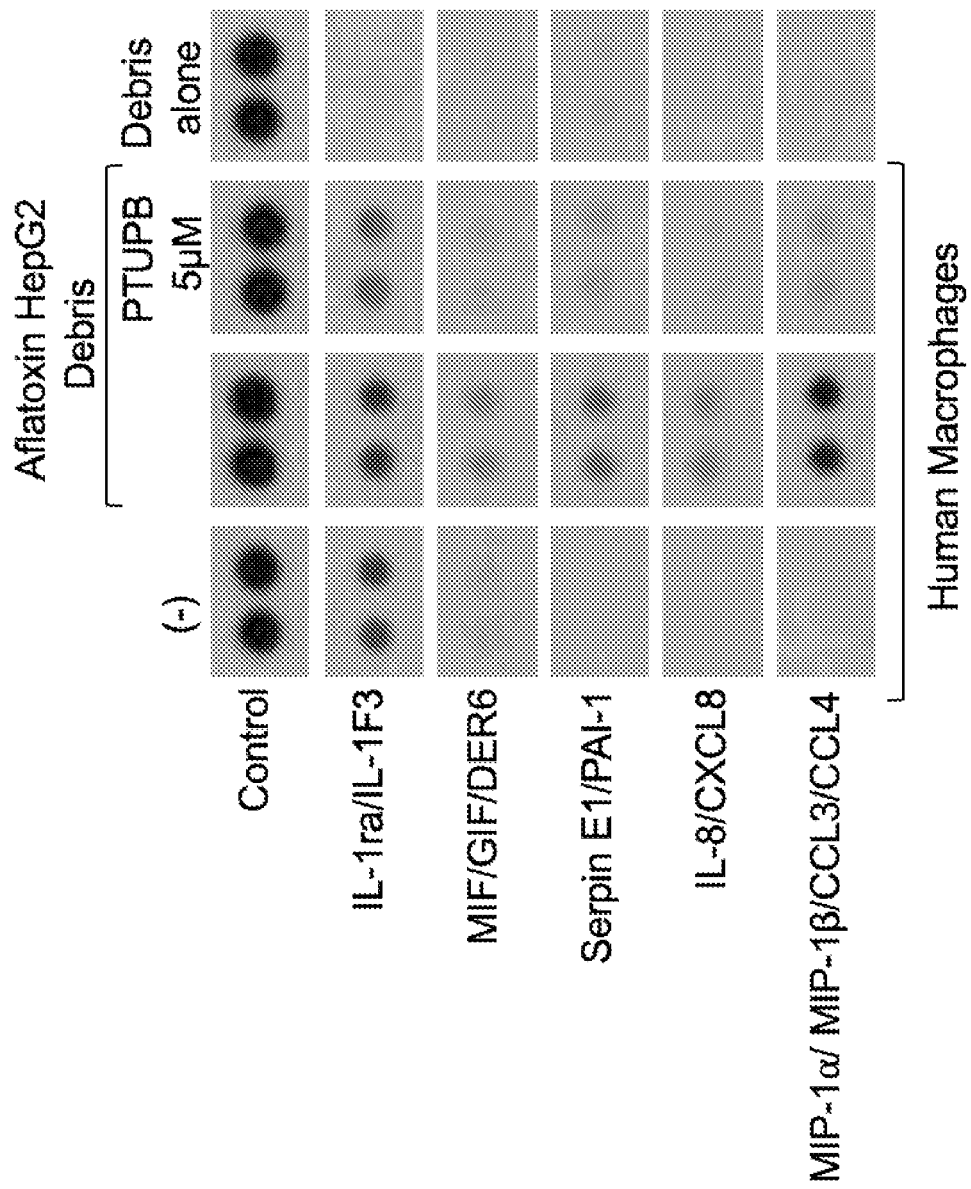
FIG. 22 shows that cytokine storm induced by aflatoxin B1-generated debris is inhibited by dual COX-2/sEH inhibitor PTUPB. Inflammatory cytokine array of human monocyte-derived macrophage (PBMC) conditioned media co-cultured with AFB1-generated human liver (HepG2) tumor cell debris and pre-treated with PTUPB (5 µM, 2 hours).

In this example, we show the effects of COX-2/sHE inhibition on cytokine storm induced by ethanol-generated debris or aflatoxin B1-generated tumor cell debris. A cytokine array of conditioned medium from RAW 264.7 murine macrophages treated with vehicle, PTUPB (5 μM), celecoxib (5 μM), ome-21i (5 μM), combination of celecoxib (2.5 μM) and ome-21i (2.5 μM), or 21j (5 μM) for 2 h and stimulated with ethanol-generated MS-1 debris is shown in FIG. 21. The results show that cytokine storm by ethanol-generated endothelial cell (MS-1) debris is inhibited by COX-2/sEH inhibitors. An inflammatory cytokine array of human monocyte-derived macrophage conditioned media treated with vehicle or PTUPB (5 μM) for 2 hours and co-cultured with aflatoxin B1-generated human (HepG2) liver tumor cell debris is shown in FIG. 22. Cytokine storm induced by aflatoxin B1-generated debris is inhibited by dual COX-2/sEH inhibitor PTUPB.

Other Embodiments

The disclosure may be embodied in other specific forms without departing from the spirit or essential characteristics thereof. The foregoing embodiments are therefore to be considered in all respects illustrative rather than limiting of the disclosure. Scope of the disclosure is thus indicated by the appended claims rather than by the foregoing description, and all changes that come within the meaning and range of equivalency of the claims are therefore intended to be embraced herein. All references cited herein are incorporated herein by reference.

Some embodiments of the invention are within the scope of the following numbered paragraphs.

1. A method of treating, suppressing, or preventing a cytokine or lipid surge in a subject, or treating, suppressing, or preventing a disease or condition caused by a cytokine or lipid surge, the method comprising administering to the subject a dual inhibitor of cyclooxygenase-2 (COX-2) and soluble epoxide hydrolase (sEH), or an inhibitor of COX-2 and an inhibitor of sEH.
2. The method of paragraph 1, wherein the cytokine or lipid surge results from infection by a bacterium, virus, fungus, or parasite.
3. The method of paragraph 2, wherein the cytokine or lipid surge results from infection by a bacterium, which is optionally a Gram-negative bacterium, such as *Francisella tularenis*.
4. The method of paragraph 2, wherein the cytokine or lipid surge results from infection by a virus, which optionally is an influenza virus (such as an influenza A virus, such as avian influenza A H7N9, H1N1, or H5N1 virus), a human coronavirus, a hantavirus, a flavivirus (such as a dengue virus), Ebola virus, a SARS virus, Epstein-Barr virus (causing a conditions such as EBV-associated hemophagocytic lymphohistiocytosis), or variola virus.

5. The method of paragraph 2, wherein the cytokine or lipid surge results from infection by a parasite, which optionally is a malaria parasite, such as *Plasmodium falciparum*.

6. The method of any one of paragraphs 2-5, wherein the subject has or is at risk of developing a severe reaction to infection, which is optionally selected from sepsis, septic shock, multiple organ dysfunction syndrome (MODS), and toxic shock syndrome.

7. The method of paragraph 1, wherein the cytokine or lipid surge results from a condition resulting in damage or insult to the body or a non-infectious disease process.

8. The method of paragraph 7, wherein the cytokine or lipid surge results from trauma, injury, burn, exposure to toxic materials (such as bacterial toxins or toxic chemicals), acute respiratory distress syndrome secondary to drug use or inhalation of toxins, cancer, acute pancreatitis or hepatitis (due to a condition such as chronic alcohol exposure), fulminant hepatic failure, multiple sclerosis, rheumatic diseases, such as systemic juvenile idiopathic arthritis (JIA) and adult-onset Still's disease (AOSD), or Langerhans cell histiocytosis (LCH).

9. The method of paragraph 8, wherein the toxic material is a bacterial or fungal toxin.

10. The method of paragraph 9, wherein the fungal toxin is an aflatoxin.

11. The method of paragraph 8, wherein the toxic material is a carcinogen.

12. The method of paragraph 11, wherein the carcinogen is selected from the group consisting of alcohol, n-nitrosodimethylamine (NDMA), an aldehyde, cyclosporine, and vinyl chloride, 13. The method of paragraph 1, wherein the cytokine or lipid surge results from the treatment of a disease or condition of the subject.

14. The method of paragraph 13, wherein the treatment is surgery (such as cardiac bypass surgery), immunotherapy, chemotherapy, radiation, and cell or tissue-based therapies (such as bone marrow or stem cell transplantation (such as allogeneic hematopoietic stem-cell transplantation), which may lead to graft-versus host disease, and T-cell therapy, including CAR-T cell therapy).

15. The method of paragraph 14, wherein the immunotherapy comprises treatment with therapeutic antibodies (such as rituximab, anti-CD28 antibody theralizumab/TGN1412, anti-PD1 antibodies, anti-PD-L1 antibodies, or anti-CTLA antibodies), CAR-T cells (such as CAR-T cells directed against CD19 or other marker of B-cell malignancies), cytokines (such as IL-2), and vaccination.

16. The method of any one of paragraphs 1-15, wherein administration of the dual inhibitor of COX-2 and sEH, or the inhibitor of COX-2 and the inhibitor of sEH, reduces the level of one or more of a pro-inflammatory cytokine, a proangiogenic cytokine, and/or a bioactive lipid.

17. The method of paragraph 16, wherein the pro-inflammatory or proangiogenic cytokine is TNF-α, CXCL2, CCL4, CCL2, ICAM-1, G-CSF, GM-CSF, PAI-1, osteopontin, MMP9, CXCL13, CXCL12, PIGF-2, PTX-3, fractalkine, angiopoietin-1, IGFBP1, or IL-1 Ra.

18. The method of paragraph 16, wherein the bioactive lipid is $PGF_{2\alpha}$, $PDG_2$, $PGJ_2$, or 15-oxoETE.

19. The method of any one of paragraphs 1-18, wherein the subject is co-administered a chemotherapeutic agent and/or an immunotherapeutic agent.

20. The method of any one of paragraphs 1-19, wherein the subject has or is at risk of developing cancer or a metastasis thereof.

21. A method of preventing, suppressing, or treating cancer in a subject, the method comprising administering to the subject a (i) chemotherapeutic or immunotherapeutic agent, and (ii) a dual inhibitor of COX-2 and sEH, or an inhibitor of COX-2 and an inhibitor of sEH.

22. The method of paragraph 21, wherein the chemotherapeutic or immunotherapeutic agent is an immune checkpoint inhibitor, which is optionally is an antibody against PD-1.

23. The method of any one of paragraphs 1-22, wherein the dual inhibitor of COX-2 and sEH is 4-(5-phenyl-3-{3-[3-(4-trifluoromethyl-phenyl)-ureido]-propyl}-pyrazol-1-yl)-benzenesulfonamide (PTUPB) or is selected from the molecules set forth in Table 1.

24. The method of any one of paragraphs 1-23, wherein the inhibitor of COX-2 is selected from the molecules set forth in Table 2.

25. The method of any one of paragraphs 1-24, wherein the inhibitor of sEH is 4-[[trans-4-[[tricyclo[$3.3.1.1^{3,7}$]dec-1-ylamino)carbonyl]amino]cyclohexyl]oxy]-benzoic acid (t-AUCB) or is selected from the molecules set forth in Table 3.

26. The method of any one of paragraphs 1-25, wherein the subject has or is at risk of developing a cancer, such as a cancer selected from the group consisting of ovarian cancer, leukemia, lymphoma, hematopoietic cancer, liver cancer, bone cancer, lung cancer, brain cancer, bladder cancer, gastrointestinal cancer, kidney cancer, breast cancer, cardiac cancer, cervical cancer, uterine cancer, head and neck cancer, gallbladder cancer, laryngeal cancer, lip and oral cavity cancer, ocular cancer, skin cancer, melanoma, pancreatic cancer, prostate cancer, genital cancer, colon cancer, colorectal cancer, testicular cancer, and throat cancer.

27. A pharmaceutical composition or kit comprising a compound of Table 1 in combination with a compound of Table 2 or Table 3, or a compound of Table 2 with a compound of Table 3.

Other embodiments are within the scope of the following claims.

The invention claimed is:

1. A method of preventing a cytokine or lipid surge in a subject under treatment for cancer, the method comprising administering to the subject a dual inhibitor of cyclooxygenase-2 (COX-2) and soluble epoxide hydrolase (sEH), or an inhibitor of COX-2 and an inhibitor of sEH, wherein:

a) the dual inhibitor of COX-2 and sEH is selected from the group consisting of PTUPB, 1-Adamantan-1-yl-3-[1-(4-methanesulfonyl-phenyl)-5-phenyl-1H-pyrazol-3-ylmethyl]-urea, 1-Cycloheptyl-3-[1-(4-methanesulfonyl-phenyl)-5-phenyl-1H-pyrazol-3-ylmethyl]-urea, 1-[1-(4-Methanesulfonyl-phenyl)-5-phenyl-1H-pyrazol-3-ylmethyl]-3-phenyl-urea, 1-[1-(4-Methanesulfonyl-phenyl)-5-phenyl-1H-pyrazol-3- ylmethyl]-3-(4-trifluoromethoxy-phenyl)-urea, 1-[1-(4-Methanesulfonyl-phenyl)-5-phenyl-1H-pyrazol-3-ylmethyl]-3-(4-trifluoromethyl-phenyl)-urea, 1-[1-(4-Methanesulfonyl-phenyl)-5-phenyl-1H-pyrazol-3-ylmethyl]-3-(3-trifluoromethyl-phenyl)-urea, 4-{5-Phenyl-3-[3-(3-trifluoromethyl-phenyl)-ureidomethyl]-pyrazol-1-yl}-benzenesulfonamide, 1-[5-tert-Butyl-1-(4-methanesulfonyl-phenyl)-1H-pyrazol-3-ylmethyl]-3-(3-trifluoromethyl-phenyl)-urea, 4-{5-Phenyl-3-[3-(3-trifluoromethyl-phenyl)-ureido]-pyrazol-1-yl}-benzenesulfonamide, 4-(5-Phenyl-3-{2-[3-(3-trifluoromethyl-phenyl)-ureido]-ethyl}-pyrazol-1-yl)-benzenesulfonamide, 1-{3-[1-(4-Methanesulfonyl-phenyl)-5-phenyl-1H-pyrazol-3-yl]-propyl}-3-(3-trifluoromethyl-phenyl)-urea, 4-(5-Phenyl-3-{3-[3-(3-trifluoromethyl-phenyl)-ureido]-propyl}-pyrazol-1-yl)-benzenesulfonamide, 4-(5-p-Tolyl-3-{3-[3-(3-trifluoromethyl-phenyl)-ureido]-propyl}-pyrazol-1-yl)-benzenesulfonamide, 4-(3-{3-[3-(2,6-Diisopropyl-phenyl)-ureido]-propyl}-5-phenyl-pyrazol-1-yl)-benzenesulfonamide, 4-{5-Phenyl-3-[3-(3-phenyl-ureido)-propyl]-pyrazol-1-yl}-benzenesulfonamide, 4-{3-[3-(3-Adamantan-1-yl-ureido)-propyl]-5-phenyl-pyrazol-1-yl}-benzenesulfonamide, 4-{3-[3-(3-Cycloheptyl-ureido)-propyl]-5-phenyl-pyrazol-1-yl}-benzenesulfonamide, 4-(3-{3-[3-(4-Chloro-phenyl)-ureido]-propyl}-5-phenyl-pyrazol-1-yl)-benzenesulfonamide, and 4-(5-Phenyl-3-{3-[3-(4-trifluoromethoxy-phenyl)-ureido]-propyl}-pyrazol-1-yl)-benzenesulfonamide;
b) the inhibitor of COX-2 is selected from the group consisting of Aspirin, Ibuprofen, Naproxen, Ketorolac, Indomethacin, Diclofenac, Piroxicam, Mefenamic acid, Nimesulide, celecoxib, rofecoxib, FR122047, and SC-560; and
c) the inhibitor of sEH is selected from the group consisting of t-AUCB, AUDA, AEPU, APAU, TUCF, TPAU, c-AUCB, c-TUCB, TUPS, t-TUCB, TPPU, t-CUCB, t-MTUCB, t-CUCMB, t-CUPM, t-TPUCB, ITPU, BPTU, TCC, GSK2256294, and Ome-21i.

2. The method of claim 1, wherein the cytokine or lipid surge results from infection by a bacterium, virus, fungus, or parasite.

3. The method of claim 2, wherein the cytokine or lipid surge results from infection by a bacterium.

4. The method of claim 2, wherein the cytokine or lipid surge results from infection by a virus.

5. The method of claim 2, wherein the cytokine or lipid surge results from infection by a parasite.

6. The method of claim 2, wherein the subject has or is at risk of developing a severe reaction to infection.

7. The method of claim 1, wherein the cytokine or lipid surge results from a condition resulting in damage or insult to the body or a non-infectious disease process.

8. The method of claim 7, wherein the cytokine or lipid surge results from trauma, injury, burn, exposure to toxic materials, acute respiratory distress syndrome secondary to drug use or inhalation of toxins, cancer, acute pancreatitis or hepatitis, fulminant hepatic failure, multiple sclerosis, rheumatic diseases, or Langerhans cell histiocytosis (LCH).

9. The method of claim 8, wherein the toxic material is a bacterial or a fungal toxin.

10. The method of claim 8, wherein the toxic material is a carcinogen.

11. The method of claim 1, wherein the cytokine or lipid surge results from the treatment of a disease or condition of the subject.

12. The method of claim 1, wherein administration of the dual inhibitor of COX-2 and sEH, or the inhibitor of COX-2 and the inhibitor of sEH, reduces the level of one or more of a pro-inflammatory cytokine, a proangiogenic cytokine, and/or a bioactive lipid.

13. The method of claim 1, wherein the subject is co-administered a chemotherapeutic agent and/or an immunotherapeutic agent.

14. The method of claim 1, wherein the subject has or is at risk of developing cancer or a metastasis thereof.

15. The method of claim 1, wherein the inhibitor of COX-2 is selected from the group consisting of Aspirin, Ibuprofen, Naproxen, Ketorolac, Indomethacin, Diclofenac, Piroxicam, Mefenamic acid, Nimesulide, celecoxib, rofecoxib, FR122047, and SC-560 and the inhibitor of sEH is selected from the group consisting of t-AUCB, AUDA, AEPU, APAU, TUCF, TPAU, c-AUCB, c-TUCB, TUPS, t-TUCB, TPPU, t-CUCB, t-MTUCB, t-CUCMB, t-CUPM, t-TPUCB, ITPU, BPTU, TCC, GSK2256294, and Ome-21i.

16. A method of treating or suppressing a cytokine or lipid surge in a subject under treatment for cancer, the method comprising administering to the subject a dual inhibitor of COX-2 and sEH, or an inhibitor of COX-2 and an inhibitor of sEH, wherein:
a) the dual inhibitor of COX-2 and sEH is selected from the group consisting of PTUPB, 1-Adamantan-1-yl-3-[1-(4-methanesulfonyl-phenyl)-5-phenyl-1H-pyrazol-3-ylmethyl]-urea, 1-Cycloheptyl-3-[1-(4-methanesulfonyl-phenyl)-5-phenyl-1H-pyrazol-3-ylmethyl]-urea, 1-[1-(4-Methanesulfonyl-phenyl)-5-phenyl-1H-pyrazol-3-ylmethyl]-3-phenyl-urea, 1-[1-(4-Methanesulfonyl-phenyl)-5-phenyl-1H-pyrazol-3-ylmethyl]-3-(4-trifluoromethoxy-phenyl)-urea, 1-[1-(4-Methanesulfonyl-phenyl)-5-phenyl-1H-pyrazol-3-ylmethyl]-3-(4-trifluoromethyl-phenyl)-urea, 1-[1-(4-Methanesulfonyl-phenyl)-5-phenyl-1H-pyrazol-3-ylmethyl]-3-(3-trifluoromethyl-phenyl)-urea, 4-{5-Phenyl-3-[3-(3-trifluoromethyl-phenyl)-ureidomethyl]-pyrazol-1-yl}-benzenesulfonamide, 1-[5-tert-Butyl-1-(4-methanesulfonyl-phenyl)-1H-pyrazol-3-ylmethyl]-3-(3-trifluoromethyl-phenyl)-urea, 4-{5-Phenyl-3-[3-(3-trifluoromethyl-phenyl)-ureido]-pyrazol-1-yl}-benzenesulfonamide, 4-(5-Phenyl-3-{2-[3-(3-trifluoromethyl-phenyl)-ureido]-ethyl}-pyrazol-1-yl)-benzenesulfonamide, 1-{3-[1-(4-Methanesulfonyl-phenyl)-5-phenyl-1H-pyrazol-3-yl]-propyl}-3-(3-trifluoromethyl-phenyl)-urea, 4-(5-Phenyl-3-{3-[3-(3-trifluoromethyl-phenyl)-ureido]-propyl}-pyrazol-1-yl)-benzenesulfonamide, 4-(5-p-Tolyl-3-{3-[3-(3-trifluoromethyl-phenyl)-ureido]-propyl}-pyrazol-1-yl)-benzenesulfonamide, 4-(3-{3-[3-(2,6-Diisopropyl-phenyl)-ureido]-propyl}-5-phenyl-pyrazol-1-yl)-benzenesulfonamide, 4-{5-Phenyl-3-[3-(3-phenyl-ureido)-propyl]-pyrazol-1-yl}-benzenesulfonamide, 4-{3-[3-(3-Adamantan-1-yl-ureido)-propyl]-5-phenyl-pyrazol-1-yl}-benzenesulfonamide, 4-{3-[3-(3-Cycloheptyl-ureido)-propyl]-5-phenyl-pyrazol-1-yl}-benzenesulfonamide, 4-(3-{3-[3-(4-Chloro-phenyl)-ureido]-propyl}-5-phenyl-pyrazol-1-yl)-benzenesulfonamide, and 4-(5-Phenyl-3-{3-[3-(4-trifluoromethoxy-phenyl)-ureido]-propyl}-pyrazol-1-yl)-benzenesulfonamide;
b) the inhibitor of COX-2 is selected from the group consisting of Aspirin, Ibuprofen, Naproxen, Ketorolac, Indomethacin, Diclofenac, Piroxicam, Mefenamic acid, Nimesulide, celecoxib, rofecoxib, FR122047, and SC-560; and c) the inhibitor of sEH is selected from the group consisting of t-AUCB, AUDA, AEPU, APAU, TUCF, TPAU, c-AUCB, c-TUCB, TUPS, t-TUCB, TPPU, t-CUCB, t-MTUCB, t-CUCMB, t-CUPM, t-TPUCB, ITPU, BPTU, TCC, GSK2256294, and Ome-21i.

17. The method of claim 16, comprising administration of PTUPB.

18. The method of claim 1, wherein the subject is under treatment with chemotherapy.

19. The method of claim 1, wherein the subject is under treatment with immunotherapy.

20. The method of claim 19, wherein the immunotherapy comprises CAR-T therapy.

21. The method of claim 16, wherein the subject is under treatment with chemotherapy.

22. The method of claim 16, wherein the subject is under treatment with immunotherapy.

23. The method of claim 19, wherein the immunotherapy comprises CAR-T therapy.

* * * * *